US007643912B2

(12) United States Patent
Heffington

(10) Patent No.: US 7,643,912 B2
(45) Date of Patent: Jan. 5, 2010

(54) PROGRAMMABLE AUTOMOTIVE COMPUTER METHOD AND APPARATUS WITH ACCELEROMETER INPUT

(75) Inventor: Mark F. Heffington, Germantown, TN (US)

(73) Assignee: Hypertech, Inc., Bartlett, TN (US)

( * ) Notice: Subject to any disclaimer, the term of this patent is extended or adjusted under 35 U.S.C. 154(b) by 284 days.

(21) Appl. No.: 11/591,027

(22) Filed: Nov. 1, 2006

(65) Prior Publication Data

US 2007/0088465 A1 Apr. 19, 2007

Related U.S. Application Data

(63) Continuation-in-part of application No. 11/265,707, filed on Nov. 1, 2005.

(60) Provisional application No. 60/624,210, filed on Nov. 1, 2004, provisional application No. 60/732,579, filed on Nov. 1, 2005.

(51) Int. Cl.

| | |
|---|---|
| ***G05D 1/00*** | (2006.01) |
| ***G01M 17/00*** | (2006.01) |
| ***G06F 7/00*** | (2006.01) |
| ***G06F 19/00*** | (2006.01) |
| ***B60T 7/12*** | (2006.01) |

(52) U.S. Cl. ............................... 701/1; 701/35; 701/70; 701/74; 340/425.5; 340/439; 340/441

(58) Field of Classification Search ..................... 701/1, 701/29, 33–36, 70, 71, 72, 74, 75, 213, 214, 701/220; 340/425.5, 429, 426.14, 438, 439, 340/440, 441

See application file for complete search history.

(56) References Cited

U.S. PATENT DOCUMENTS

| | | | | |
|---|---|---|---|---|
| 3,827,315 | A | 8/1974 | Lupo | |
| 4,003,241 | A | 1/1977 | Thomas | |
| 4,395,624 | A * | 7/1983 | Wartski | 377/15 |
| 4,603,582 | A | 8/1986 | Middleton | |
| 4,969,100 | A * | 11/1990 | Takata et al. | 701/74 |
| 5,373,447 | A | 12/1994 | Howes et al. | |
| 5,388,895 | A * | 2/1995 | Negrin | 303/154 |

(Continued)

OTHER PUBLICATIONS

Reineman, EPA, "Effectiveness of OBD II Evaporative Emission Monitors—30 Vehicle Study", EPA420-R-00-018, 23 pages, Revised Oct. 2000.

*Primary Examiner*—Edward Pipala
(74) *Attorney, Agent, or Firm*—Donald L. Bartels; Nixon Peabody LLP

(57) ABSTRACT

A device and corresponding method for enabling a user to accurately control, monitor, and evaluate performance of a vehicle. A portable programmable computer device that a user can readily plug into a diagnostic connector port of the vehicle for providing the controlling, monitoring, and evaluating functions. Accurate detection of the start time of first movement of the vehicle is made based on data from an accelerometer, independent of the onboard diagnostic system and its diagnostics port. A clock is started for measuring time such that the precise time taken to reach the time-stamped first velocity value from the engine computer via the diagnostic port is determined. Data from the accelerometer and diagnostic port is analyzed and selectively used for accurately and reliably correcting for errors in velocity data from the onboard diagnostic system including latency error and errors due to the vehicle exhibiting wheel spin.

29 Claims, 40 Drawing Sheets

U.S. PATENT DOCUMENTS

| | | | |
|---|---|---|---|
| 5,467,277 A | 11/1995 | Fujisawa | |
| 5,515,281 A | 5/1996 | Palazzetti et al. | |
| 5,686,651 A | 11/1997 | Hur et al. | |
| 5,835,876 A | 11/1998 | Hathaway et al. | |
| 5,936,614 A | 8/1999 | An | |
| 6,011,461 A | 1/2000 | Luper | |
| 6,088,650 A | 7/2000 | Schipper | |
| 6,122,577 A * | 9/2000 | Mergenthaler et al. | 701/34 |
| 6,356,823 B1 | 3/2002 | Iannotti et al. | |
| 6,591,209 B1 | 7/2003 | Romano | |
| 6,614,385 B2 | 9/2003 | Kuhn | |
| 6,625,504 B2 | 9/2003 | Landreth | |
| 6,629,029 B1 | 9/2003 | Giles | |
| 2003/0033849 A1 | 2/2003 | LaBuy et al. | |
| 2004/0083041 A1 | 4/2004 | Skeen et al. | |
| 2004/0084014 A1 | 5/2004 | Hawkins | |
| 2004/0172177 A1 | 9/2004 | Nagai et al. | |
| 2004/0215379 A1 | 10/2004 | Pangerl et al. | |

* cited by examiner

| Speed | RPM | ECT | IAT | Spark | Knock |
|---|---|---|---|---|---|
| 0 | 1589 | 194 | 129 | 17.5 | 0 |
| 10 | 2115 | 194 | 129 | 15.5 | 0 |
| 20 | 2829 | 194 | 127 | 19.5 | 0 |
| 30 | 3837 | 194 | 126 | 19.5 | 0 |
| 40 | 5074 | 194 | 124 | 19.5 | 0 |
| 50 | 3468 | 194 | 122 | 20.5 | 0 |
| 60 | 4104 | 194 | 118 | 19 | 0 |
| 70 | 4742 | 194 | 117 | 17 | 0 |

PROGRAMMABLE AUTOMOTIVE COMPUTER METHOD AND APPARATUS WITH ACCELEROMETER INPUT

CROSS REFERENCE TO RELATED APPLICATION

This application claims the benefit of U.S. Provisional Application No. 60/732,579, filed Nov. 1, 2005, and this application is a continuation-in-part of prior Application Ser. No. 11/265,707, filed Nov. 1, 2005 which claims the benefit of U.S. Provisional Application No. 60/624,210, filed Nov. 1, 2004, all three applications are herein incorporated by reference.

FIELD OF THE INVENTION

The invention relates in general to vehicle computer devices and methods, and more particularly to a device, and corresponding method for enabling a vehicle operator to control, monitor, and evaluate vehicle performance.

BACKGROUND OF THE INVENTION

A typical automobile includes a myriad of sensors mounted around the engine and other vehicle modules for monitoring the condition and selected performance characteristics of the vehicle such as air intake, temperature, and the position and rate of change of the accelerator, etc. Typically, an engine computer, also referred to as a Powertrain Control Module (PCM), is provided in the vehicle for monitoring the sensors and providing control of various engine functions as a function of sensor data. The PCM typically makes adjustments to minimize exhaust pollution, minimize fuel consumption, and maximize engine power.

Partly in response to governmental vehicle pollution mandates, an OnBoard Diagnostics (OBD) system is typically provided in the vehicle in order to require the PCM to actively monitor and test the engine parameters and in particular, the emissions-related elements. The OnBoard Diagnostics system requires that sensors and actuators controlling pollution monitoring are checked regularly and codes generated if a fault is detected. Other diagnostic systems such as OBD-II go a step further and require the PCM to actively monitor and test the emissions-related elements. An OnBoard Diagnostics port is typically provided which enables access to the engine computer and the diagnostic codes provided by the OBD system. The diagnostic port is typically accessible from either under the hood or from the interior passenger compartment of the vehicle to facilitate monitoring and control of the vehicle's engine characteristics. Conventionally, the monitoring and troubleshooting of identified faults required the use of bulky, complex equipment that was available only at automobile repair establishments. The operation of the conventional test equipment also required the knowledge and skill of a trained mechanic. Many vehicle operators desire the capability to accurately control, monitor, and evaluate vehicle performance themselves without the need for bulky, complex equipment or a mechanic. The diagnosing of certain engine problems and the monitoring of certain engine performance characteristics conventionally requires the use of a dynamometer. A dynamometer or "dyno" is a device used to measure power and torque produced by the engine. There are typically two types of dynos, an engine dyno that gets bolted directly to an engine, and a chassis dyno that can measure horsepower and torque without requiring that the engine be removed from the frame of the vehicle. Known devices exist for separately programming the programmable engine functions.

A vehicle operator may also be interested in measuring the speed performance of the vehicle, e.g., quarter mile time, time to speed, and top speed. Conventionally, a drag strip or other location is used and requires another person and/or one or more external devices to monitor the vehicle position and to provide a timer for determining the quarter mile time and speed.

A vehicle operator typically also desires to have a display of vehicle operating conditions. The cost of accessory gauges to display these operating conditions, however, are often cost prohibitive and difficult to install. Vehicle operators are also typically interested in having ready access to diagnostic data and their descriptions for troubleshooting purposes.

There is therefore a need for a multipurpose device and method that provides a performance tuning function, a dynamometer function, and a drag strip function via a portable device that a user can readily install by plugging it into the diagnostic connector port of the vehicle. There is a need for a device and method that also enables a user to monitor selected characteristics of the engine and other vehicle systems. There is a need for a device and method that also enables a user to selectively display diagnostic data based on data read from the onboard diagnostics system port. There is also a need for displaying vehicle operating conditions to a user without the need for costly accessory gauges. A need also exists for providing the above features in a device that has a user friendly interface for enabling easy operation of the monitor, evaluation, and control functions.

There are known vehicle programmable automotive devices that interface with the vehicle's diagnostic port to obtain velocity information, e.g. OBD-II based devices, also referred to as PID-based devices. There are also known vehicle programmable automotive devices that are accelerometer-based and do not interface with the vehicle diagnostic port. The advantage of known accelerometer-based devices is that these devices provide a precise starting time and point and are not affected by wheel-spin errors caused in distance calculations. A drawback of such devices is that the accelerometer requires very careful installation. A key drawback of these accelerometer-based devices is the requirement of precise alignment with the vehicle's x, y, and z axes of movement, and especially the longitudinal axis, e.g., the straight line direction down a drag strip track. The requirements for precise alignment with respect to these three axes are virtually impossible for known accelerometer-based devices to meet. As a result, errors in the outputs generated by such devices are inherent and unavoidable. Moreover, any misalignments of the accelerometer causes errors in the vector pointing down the track which results in a continuously increasing error in the velocity values, the first integral of the accelerations. This error for accelerometer-based devices is further compounded in the distance calculations, the second integral of the accelerations.

Accelerometer-based devices are also subject to errors due to "bouncing" and "tilting" during acceleration of the vehicle. For example, the lifting of the vehicle's front end and the dropping down of the rear end exhibited during acceleration both affect the vector for straight line acceleration, thereby causing both random and systematic errors. The removal and reinstallation of an accelerometer based device in a slightly different orientation, or any "bumping" of the device will cause different results from otherwise identical vehicle test runs. For all of the above reasons, known accelerometer-based devices have the drawback of being subject to error.

There is therefore a need for a method, and device that overcomes the drawbacks of known accelerometer-based devices. Known parameter identification based (PID-based) devices rely on velocity data from the vehicle's diagnostic port for their performance calculations and measurements. These known PID-based devices are also referred to herein as PID-velocity devices. The velocities read from the diagnostic port for such devices are not accelerometer based and thus are not affected by vehicle bouncing or tilting. As a result, PID-based devices can be mounted in any orientation.

Two of the drawbacks of known PID-based devices are that the initial starting point and starting time are unknown. The velocity data available at the diagnostic port is obtained using a pulse generator driven off the drive-train and in proportion to road speed. The resolution of the pulse generator varies from vehicle to vehicle, however. Consequently, it is unknown whether a pulse is produced every few inches or every few feet.

There is therefore a need for accurately and reliably accounting for this unknown distance between pulses that causes an error at the start of a test run for known PID-based devices. The PCM software of the engine computer calculates the velocity data accessible from the diagnostic port based on "time between pulses" measured by a sensor on the output shaft of the transmission. The output shaft rotates at the drive shaft rotational speed such that one or more pulses are generated every time the drive shaft turns one complete revolution. The typical distance on the shaft between pulses is less than 0.75 inches. The engine computer cannot deliver the first velocity value based on time between pulses until after the first two pulses have occurred.

In order to accurately measure the time and distance down the track from the very start, the distance and time measurements must begin simultaneously at the precise moment the vehicle moves. The time interval and the short distance traveled from "first movement" until the first pulse is not known based on any of the data available from any known diagnostic port. In other words, the vehicle might be at rest with the sensor on the output shaft of the transmission on the verge of "triggering", or it might be at rest with the sensor having just "triggered", or it might be anywhere in between. As a result, there is an unknown error such that any previous attempts at using PCM velocity values provided at the diagnostic port to generate distance traveled and acceleration tests have always contained an error that varies from test to test randomly, and, therefore, gives false, unreliable fluctuating results.

There is therefore a need for a detector for detecting the start time of first movement of the vehicle independent of the onboard diagnostic system and its diagnostic port.

In addition to not knowing the precise starting point on the track for a test, the initial time "zero" of the test, i.e., the moment in time of first movement by the vehicle, is also an unknown for conventional PID-based devices. The time can only begin in known PID-velocity based devices when the first non-zero velocity appears as a PID at the diagnostic port. For known PID-velocity based devices, therefore, nothing can be known about the time that has elapsed nor the distance that has been traveled, prior to the first non-zero PID velocity report.

There is therefore a need for a detector for detecting the start time of first movement of the vehicle independent of the onboard diagnostic system and its diagnostics port. A "first movement" trigger is needed such that the precise time taken to reach the first velocity values delivered by the PCM to the diagnostic port can be accurately determined.

Wheel spin presents another challenge because the velocity values from the diagnostic port are distorted during the time the vehicle's wheels are spinning, such that distance calculations would otherwise be inaccurate. Wheel spin can occur at varying times and distances down the track. The velocity data at the diagnostic port falsely reports excess speed for the entire time duration of a "wheel spin" condition. As a result, the integral of the velocity curves is exaggerated and all distances and time-to-distance calculations are incorrect and in proportion to the falsely-reported excess speed during the wheel spin. Known PID-based devices do not accurately account for this wheel spin error.

There is therefore also a need for a method that detects and accurately and reliably accounts for wheel spin.

SUMMARY OF THE INVENTION

The present invention provides a device, and corresponding method for enabling a user to control, monitor, and evaluate vehicle performance. According to one embodiment, the device having a high-resolution touch screen with a user-friendly interface included for facilitating viewing, data entry, and operation of the various modes provided. The device of the present invention installs in seconds by simply plugging its cable into the diagnostic port connector available in the interior compartment of the vehicle. The device and method of the present invention also includes an accelerometer.

Broadly stated, the present invention provides a method for calculating the point at which a vehicle has traveled a selected distance from a standing start point, wherein the distance calculation corrects for errors in the velocity data available from the vehicle's onboard diagnostics system, comprising the steps of accessing the onboard diagnostic system for receiving the vehicle velocity data; detecting the start time of vehicle travel using a detector that senses movement of the vehicle, wherein the detector is independent of the onboard diagnostic system; generating a first set of velocity values based on data acquired by the detector; storing the first set of velocity values; storing a second set of velocity values based on the vehicle velocity data received from the onboard diagnostic system; generating a time stamp for each of the velocity values of the first set and the second set; generating corrected velocity values as a function of the first set and the second set of velocity values, the time stamps, and the detected start time; and integrating the corrected velocity values to calculate the point at which the vehicle has traveled the selected distance from the standing start point.

Broadly stated, the present invention also provides an electronic portable device for calculating the point at which a vehicle has traveled a selected distance from a standing start point, wherein the distance calculation corrects for errors in the velocity data available from the vehicle's onboard diagnostics system, comprising an input/output port for coupling the device to the diagnostic port for accessing the onboard diagnostic system for receiving the vehicle velocity data; a detector for detecting vehicle movement and the start time of vehicle travel, wherein the detector is independent of the onboard diagnostics system; a microcontroller operative for generating a first set of velocity values and a corresponding time stamp for each velocity value of the first set based on data acquired by the detector, for receiving a second set of velocity values generated by the onboard diagnostic system via the input/output port and for generating a time stamp for each of the velocity values of the second set, for generating corrected velocity values as a function of the first set and the second set of velocity values, the time stamps, and the detected start time; and for integrating the corrected velocity values to calculate the point at which the vehicle has traveled the selected distance from the standing start point; a memory for providing storage in the device for the first set of velocity values, for the second set of values based on the vehicle velocity data received from the onboard diagnostic system, and for the time stamps; and a touch screen display for enabling user selection of the operations of the device.

Broadly stated the present invention also provides a method for calculating the point at which a vehicle has traveled a selected distance from a standing start point, wherein the distance calculation corrects for errors in the velocity data available from the vehicle's onboard diagnostics system, comprising the steps of accessing the onboard diagnostic system for receiving the vehicle velocity data; detecting the start time of the vehicle travel using an accelerometer that senses movement of the vehicle, wherein the accelerometer is independent of the onboard diagnostic system; in a first time interval from the start time to the time taken to reach the first velocity value received from the onboard diagnostic system, generating corrected velocity values based on data acquired from the accelerometer; thereafter, generating corrected velocity values based on velocity data from the onboard diagnostics system if the velocity data does not significantly vary from the velocity values generated based on data acquired from the accelerometer, otherwise, generating corrected velocity values based on data acquired from the accelerometer; and integrating the corrected velocity values to calculate the point at which the vehicle has traveled the selected distance from the standing start point.

According to a preferred embodiment of the present invention, the velocity derived from the first integration of accelerometer's acceleration data is constantly compared to the onboard diagnostic system reported, i.e., PID-based, vehicle velocity, both typically expressed in feet-per-second. Agreement between the velocities of both the accelerometer and PID-based vehicle velocity is indicative of "no wheel spin". Disagreement is indicative of wheel spin. The "first movement" has been accurately identified, and noted as the start time. The distance is calculated from the second integral of acceleration from the start time to the point of "no wheel spin". At that point, a switch is made from the accelerometer-based data to the onboard diagnostic system PID-based data. The time and distance until this point become the initial values for the remainder of the test and time and distance calculations derived from the PID-based data stream are added to these initial values. At this point, i.e., after wheel spin has stopped, time is now accurately known, the velocity is as accurate as the federally-mandated accuracy of the car's PID velocity values, and the distance, based on the PID velocity integral, is likewise as accurate.

For power calculations, the acceleration of the vehicle must be known. The degree of accuracy of those calculations is proportional to the degree of accuracy of the acceleration measurements. The accelerometer-obtained acceleration values are again used for the initial calculations, up to the moment there is velocity agreement between the velocity derived from first integral of the accelerometer and the velocity values provided by the onboard diagnostic system. From that moment and thereafter, the acceleration values derived from the first derivative of the PID-based velocities are used.

An advantage of the present invention is that of using the combination of accelerometer data and PID-based velocity data in a way that delivers accuracy not possible with either of these two systems alone.

An advantage of the present invention is that it provides for accurate detection of the start time of first movement of the vehicle independent of the onboard diagnostic system and its diagnostics port. According to a related advantage, the present invention determines the precise time taken to reach the first PCM delivered velocity value from the onboard diagnostics system.

Still another advantage of the present invention is that it accurately and reliably corrects for errors in velocity data from the onboard diagnostic system when a vehicle is exhibiting wheel spin.

Another advantage of the present invention is that it provides a touch screen user interface including an easy-to-use menu interface, a typewriter-style keyboard enabling easy data entry, and contextual help screens to facilitate use and eliminate the need for a separate user manual.

An advantage of the present invention is that it enables performance tuning by a user. The present invention enables a user to unlock the performance potential of computer-controlled vehicle engines by providing optimized fuel and ignition curves for enabling improved engine performance over the entire revolutions per minute (RPM) range. The present invention also gives a performance enthusiast and other users the ability to reprogram and personalize the onboard computer that controls virtually all aspects of the vehicle's operation. For example, the system enables adjustment of the engine RPM limiter for faster acceleration and adjustment of the top speed limiter for matching the speed rating of factory-approved tires. According to another aspect, the system enables correction of speedometer/odometer readings for non-stock tire sizes and gear ratios. The present invention, according to another aspect, enables a user to change the automatic transmission shift points and shift firmness to improve performance and enables adjustment of the on-off temperature of the vehicle's electric cooling fan. The present invention enables storage of the stock tuning calibrations in the memory of the device so that these calibrations can be selectively restored by a user.

Another advantage of the present invention is that it provides a drag strip function, i.e., a virtual drag strip, for accurately recording acceleration data, i.e., elapsed times and speeds, during a test run and presentation of the results of the test run to a user in a time slip format. The present invention, according to other aspects, also records and displays reaction time, incremental elapsed times and speed over several distances, time to speeds, e.g., 0-60 mph, 0-100 mph, and time to maximum speed. The present invention provides the vehicle performance information without the cost and inconvenience of using complex and expensive track testing equipment at a commercial drag strip.

Another advantage of the present invention is that it provides a dynamometer function for generating accurate horsepower and torque graphs under real-world conditions. The dynamometer function is also referred to herein as the dyno function. A related advantage of the present invention is that it enables accounting for the aerodynamic drag and rolling resistance values for a specific vehicle, even if the vehicle includes one or more non-stock modifications. According to another aspect, correction for temperature, barometric pressure, and humidity is provided for increased accuracy and repeatability.

Another advantage of the present invention is that it provides user-selectable graphic display of vehicle operating conditions without the need for accessory gauges. The present invention enables the monitoring of various functions such as oil pressure, engine coolant temperature, exhaust gas temperatures, fuel flow, spark timing, turbo boost, fuel mileage, and others.

Another advantage of the present invention is that it provides for the identification and display of Diagnostic Trouble Codes (DTC's) with informative text descriptions so as to eliminate the need to look up a code number to determine a fault. Another advantage of the present invention is that it enables the clearing of selected DTCs without requiring expensive customized equipment for that purpose.

Another advantage of the present invention is that it provides a device that includes an optional Universal Serial Bus (USB) Port to personal computer (PC) interface to enable connectivity for future expansion modules, e.g., for facilitating the downloading, printing and sharing of data from the device.

Another advantage of the present invention is that it provides an interface port having a connector for accessing data on powertrain and vehicle operating conditions in real time with easy installation without tools and can be used with any OBD II compliant vehicle. Vehicle manufacturers in the United States were required to provide an OBD II compliant port starting with the 1996 model year.

Another advantage of the present invention is that it provides data acquisition features to enable a user to store and retrieve drag strip, dynamometer, and engine monitoring data, allows run-to-run comparisons to evaluate changes, stores data by date and session for easy retrieval, and facilitates data sharing with a PC and via the Internet.

Another advantage of the present invention is that it enables dual fuel capability for a user, in that it to enables an engine to be tuned to deliver virtually the same power increases with regular octane gasoline as with premium octane gasoline in engines designed for regular fuel. The dual fuel capability aspect of the present invention has the advantages of enabling a user to get maximum power and performance with significant cost savings by enabling the use of less expensive regular fuel while producing more power than with either stock tuning a prior art "dual fuel" tuning which produces no gains with regular gasoline.

Another advantage of the present invention is that it provides a multi-stage tuning, typically 3 stage tuning, for diesel engines so as to enable a user to select the horsepower increase to suit his or her driving style. According to another aspect, the present invention has an advantage of enabling tuning of the vehicle to its maximum power so as to provide improved towing capability up to the vehicle's maximum weight rating and enabling potential gains in fuel economy.

These and other embodiments, features, aspects, and advantages of the invention will become better understood with reference to the following description, appended claims and accompanying drawings.

Reference symbols or names are used in the Figures to indicate certain components, aspects or features shown therein, with reference symbols common to more than one Figure indicating like components, aspects or features shown therein.

DETAILED DESCRIPTION OF THE INVENTION

Figure 1:
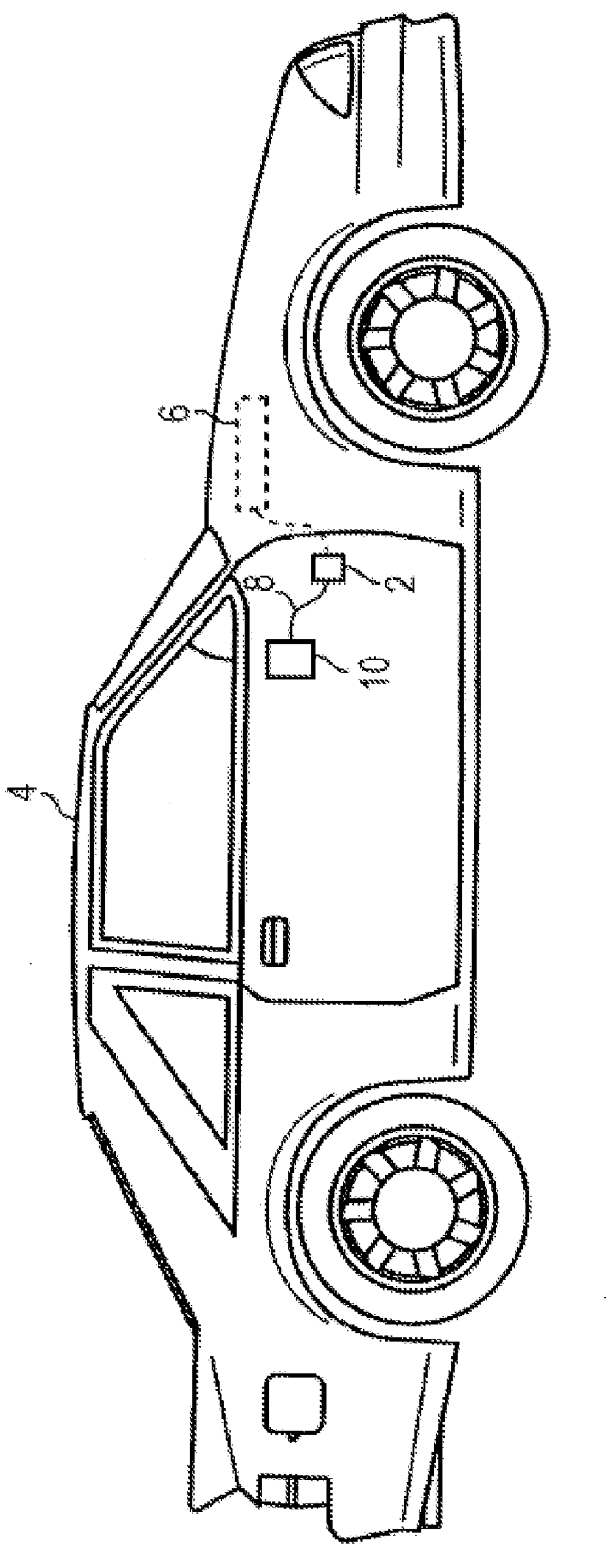
FIG. 1 illustrates a device according to an embodiment of the present invention connected to a diagnostics port coupled to an engine computer within an automobile.

The device of the present invention is a portable programmable automotive computer. FIG. 1 is an illustration of an automobile 4 having an automotive computer 6, also referred to herein as a Powertrain Control Module or PCM, for controlling the operation thereof. Automotive computer 6 is coupled to an onboard diagnostic port 2, e.g., an OBD II port, accessible from the interior compartment of the automobile 4 as shown. Although automobile 4 is shown as a car, the present invention is also for use for other motor vehicles including trucks, sports utility vehicles (SUVs), hot rods, and the like. The diagnostic port 2 provides access to the PCM and provides engine characteristics and diagnostic codes information. A portable programmable automotive computer device 10 according to the present invention is coupled to diagnostic port 2. The programmable automotive computer device 10 is preferably coupled to the diagnostic port 2 via a cable 8 as shown in the embodiment in FIG. 1. It should be appreciated that other suitable coupling devices may also be used to practice the invention, e.g., a wireless connection. Device 10 preferably includes a housing that includes an on/off button (not shown).

Figure 2:
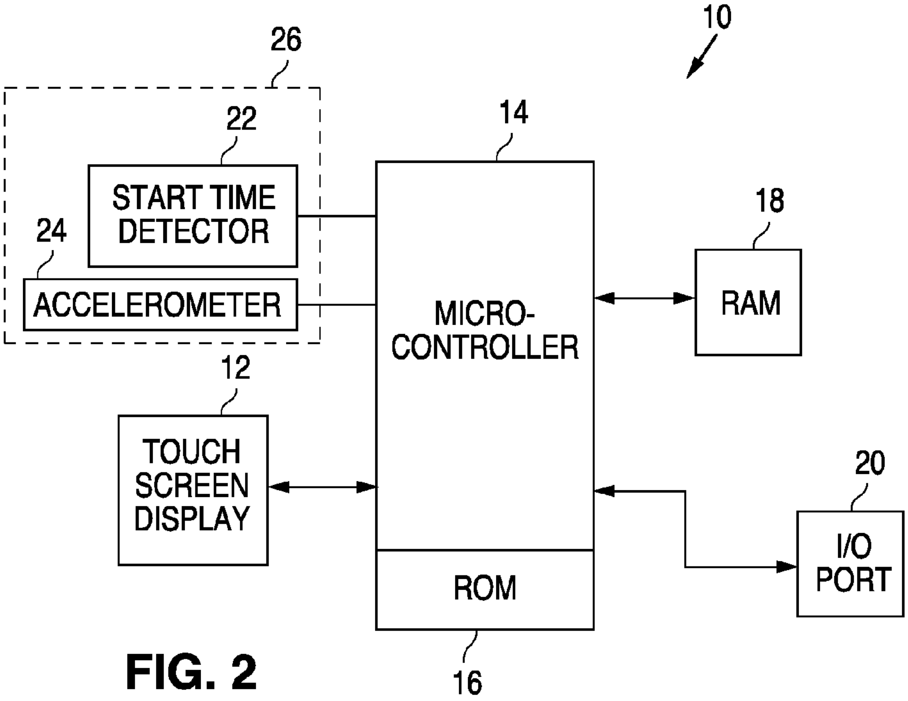
FIG. 2 is a schematic block diagram of the programmable automotive computer device according to an embodiment of the present invention.

FIG. 2 is a schematic block diagram of the programmable automotive computer device 10 according to an embodiment of the present invention. Device 10 includes a touch screen display 12, a microcontroller 14, microcontroller ROM memory 16, RAM memory 18 and an I/O port 20. According to a preferred embodiment, touch screen display 12 is a high resolution 3"×4" blue Liquid Crystal Display (LCD) touch screen. The I/O port 20 of device 10 enables connection to the diagnostic port 2 shown in FIG. 1. Device 10 also includes a start time detector 22 as shown in FIG. 2. Preferably, as discussed in detail below, an accelerometer is included as a start time detector 22 to provide an accurate "first movement" trigger. Alternatively, a mercury switch, triggered by the initial movement of the vehicle or a "foot off the brake" indication, or the like, is used as a start time detector to detect the first movement of the vehicle. In addition to the start time detector 22, the device 10 includes an accelerometer function, identified as 24, for the system. In a preferred embodiment, one accelerometer, identified as 26 and shown in dashed lines in FIG. 2, provides the functions of both the start time detector 22 and the accelerometer 24.

The device 10 is portable and preferably remains plugged into the diagnostic port 2 for active operation. The present invention preferably enables a user to selectively execute a selected one of a plurality of programs installed in device 10. The device 10 preferably provides five user-selectable programs referred to herein as Power Tuning, Dynamometer, Drag Strip, Diagnostics, and Engine Monitor. The device 10 according to the present invention includes an operating system which allows additional programs to be installed. According to an alternative embodiment, the device 10 includes an additional port, e.g., a Universal Serial Bus (USB) Port, (not shown) to enable connection to a PC or a network such as the Internet to enable transfer of saved dyno, dragstrip, or diagnostic test information for printing, additional analysis, or other use. According to an alternative embodiment, software is provided to enable this additional analysis. The device 10 also includes expansion capability for installation of additional circuitry for providing additional capability. For example, an embodiment of the device according to the present invention provides support for the Controller Area Network (CAN) bus to enable additional future configurability and expandability. Device 10 is designed to receive a myriad of inputs from the automotive computer 6 via the diagnostic port 2, internally and transparent to the user. For instance, if the PCM contains the vehicle identification number (VIN), it is received by the device 10 automatically and is displayable. The user is prompted to enter the VIN for vehicles that do not automatically provide access to it at the diagnostic port.

The device 10 enables the user to selectively enter a "setup mode". The "setup" mode is provided for enabling the user to enter data to appear on predetermined screens and on printouts, e.g., user name, car specifications, etc. Once the "set up" mode is complete, the present invention will cause the data to be shown at the predetermined areas on the display or on a print-out, until the data is changed. The device 10 enables preferably the user to selectively receive additional explanations and expanded "how to" information preferably via selectable additional information and help screens specific to the displayed screen.

Figure 3:
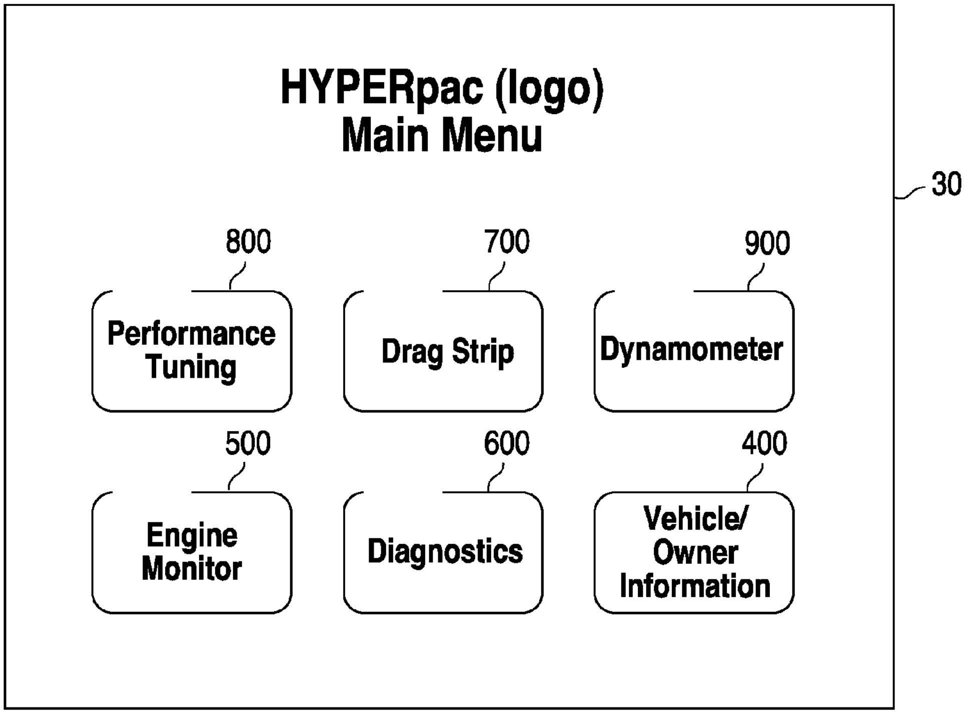
FIG. 3 shows an exemplary main menu display screen of the device in FIGS. 1 and 2 for prompting the user to select one of the provided program functions according to an embodiment of the present invention.
Figure 70:
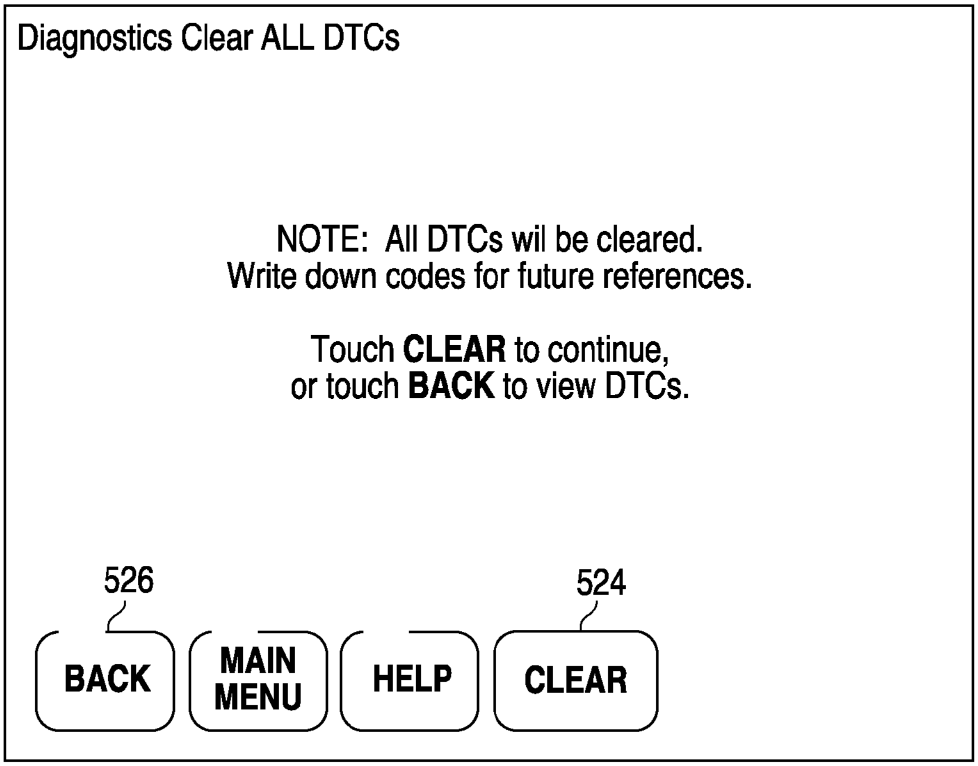
FIG. 70 shows a "diagnostics clear all DTCs" screen displayed in response to selection of the "clear" button in the screen in FIG. 69 so as to notify the user that all of the codes are about to be cleared and require the selection of a "clear" button in FIG. 70 to initiate the clearing.

FIGS. 3-70 illustrate exemplary screens for display on the touch screen 12 of device 10. It should be appreciated that the screens shown in FIGS. 3-70 are exemplary only. The implementation of the display screens and menus selectively displayed to a user in a software program is well within the skill of one of ordinary skill in the art.

FIG. 3 shown an exemplary main menu 30 displayed on the touch screen 12 of the device 10 which prompts the user to select one of the provided program functions including performance tuning, drag strip, dynamometer, engine monitor, diagnostics, and vehicle/owner information. Menu 30 as seen in FIG. 3 displays a performance tuning button 800, drag strip button 700, dynamometer button 900, vehicle/owner information button 400, engine monitor button 500, and diagnostics button 600 for selecting the corresponding program. The program functions are also referred to herein as programs or modes.

Figure 4:
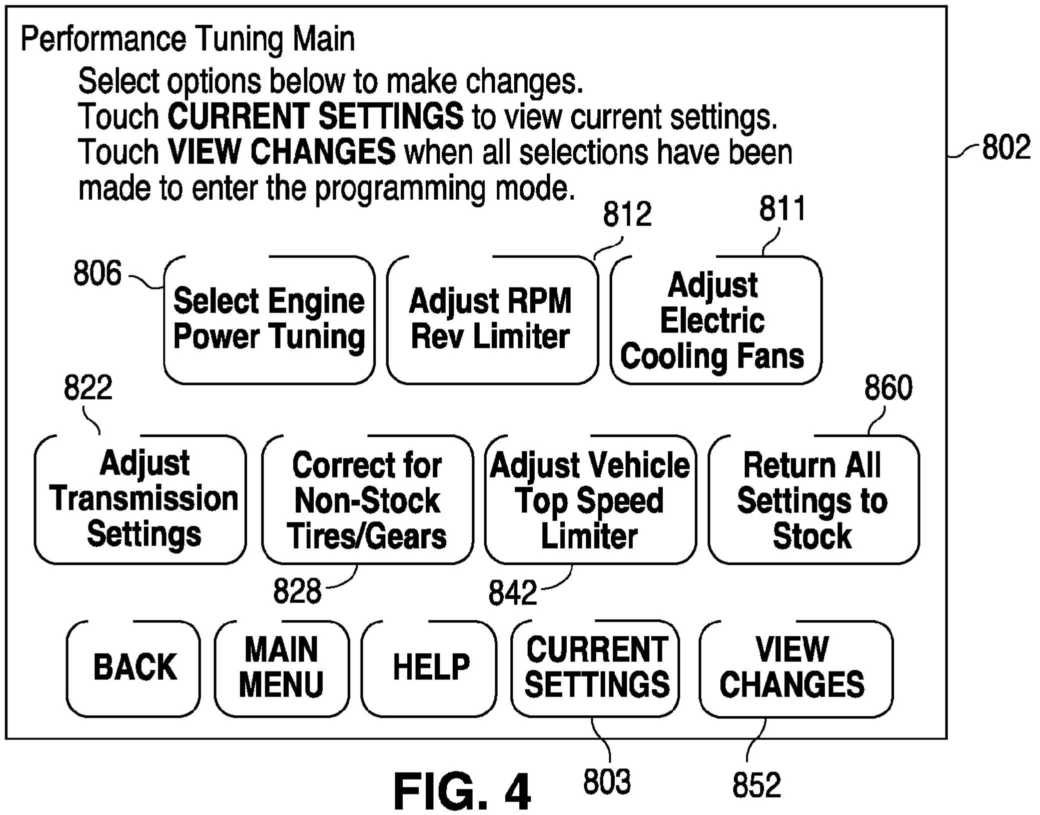
FIG. 4 shows an exemplary performance tuning main menu displayed in response to selection of the Performance Tuning program shown in FIG. 3.

FIGS. 4-17 show exemplary screens displayed by the device 10 of FIGS. 1 and 2 for the performance tuning program. FIG. 4 shows an exemplary "performance tuning main" screen 802, also referred to as menu 802, as displayed on the touch screen 12 of the device 10 in response to selection of the performance tuning button 800 shown in FIG. 3. As seen in FIG. 4, the menu 802 displays a plurality of user selectable buttons. Regarding general navigation buttons included throughout the exemplary screens, the "back" button is preferably provided to return the user to the previously viewed screen, the "main menu" button is preferably provided to return the user to the main menu screen corresponding to the current program/mode. A "help" button is preferably provided to enable display of a help screen (not shown) for providing help information for the current screen.

Figure 5:
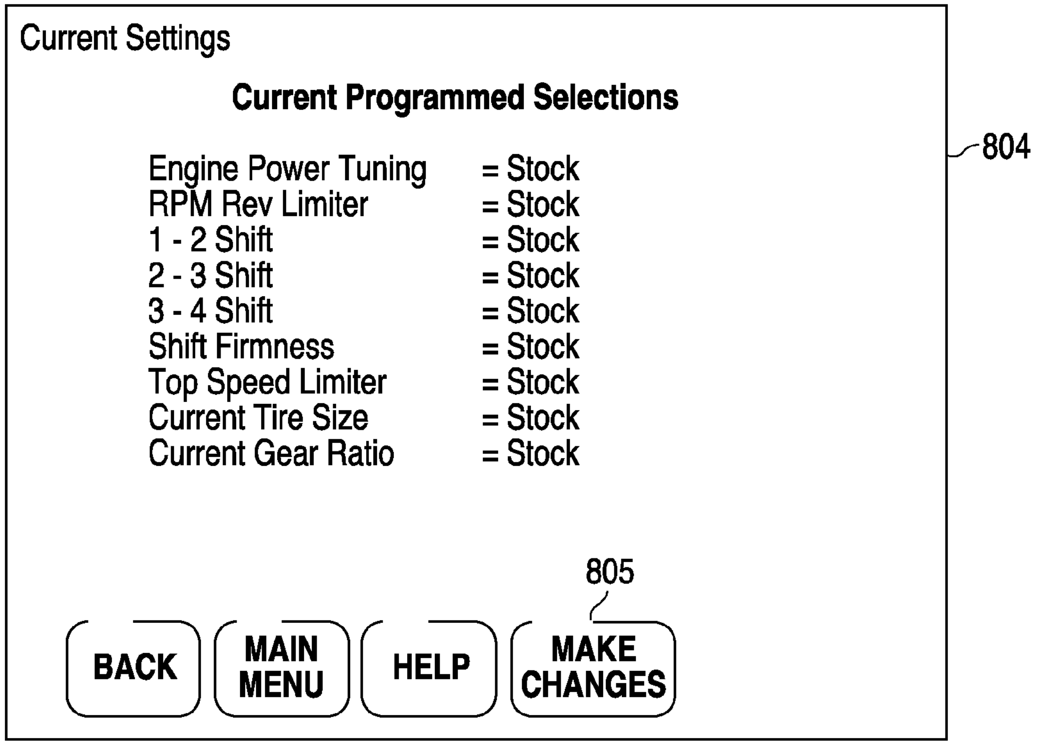
FIG. 5 shows a current settings screen in is displayed in response to selection of the "current setting" button in the menu in FIG. 4.
Figure 6:
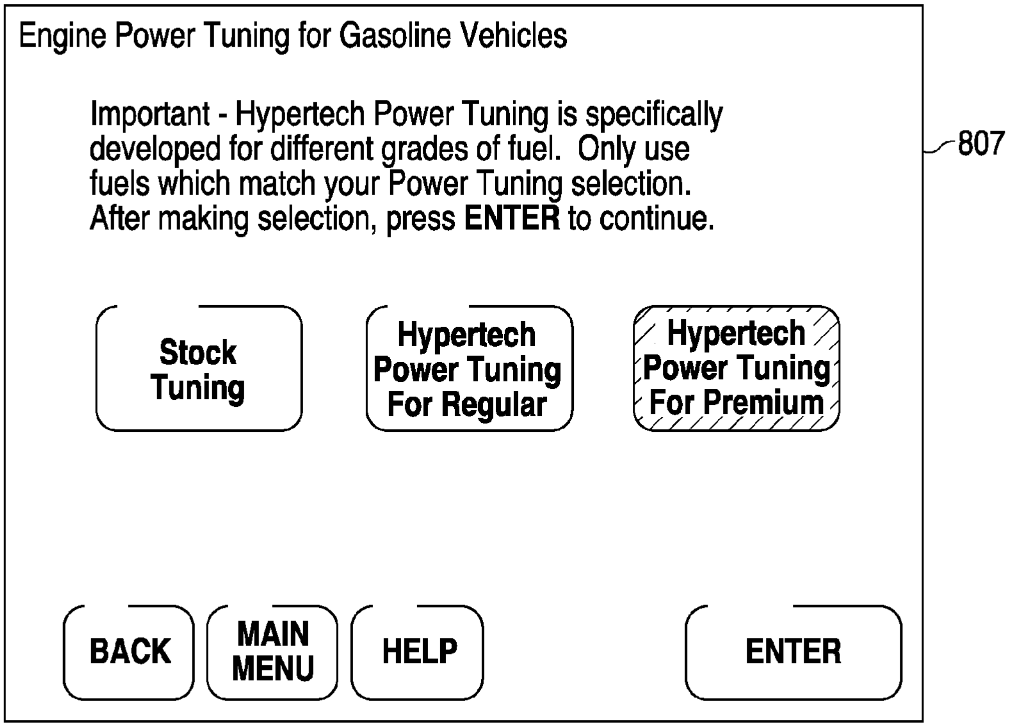
FIG. 6 shows a screen displayed in response to selection of the "select engine power tuning" button in the menu in FIG. 4 for a gasoline vehicle setting.

Current settings screen 804 in FIG. 5 is displayed in response to selection of the "current setting" button 803 in menu 802 in FIG. 4. The "current settings" menu displays a list of what is currently programmed in the vehicle's computer. All performance settings are preferably set to their stock value the first time that the device 10 is connected to the vehicle.

Figure 7:
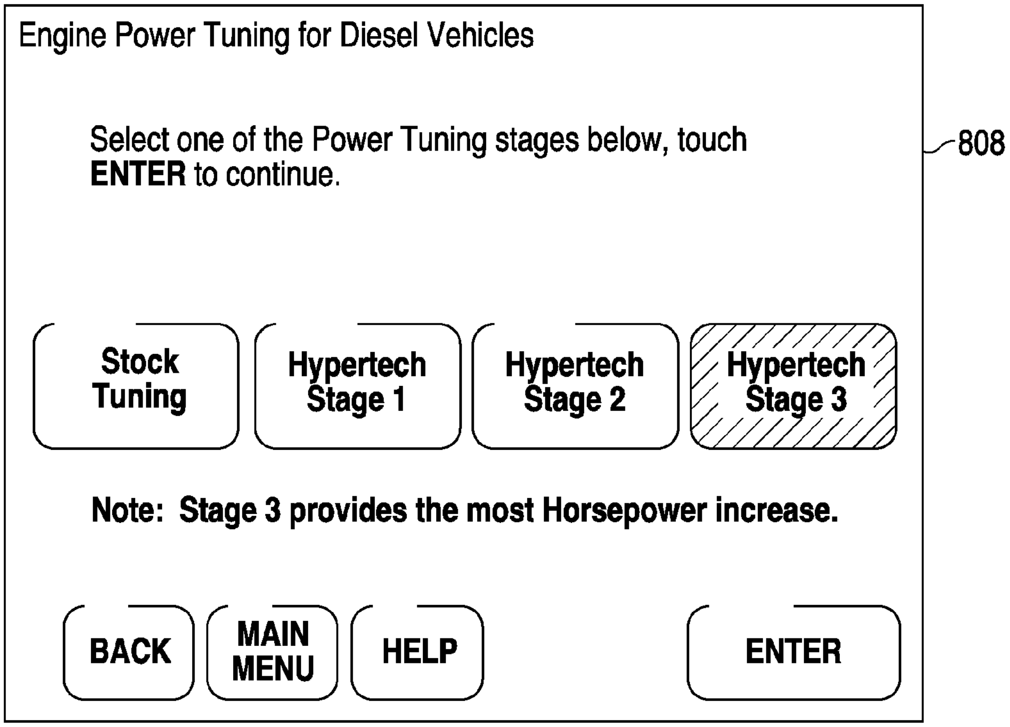
FIG. 7 shows a screen displayed in response to selection of the "select engine power tuning" button in the menu in FIG. 4 for a diesel vehicle setting.

Selection of the "make changes" button 805 in FIG. 5 causes a return to the "performance tuning main" menu 802 to enable selection of the option that the user may wish to modify. A respective screen 807 in FIG. 6 or screen 808 in FIG. 7 is displayed in response to selection of the "select engine power tuning" button 806 in menu 802 in FIG. 4, depending on whether a gasoline or diesel vehicle has been selected, respectively, during setup (not shown). Dual fuel engine tuning is preferably provided for both regular and premium for vehicles that were originally designed to run on regular low octane fuel. Screen 807 allows selection of regular or premium fuel setting. Regarding the engine power tuning for diesel vehicles in screen 808 in FIG. 7, diesel tuning is offered in three different stages to match individual driving styles, with Stage 3 providing the maximum horsepower and torque increases.

Figure 8:
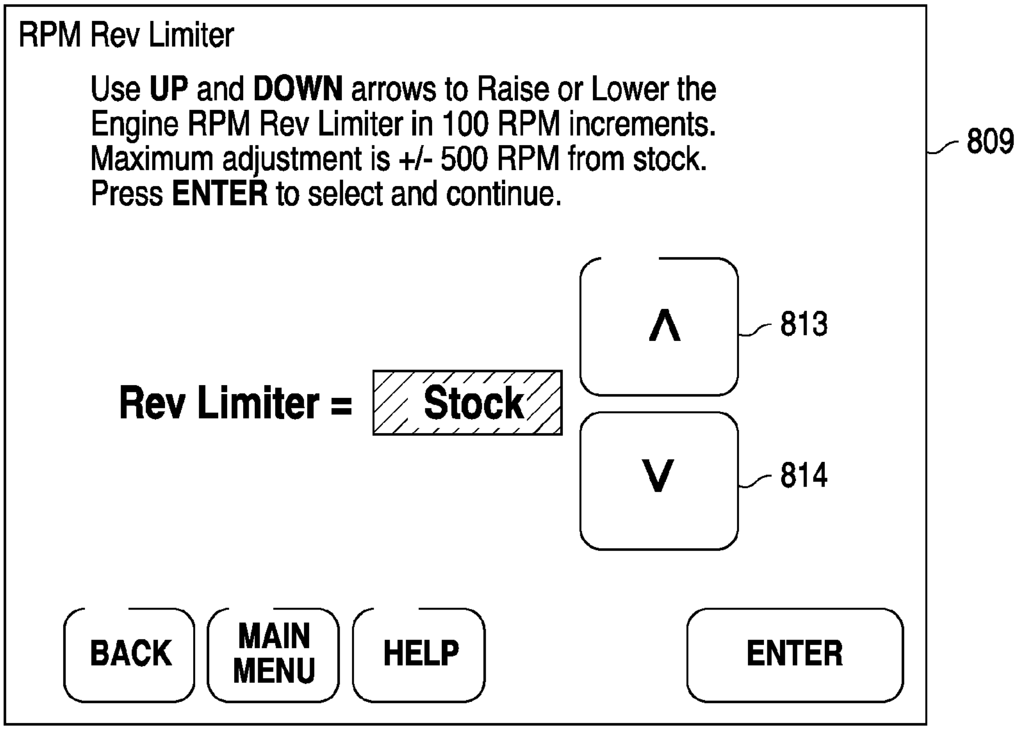
FIG. 8 shows an exemplary "RPM rev limiter" menu displayed in response to selection of the "adjust RPM rev limiter" button in FIG. 4.

FIG. 8 shows an exemplary "RPM rev limiter" menu 809 displayed on the touch screen 12 of the device 10 in response to selection of the "adjust RPM rev limiter" button 812 in FIG. 4. Up arrow 813 and down arrow 814 are provided on menu 809 to enable increase or decrease of the RPM rev limiter setting, preferably in 100 RPM increments.

Figure 9:
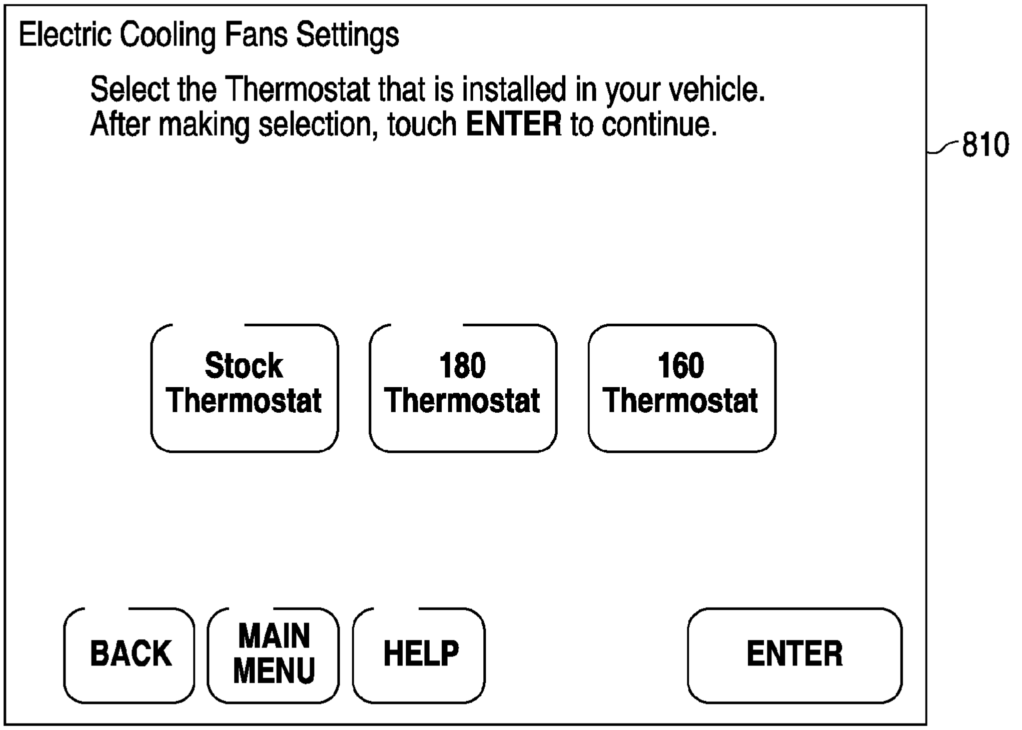
FIG. 9 shows an exemplary "electric cooling fan setting" menu displayed in response to selection of the "adjust electric cooling fans" button of FIG. 4.
Figure 10:
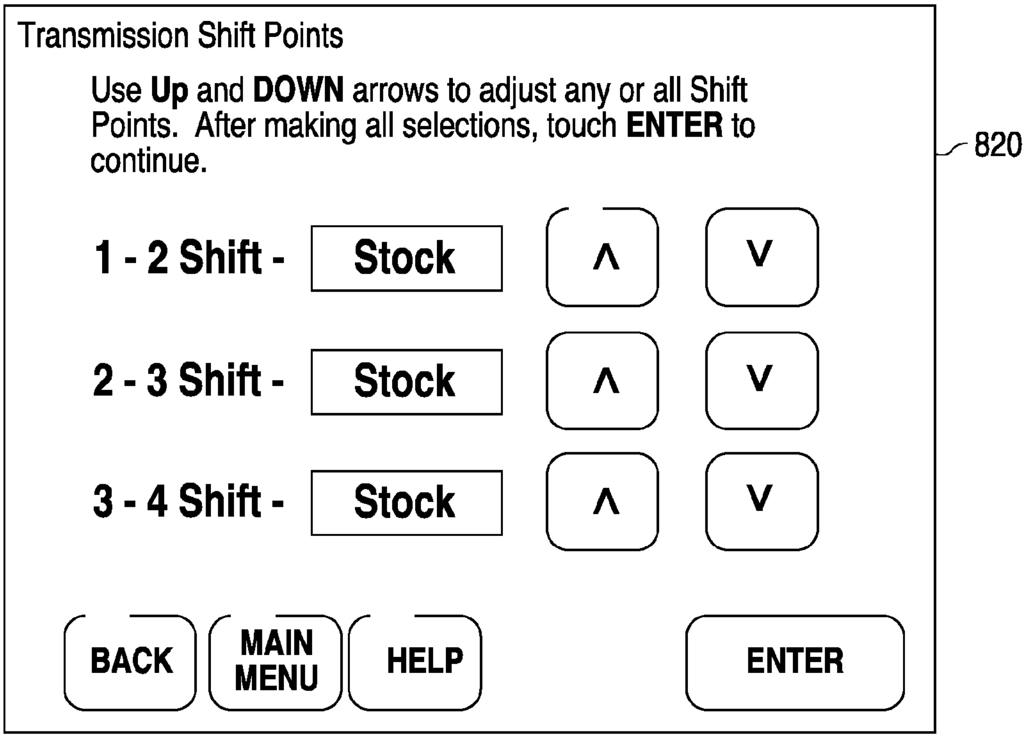
FIG. 10 shows a menu for selecting transmission shift points that is displayed in response to selection of the "adjust transmission setting" button of FIG. 4.
Figure 11:
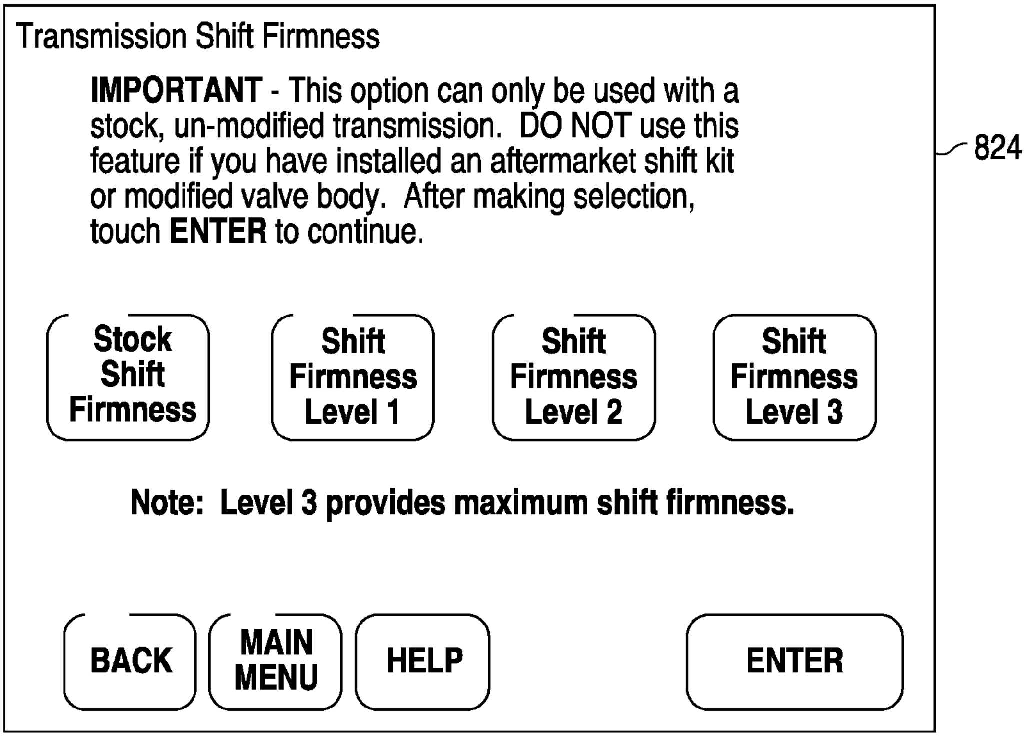
FIG. 11 shows a menu for selecting transmission shift firmness that is displayed in response to selection of the "adjust transmission setting" button of FIG. 4.

FIG. 9 shows an exemplary "electric cooling fan setting" menu 810 displayed on the touch screen 12 of the device 10 in response to selection of the "adjust electric cooling fans"

button 811 of FIG. 4. In response to selection of one of the lower temperature thermostats in menu 810, the system will adjust the electric cooling fan on/off temperatures for the new thermostat rating.

For electronically controlled transmissions, the device 10 allows adjustment of the vehicle's shift points and the transmission shift firmness. In response to selection of the "adjust transmission setting" button 822 of FIG. 4, adjustments to the transmission shift points, using menu 820 in FIG. 10, and transmission shift firmness, using menu 824 in FIG. 11, can be selected.

Figure 12:
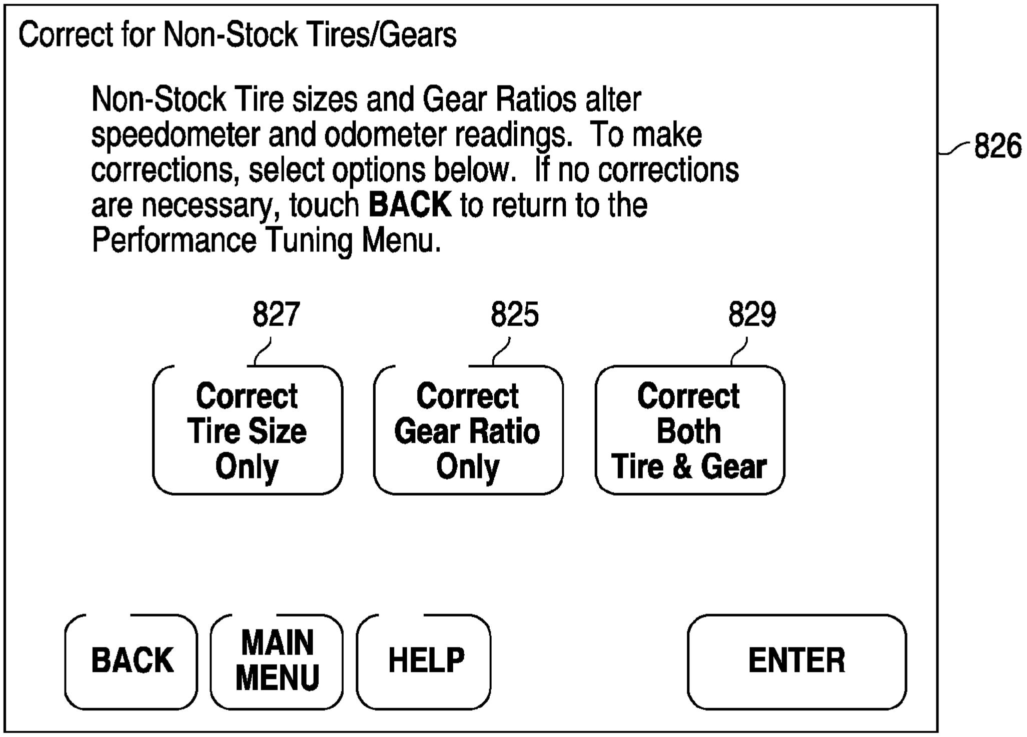
FIG. 12 an exemplary "correct for non-stock tires/gears" menu displayed in response to selection of the "correct for non-stock tires/gears" button of FIG. 4.
Figure 13:
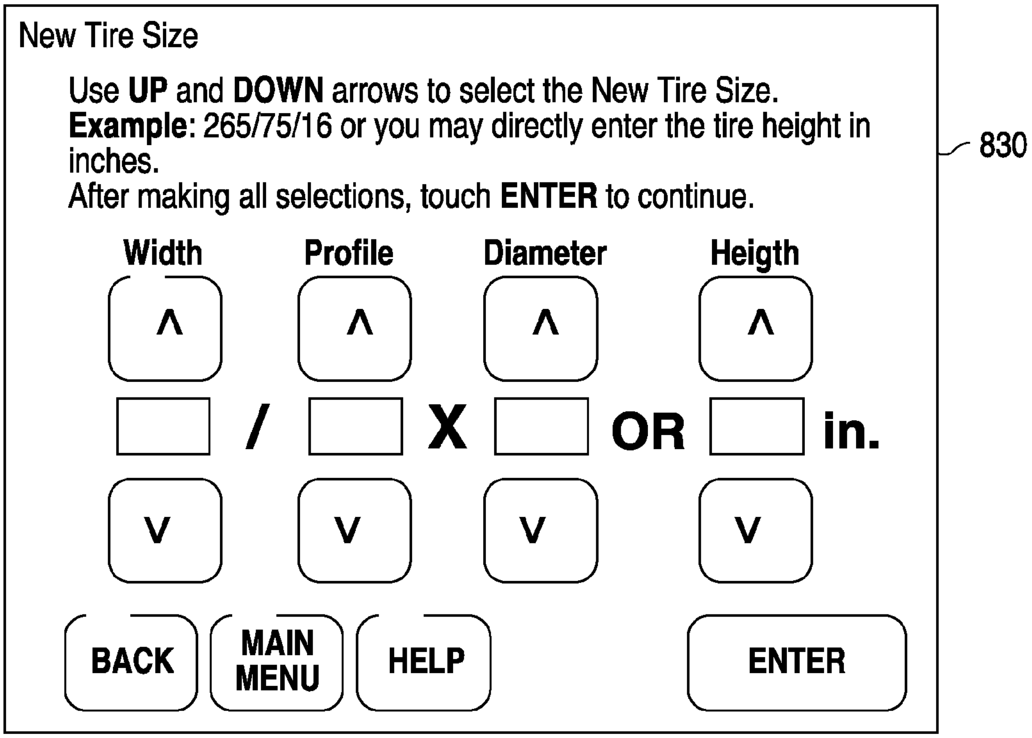
FIG. 13 shows a menu displayed in response to selection of the "correct tire size only" button for selecting a new tire size.
Figure 14:
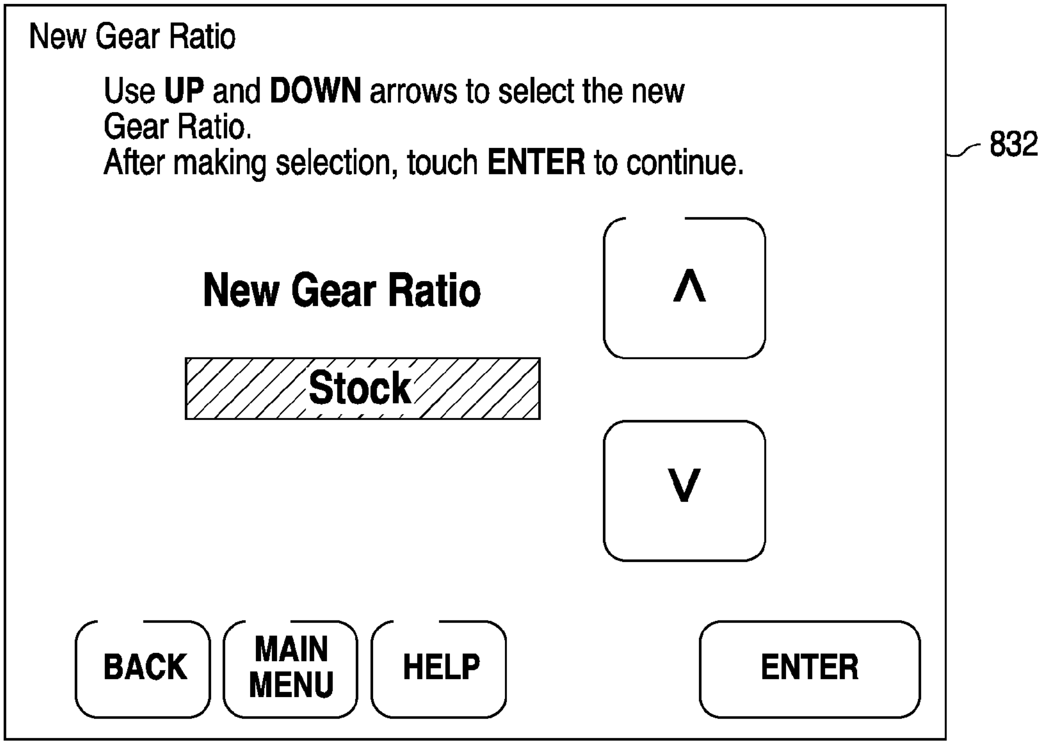
FIG. 14 shows a menu displayed in response to selection of the "correct gear ratio only" button for selecting the gear ratio.
Figure 15:
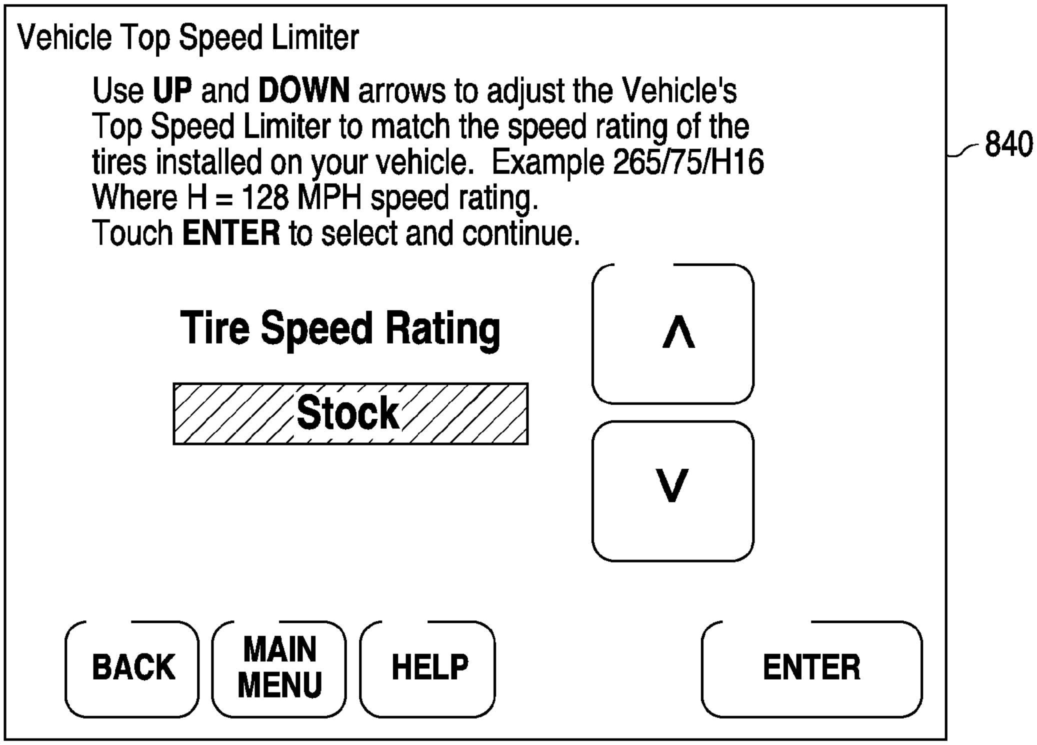
FIG. 15 shows an exemplary "vehicle top speed limiter" adjustment menu to enable a user to select the speed ratings of tires in response to selection of the "adjust vehicle top speed limiter" button 842 of FIG. 4.

FIG. 12 shows an exemplary "correct for non-stock tires/gears" menu 826 displayed on the touch screen 12 of the device 10 in response to selection of the "correct for non-stock tires/gears" button 828 of FIG. 4. In response to selection of the "correct tire size only" button 827, a new tire size selection can be made using menu 830 shown in FIG. 13. In response to selection of the "correct gear ratio only" button 825 in FIG. 12, the gear ratio selection can be made using menu 832 shown in FIG. 14. Selection of the "correct both tire & gear" button 829 of FIG. 12 causes menus 830 and 832 to be displayed, one after the other, to enable the selection of both the tire size and gear ratio. The system enables a user who has changed the tire height or rear axle gear ratio to enter the change and in response, have the system correct the speedometer and odometer readings (as required by Federal law), and also resynchronize transmission shift points for vehicles equipped with electronically controlled transmissions. FIG. 15 shows an exemplary "vehicle top speed limiter" adjustment menu 840 to enable a user to select the speed ratings of tires in response to selection of the "adjust vehicle top speed limiter" button 842 of FIG. 4.

Figure 16:
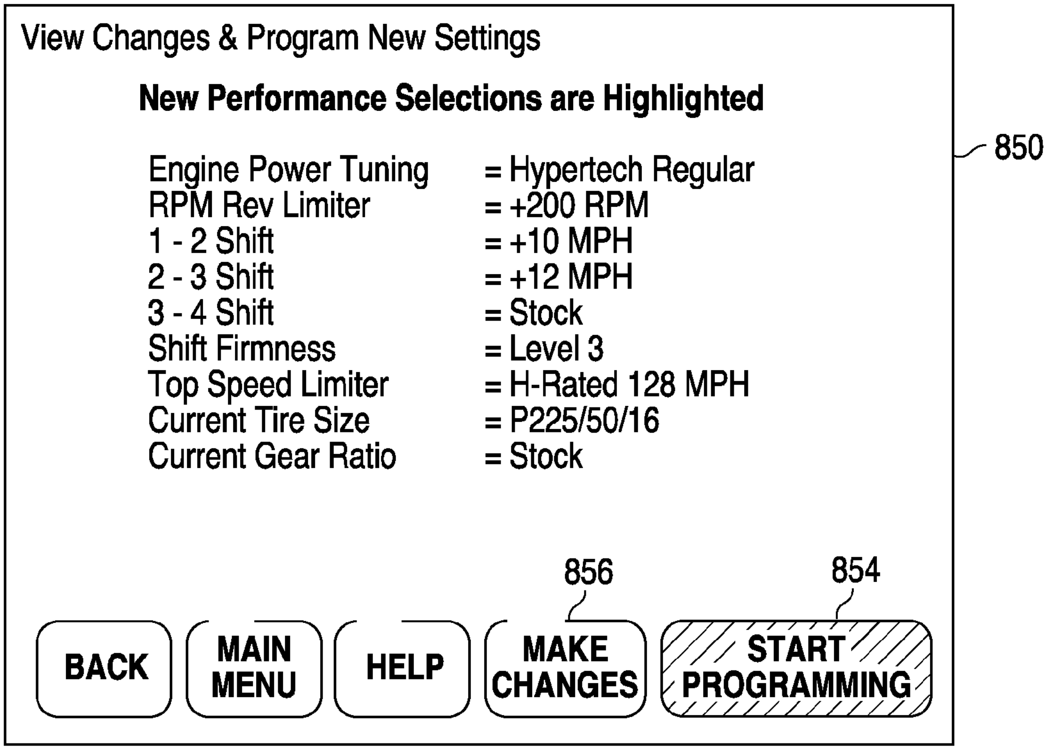
FIG. 16 shows an exemplary "view changes & program new settings" menu displayed in response to selection of a "view changes" button of FIG. 4.

FIG. 16 shows an exemplary "view changes & program new settings" menu 850 displayed on the touch screen 12 of the device 10 in response to selection of a "view changes" button 852 of FIG. 4. Selection of the "view changes" button 852 enables a user to view a complete list of all of the changes before reprogramming the vehicle. A user can indicate that all of the changes are correct via selection of a "start programming" button 854 which causes the programming process to begin. A "make changes" button 856 is provided on screen 850 to enable a user to make more changes before programming the vehicle.

Figure 17:
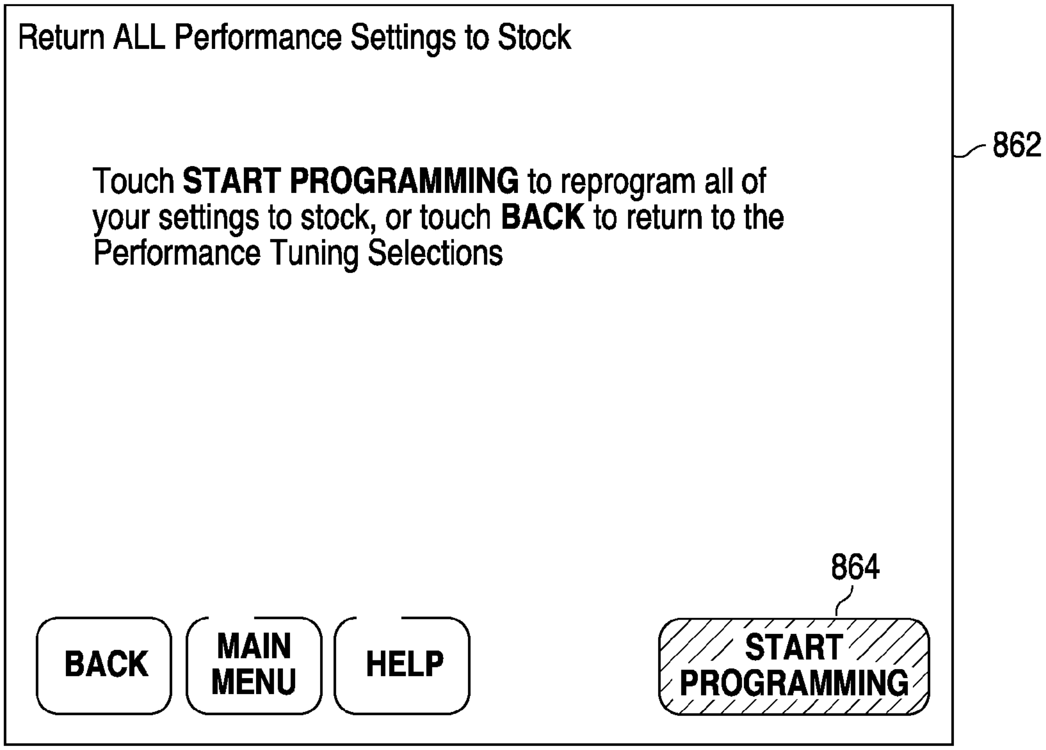
FIG. 17 shows an exemplary "return all performance settings to stock" menu displayed in response to selection of the "return all setting to stock" button of FIG. 4.

FIG. 17 shows an exemplary "return all performance settings to stock" menu 862 displayed on the touch screen 12 of the device 10 in response to selection of the "return all setting to stock" button 860 of FIG. 4. In response to selection of "start programming" button 864, all performance tuning features will be reset to the original stock program stored in memory.

Figure 18:
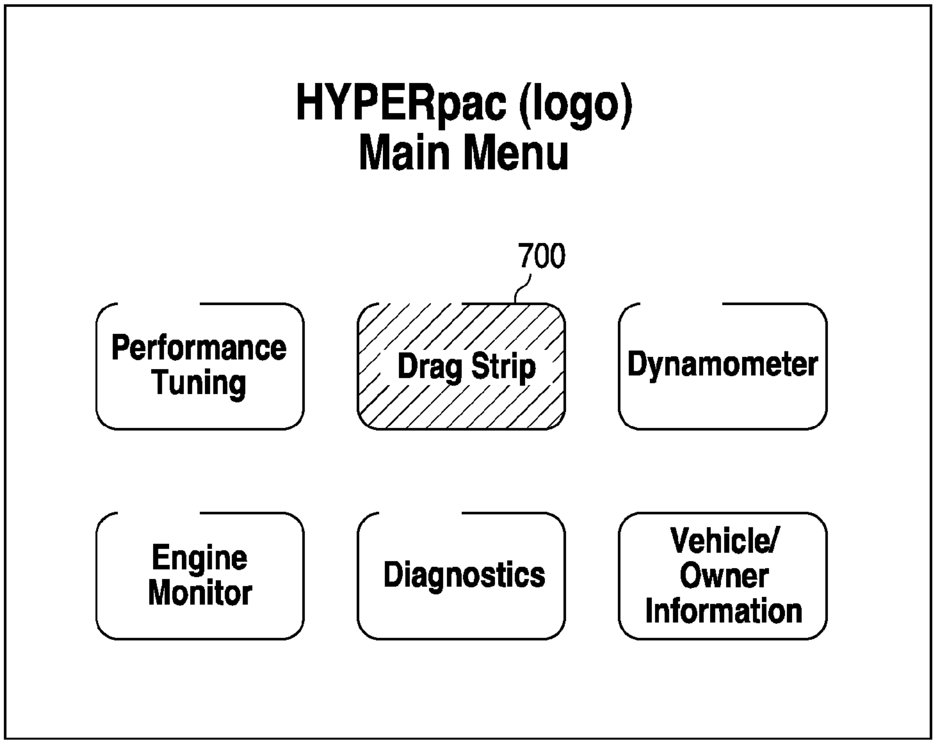
FIG. 18 shown the main menu of FIG. 3 with the drag strip button highlighted after its selection.
Figure 19:
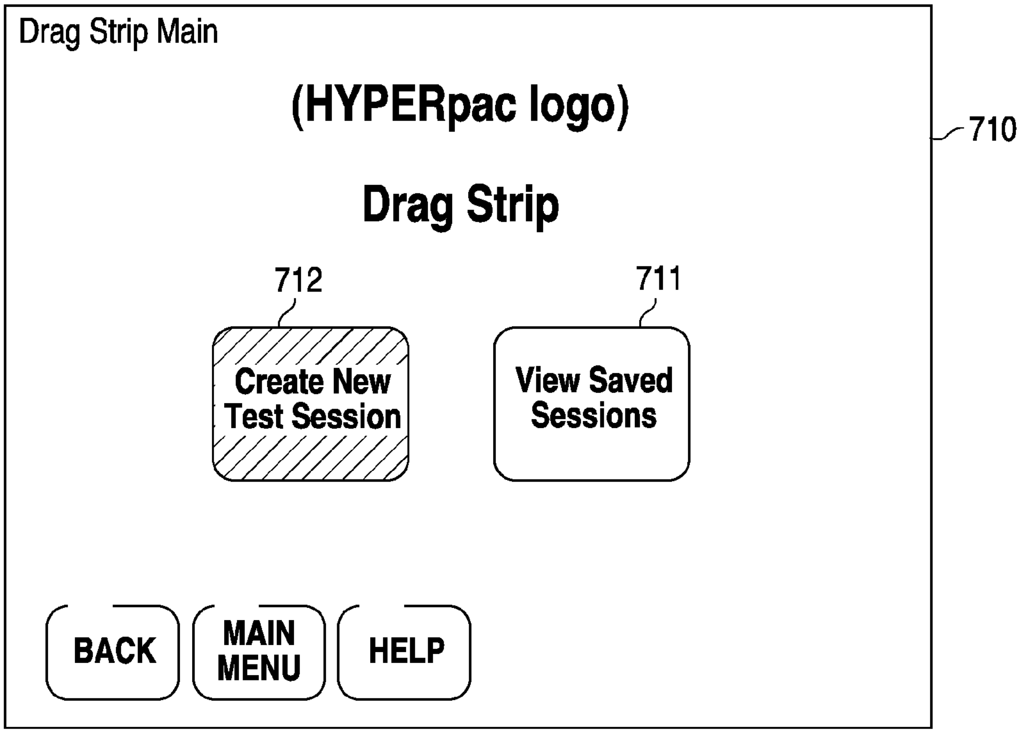
FIG. 19 shows an exemplary "drag strip main" menu displayed in response to selection of the drag strip button.

FIG. 18 shown the main menu 30 of FIG. 3 with the drag strip button 700 highlighted after its selection. FIGS. 19-37 show exemplary screens displayed by the device 10 for the drag strip program. FIG. 19 shows an exemplary "drag strip main" menu 710 displayed on the touch screen 12 of the device 10 in response to selection of the drag strip button 700. With a real "Christmas tree" start, the drag strip program according to an embodiment of the present invention allows a user to measure vehicle performance and produces an exact duplication of a drag strip time slip, with reaction times, 60 ft, 330 ft, ⅛th mile, 1000 ft, and ¼ mile speeds and E.T.s (estimated times.) In addition to getting all of the standard time slip information, every run preferably automatically generates a "magazine style" road test with acceleration measurements of zero to 10 mph, 20 mph, 30 mph, and continuing in ten mph (miles-per-hour) increments until the user lets off the accelerator. A detailed drive wheel horsepower chart and graph, and data acquisition report are provided for each test run to provide the user with the vehicle's operating conditions during the test. For convenience, each run is preferably automatically saved so a user can go back and review the results at a later time.

When the drag strip program is first entered from the main menu, screen 710 in FIG. 19 is displayed for allowing creation of new test sessions or review of any saved test sessions. According to a preferred embodiment, the device 12 groups and stores multiple runs within individual test sessions. Preferably, each test session is automatically named by the date on which it is performed. Any additional sessions performed on the same day are preferably indicated by the number that appears after the underscore on the far right-hand of the session name. Example 1: (Session 01/01/2005_1 run#5 of 5) indicates the fifth run of the first test session performed on Jan. 1, 2005. Example 2: (Session 01/01/2005_2 run#1 of 1) indicates the first run of the second session performed on Jan. 1, 2005; Preferably, the session name and run # will always be displayed in the upper right hand corner of the screen.

Figure 20:
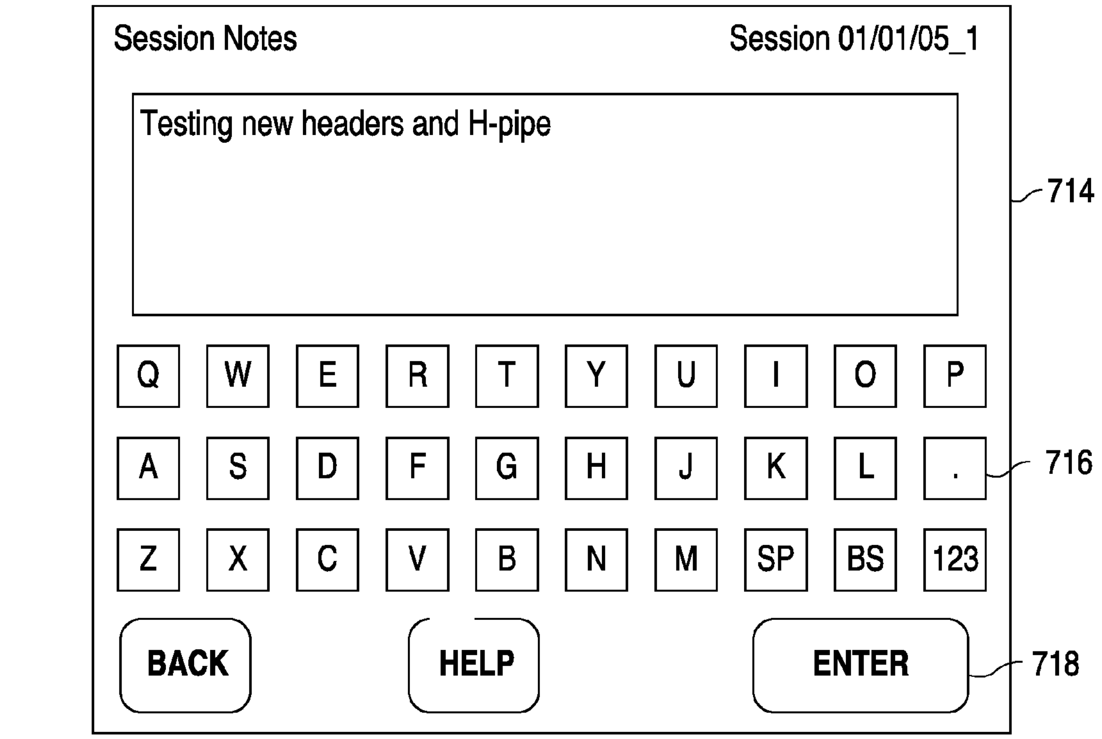
FIG. 20 is displayed to enable the entering of the session notes.

In response to selection of the "create new test session" button 712 on menu 710 in FIG. 19, the session is named with the current date and the "session notes" screen 714 shown in FIG. 20 is displayed to enable the entering of the session notes. Session notes are for keeping track of information that will apply to all of the runs within the current session, i.e., information that will not change between runs, e.g., the current configuration of the vehicle for that test day, example-new cold air kit, new headers, camshaft, etc. Screen 714 includes a keyboard 716 for entering the session notes. A user is not required to enter any session notes and may choose to skip this process by simply pressing the "enter" button 718.

Figure 21:
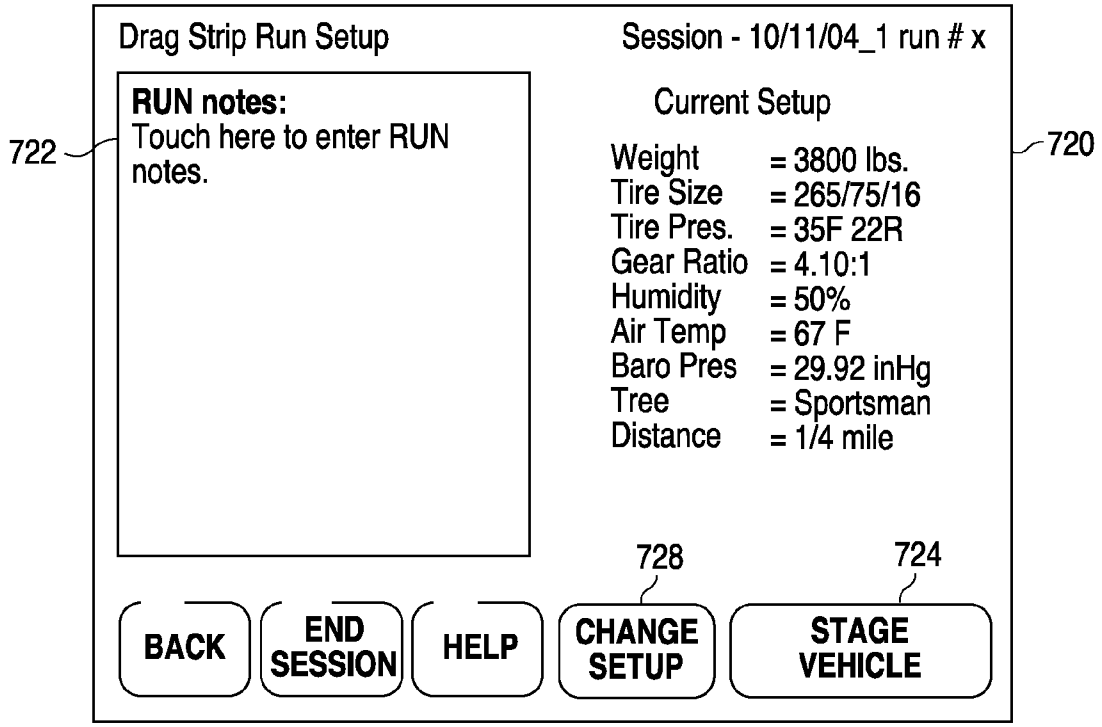
FIG. 21 shows a "drag strip run setup" screen.
Figure 22:
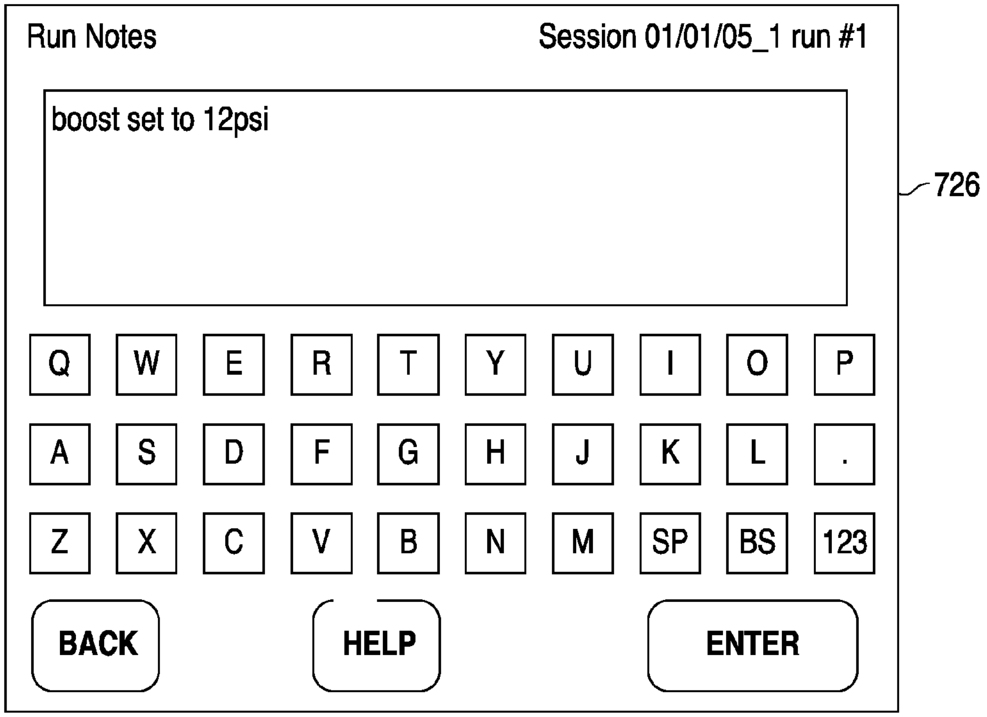
FIG. 22 shows an exemplary "run notes" screen with a keyboard displayed and with notes entered.

Upon completion of typing of the session notes, selection of the "enter" button 718 results in display of the "drag strip run setup" screen 720 in FIG. 21. The "run notes" window 722 is provided for entering data that may change for each individual run, e.g., the level of boost dialed in for the run, or how the user launched the vehicle off of the line. Selection of the "run notes" window 722, causes display of the keyboard display to enter run notes. An exemplary "run notes" screen 726 with a keyboard displayed and with notes entered is shown in FIG. 22.

Screen 720 in FIG. 21 also includes a "change setup" button 728 for changing the settings shown under "current setup" in screen 720. For accurate horsepower and torque measurements, each of the settings shown under current setup must be entered correctly. These settings can be quickly updated before making a run by selecting the "change setup" button 728. Exemplary categories for settings under current setup are weight, tire size, tire pres, gear ratio, humidity, air temp, baro pres, tree type and distance. Weight refers to the "curb" weight of the vehicle as it will be tested and should include any additional weight for fuel, cargo, and the weight of any passengers. Most race tracks have scales to accurately measure the weight of the vehicle as it is to be tested, and this is the best way to ensure the highest level of accuracy for the weight. Alternatively, a vehicle's "curb" weight is typically listed in a vehicle's owner's manual or at the vehicle manufacturer's website. The weight of the fuel is estimated by using the following formulas: for "regular" octane fuel (6.216×# of gallons), and for "premium" fuel use (6.350×# of gallons). The "tire size" and "gear ratio" settings should reflect what is currently installed on the vehicle. "tire pres" refers to the current inflation pressure of the driving tires. The humidity setting is set to a default value of 50%, but for the highest level of accuracy a user should enter the current humidity for the location. "Air temp" indicates the current ambient (outside) temperature in degrees Fahrenheit or Celsius (the unit of measure is determined by the global setting in the vehicle/owner information). "Baro pres" indicates the current barometric pressure as measured in inches of mercury. "Tree" indicates the type of drag strip "Christmas" tree that is currently selected. The present invention allows selection to be setup for either the standard "sportsman" or "pro" tree configurations. "Distance" indicates the setting for an ⅛ mile or ¼ mile drag strip.

Figure 23:
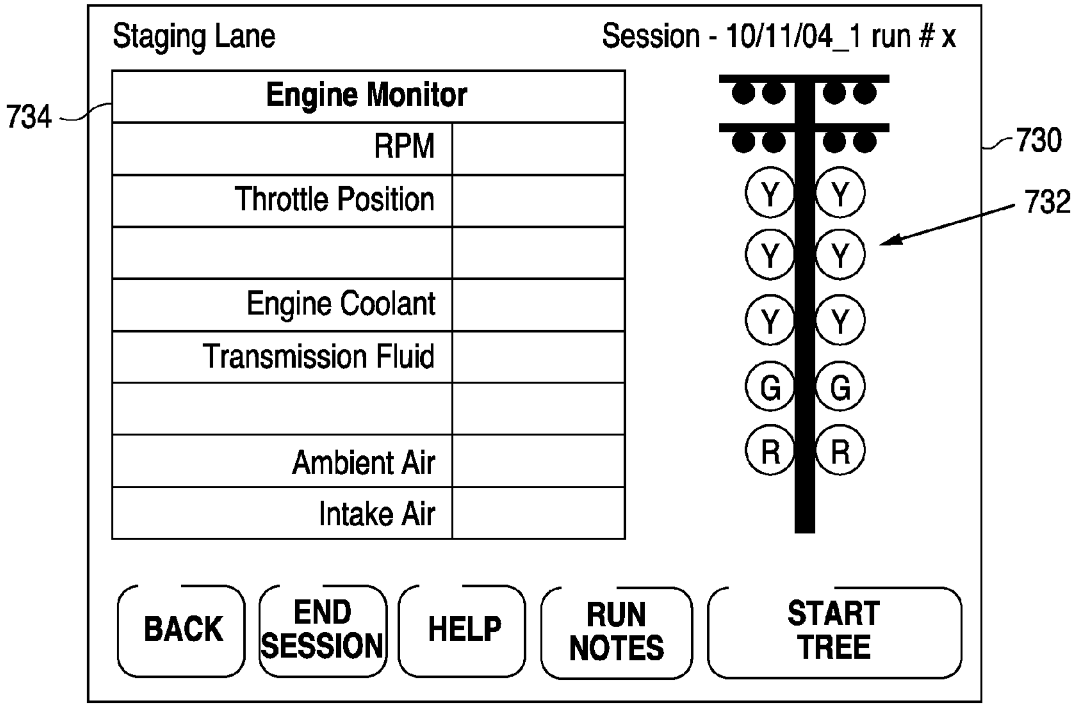
FIG. 23 shows a "staging lane" screen.

A user can go straight to the "staging lane" screen 730 in FIG. 23, with or without entering run notes, by selecting the "stage vehicle" button 724 in FIG. 21. In response to selection of the "stage vehicle" button 724, the "staging lane" screen 730 will display the selected type of drag strip "Christmas" tree, e.g., 732 on the right hand side of FIG. 23. An "engine monitor" window 734 is displayed preferably on the left hand side for showing important operating conditions. The items shown in the "engine monitor" window can vary depending on vehicle year, make, and model.

Exemplary procedures, instructions for the user, and resultant display in FIG. 23 for the drag strip run is describe in further detail as follows. Initially, the user is to bring the vehicle to a complete stop positioned on the starting line. With the brake pedal depressed, the user is to raise the engine RPM to the desired speed at which the user wants to leave the starting line. When staged and ready to make a run, the user is to select start tree. In response, the first stage light will come on. The second stage light will come on after the device 10 verifies that the vehicle is not in motion. The tree will begin one second after the second stage light comes on. Audible tones will sound in 0.5 second intervals with each yellow light and then a slightly longer tone for the green light. The standard "Sportsman" tree is the default setting. If the user selects the "Pro" tree, all three Ⓨ (yellow) lights will come on simultaneously one second after the second staging light comes on. The Ⓖ (green) and Ⓡ (red) lights operate as the same in both modes. For greater accuracy and consistency between runs, the user should monitor the "engine monitor" window 734 to view the real-time data conditions and start each run with the same operating temperatures.

Figure 24:
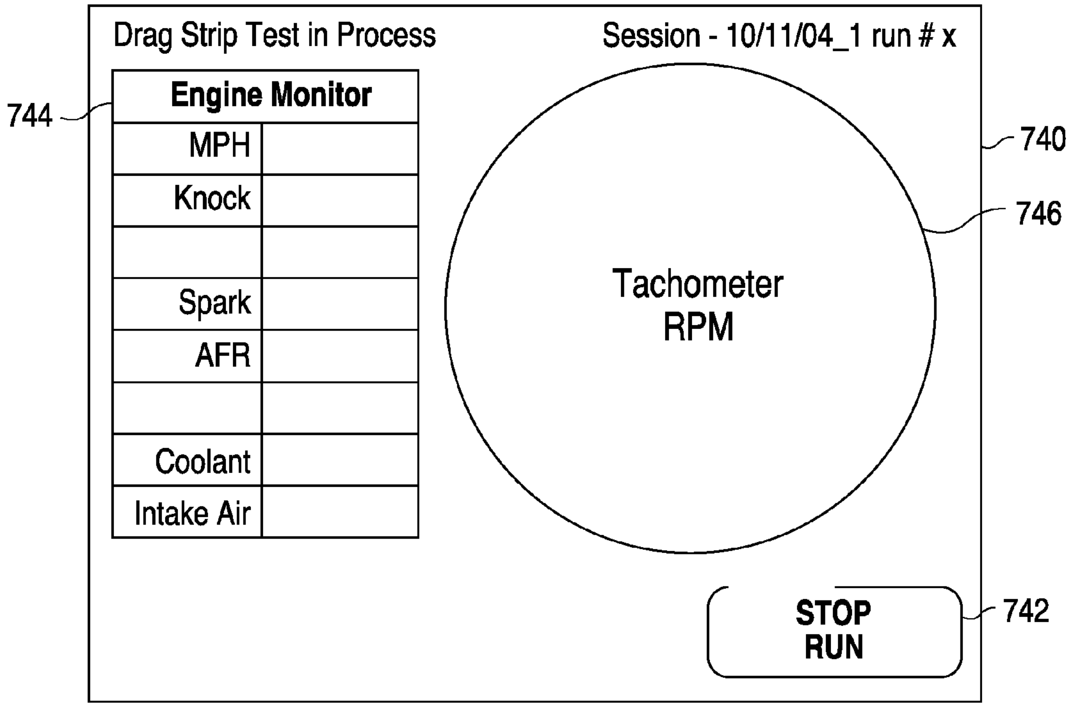
FIG. 24 shows a screen that includes an "engine monitor" readings window and a large tachometer displayed in response to the vehicle leaving the starting line.
Figure 25:
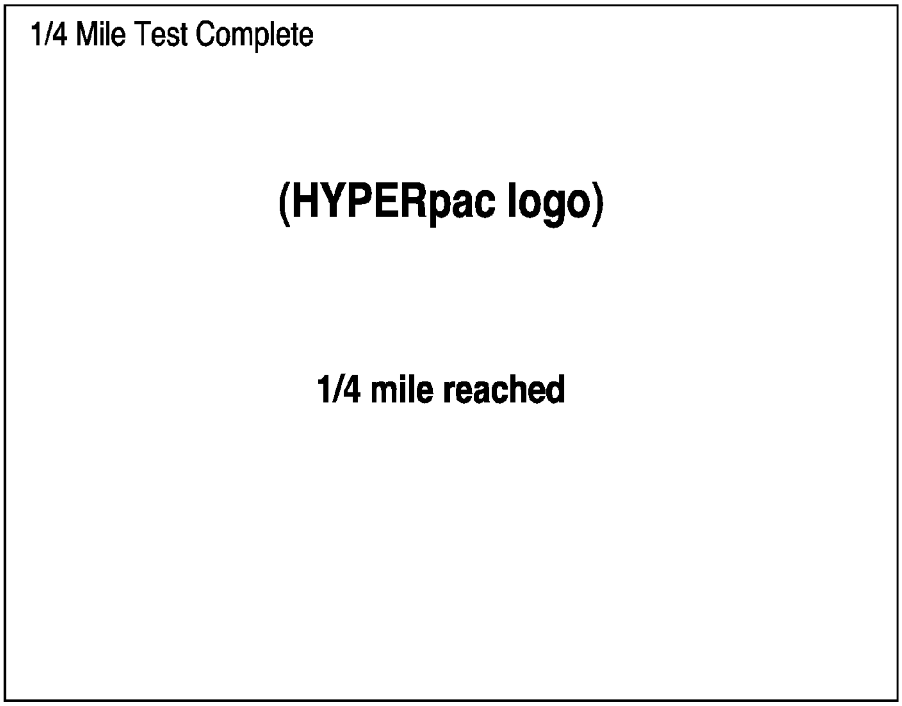
FIG. 25 shows an exemplary screen that indicates that the quarter-mile mark has been reached.
Figure 26:
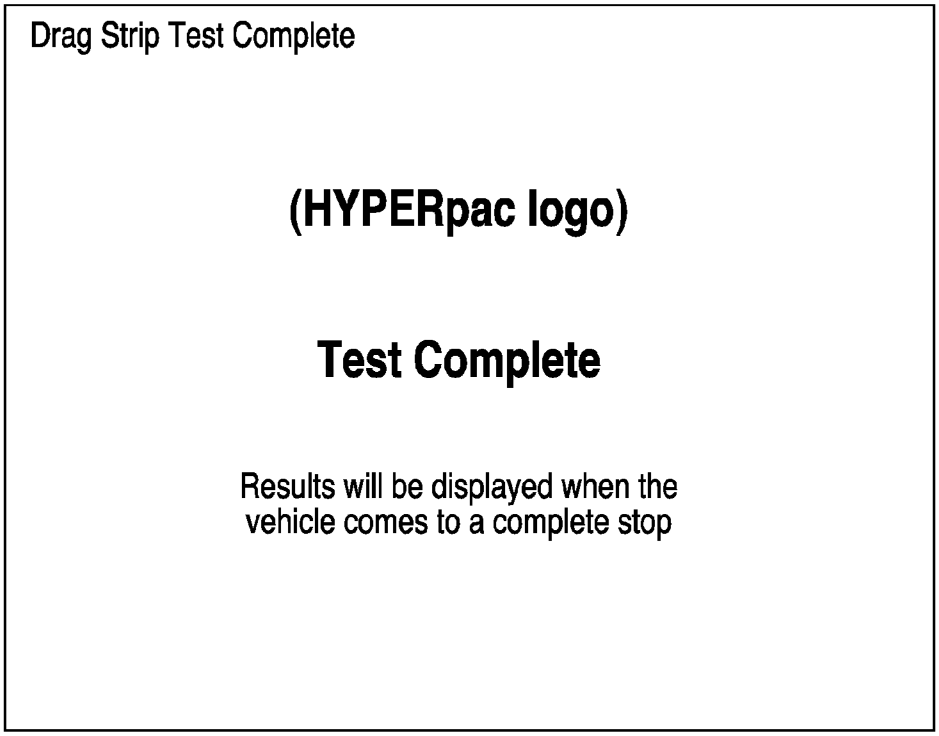
FIG. 26 shows a "drag strip test complete" screen indicating completion.

The device 10 will switch to a screen 740 in FIG. 24 displaying an "engine monitor" readings window 744 and a large tachometer 746, in response to the vehicle leaving the starting line. In response to selection of a "stop run" button 742, the run is aborted. Preferably, the device 10 emits three brief audible tones to signal the user that the quarter-mile (or eighth-mile) mark has been reached. The device 10 preferably includes circuitry for generating the audio tones - such circuitry for portable devices is well known in the art. FIG. 25 shows an exemplary screen that indicates that the quarter-mile mark has been reached. FIG. 26 shows a "drag strip test complete" screen indicating completion, however, for safety reasons, test results are preferably not displayed until the vehicle comes to a complete stop.

During each test run the device 10 records all of the data and automatically processes it into user-friendly reports for easy reviewing by the user, so the user can easily review the test results. FIGS. 27-31 show exemplary test result screens. From any of these report screens, a "new run" button is provided to enable a user to exit and get ready for another run. All of the tests are automatically saved and can be viewed by selecting "view saved sessions" button 711 from the "drag strip main" menu 710 in FIG. 19.

Figure 27:
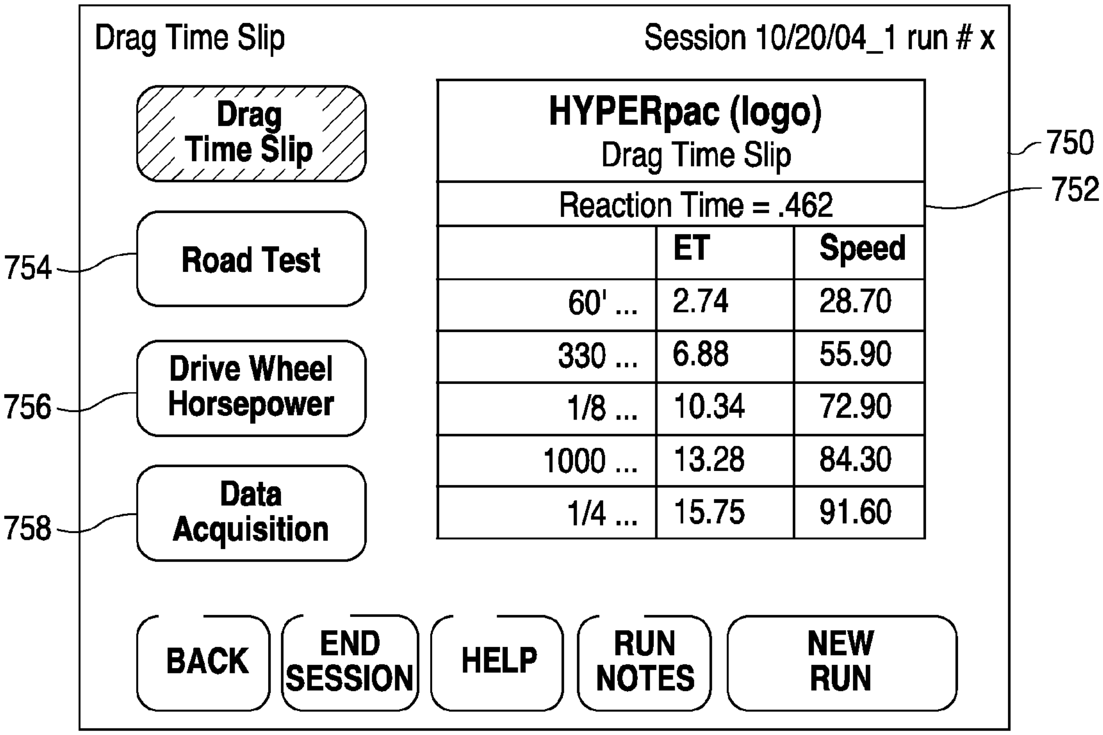
FIG. 27 shows an exemplary "drag time slip" screen first displayed after detecting that the vehicle has come to a complete stop.
Figure 28:
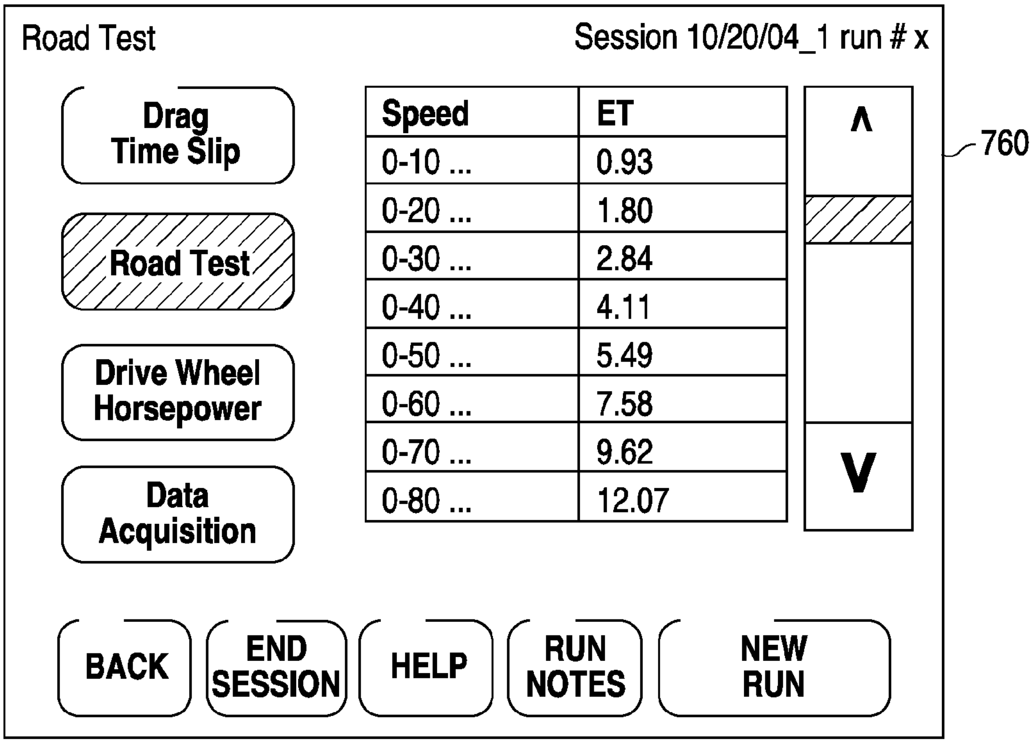
FIG. 28 shows a "road test" screen showing acceleration times from zero in ten mile-per-hour increments.
Figure 29:
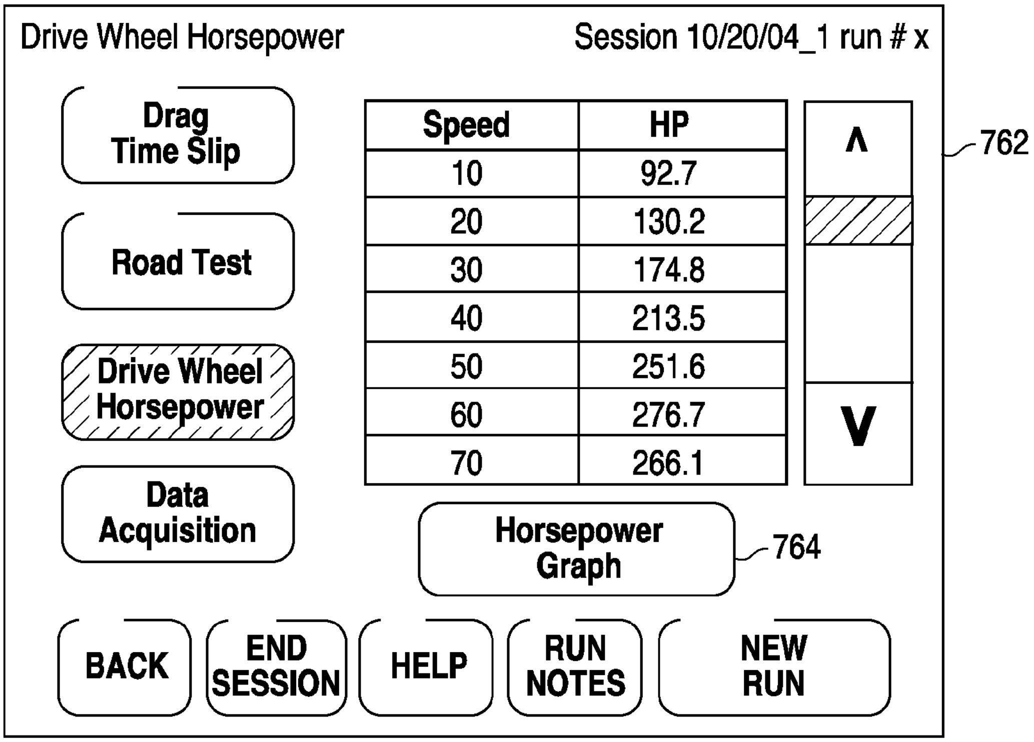
FIG. 29 shows a "drive wheel horsepower" screen that displays the horsepower at the rear wheels vs. vehicle speed.
Figure 30:
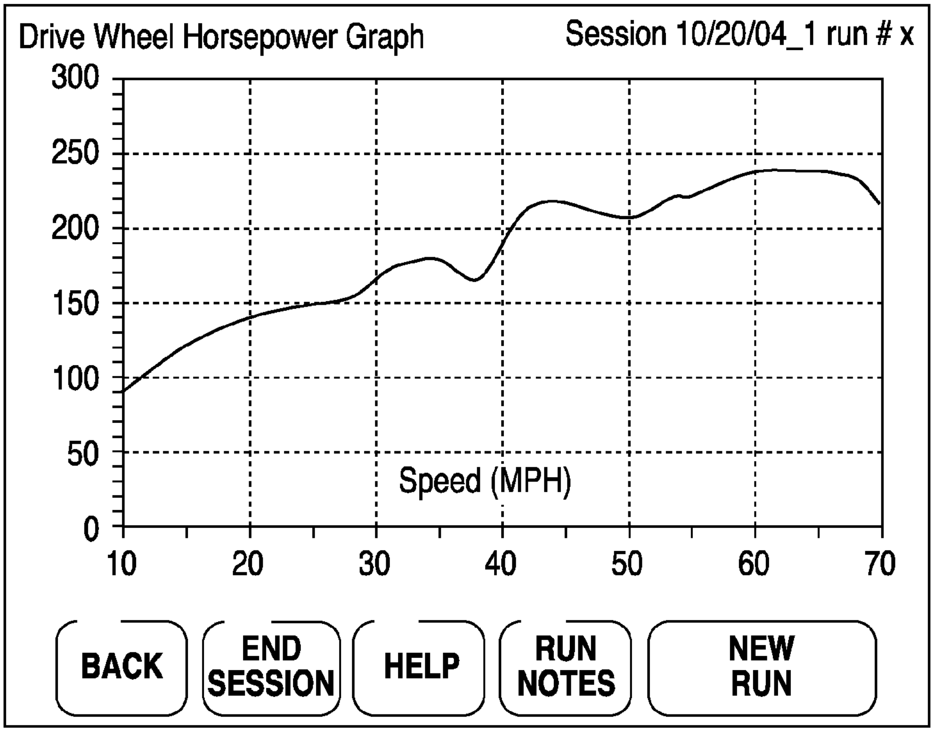
FIG. 30 shows a display of horsepower results in a graphic format.

In the examples shown in FIGS. 27-29, the menu screens include "drag time slip", "road test", "drive wheel horsepower", and "data acquisition" buttons for enabling a user to request the corresponding displays shown in FIGS. 27-29, and 31. FIG. 27 shows an exemplary "drag time slip" screen 750 first displayed after the device 10 detects that the vehicle has come to a complete stop. The "drag time slip" window 752 replicates a time-slip a user would get at an actual track and includes reaction time and elapsed times (ETs) and speeds at 60 ft, 330 ft, ⅛th mile, 1000, and ¼ mile.

Figure 31:
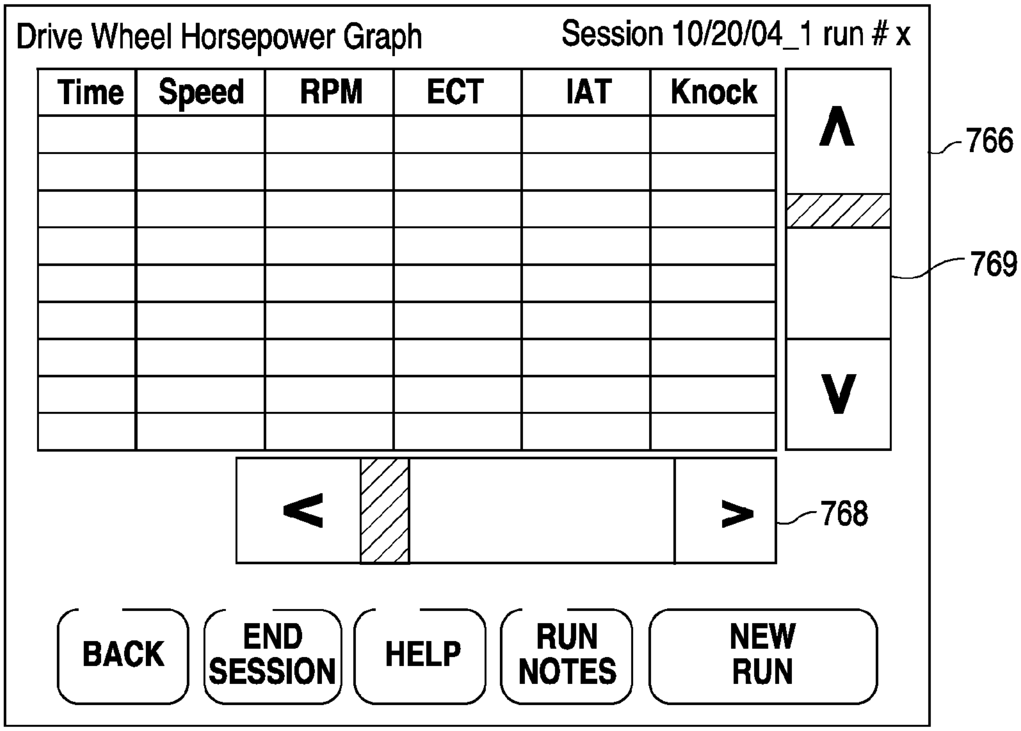
FIG. 31 shows a "data acquisition" screen showing a report of the operating conditions recorded during the test run.

In response to selection of the "road test" button 754, a "road test" screen 760 in FIG. 28 is displayed showing acceleration times in 10 mile-per-hour increments from zero until the user lets off the accelerator. In response to selection of the "drive wheel horsepower" button 756 in FIG. 27, a "drive wheel horsepower" screen 762 in FIG. 29 is displayed showing the horsepower at the rear wheels vs. vehicle speed. The results are corrected to the standard temperature and pressure (STP) standard, for ambient temperature, barometric pressure, and humidity. A "horsepower graph" button 764 is provided on screen 762 to enable viewing of the horsepower results in a graphic format, as shown in the example in FIG. 30. In response to selection of the "data acquisition" button 758 in FIG. 27, a "data acquisition" screen 766 in FIG. 31 is displayed showing a report of the operating conditions recorded during the run. Horizontal scroll bar 768 and vertical scroll bar 769 are provided on screen 766 to enable the user to evaluate the operating conditions referenced to time during the run.

Figure 32:
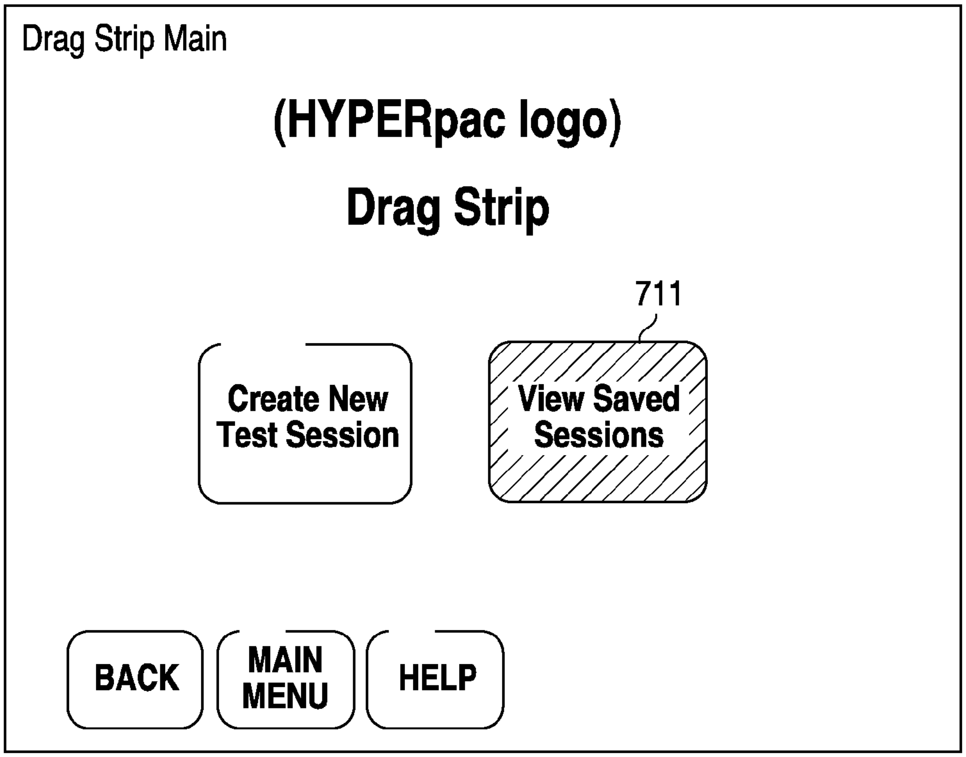
FIG. 32 shows the "drag strip main" menu with "viewed saved sessions" button highlighted in response to its selection.
Figure 33:
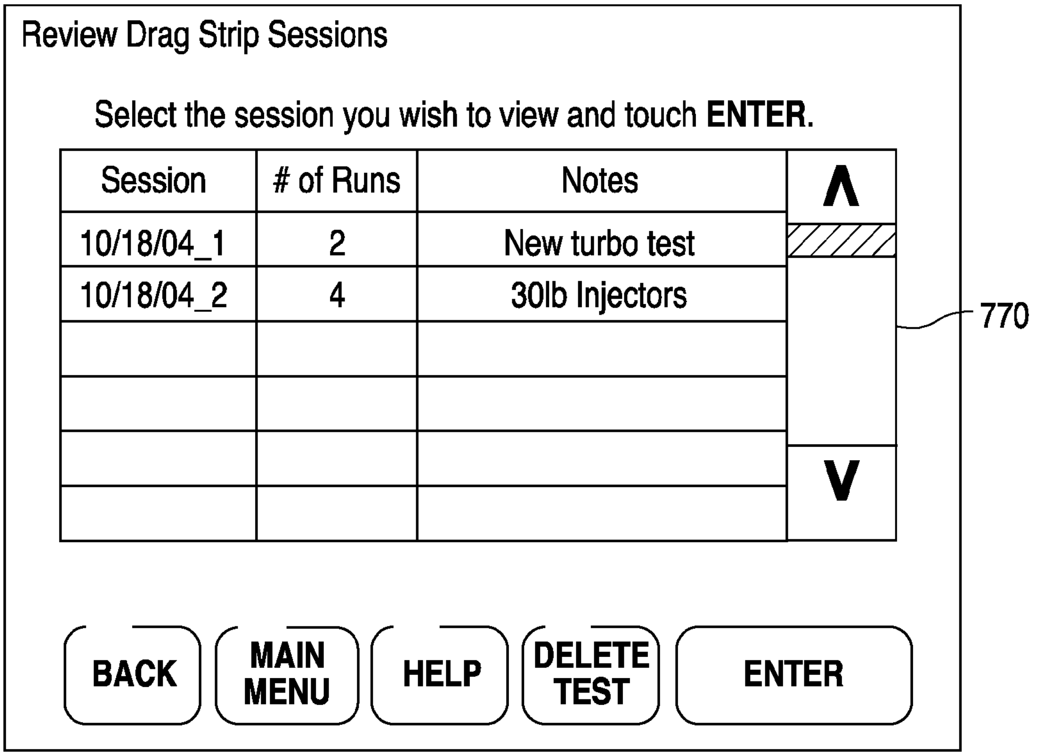
FIG. 33 shows a "review drag strip sessions" screen which includes a listing with all of the saved test sessions shown with the session name, number of runs within the session, and a brief snap shot of the session notes.
Figure 34:
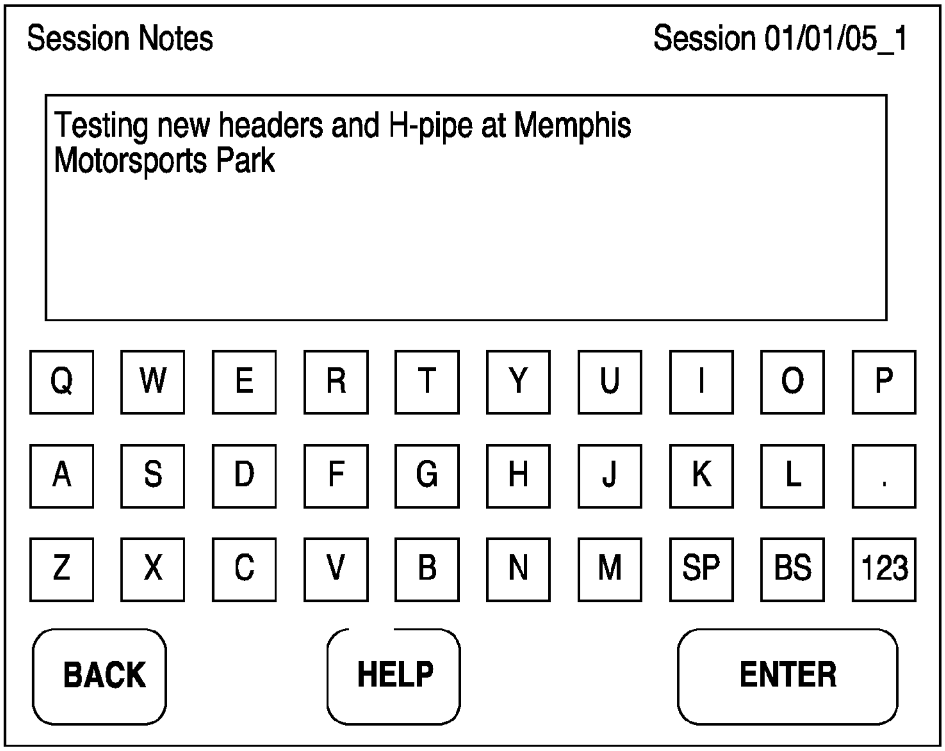
FIG. 34 shows a display of additional session notes for a selected session.

The device 10 enables a user to view saved sessions. FIG. 32 shows the "drag strip main" menu with "viewed saved sessions" button 711 highlighted in response to its selection. Also, in response to the selection, a "review drag strip sessions" screen shown in FIG. 33 is displayed which includes a listing with all of the saved test sessions shown with the session name, number of runs within the session, and a brief snap shot of the session notes. A vertical scroll bar 770 is provided to enable a user to move a highlight to a desired session and then select an "enter" button. In response thereto, additional session notes for the selected session are displayed, for example, as seen in FIG. 34.

Figure 35:
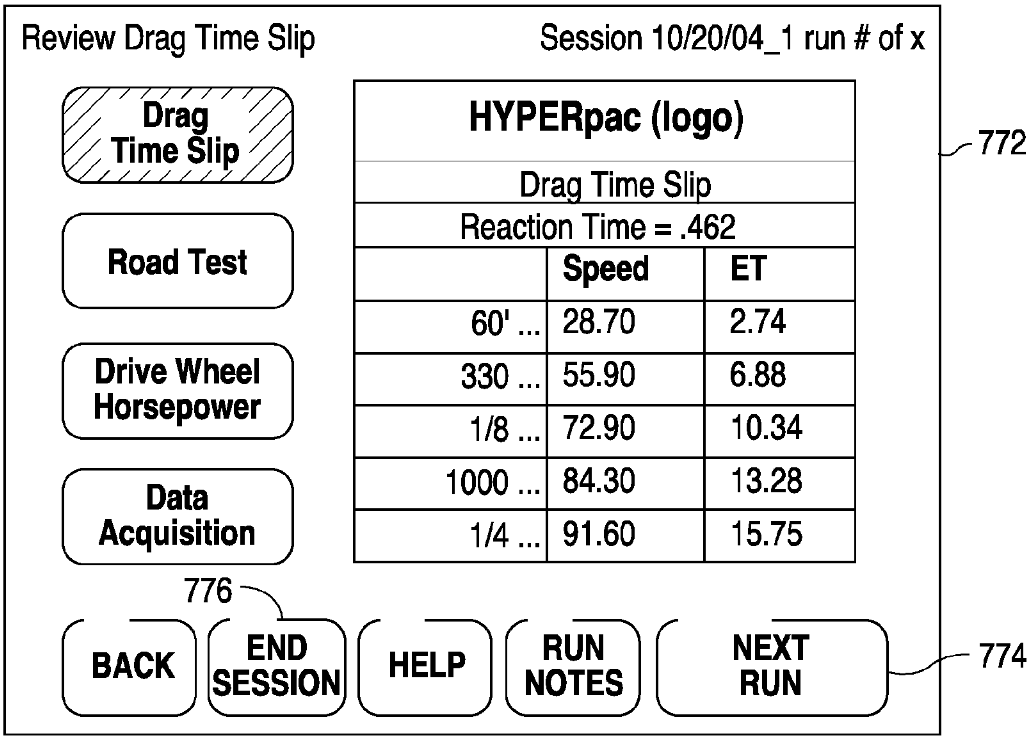
FIG. 35 shows a "review drag time slip" screen displayed in response to selection of a test session to review from the display in FIG. 33.

In response to selection of a test session to review from the display in FIG. 33, a "review drag time slip" screen 772 in FIG. 35 is shown. Screen 772 is similar to the active test run "drag time slip" screen 750 in FIG. 27, except that the "new run" button in FIG. 27 has been replaced by the "next run" button 774 in FIG. 35. In response to selection of the "next run" button 774, the report is shown for the following test run. For example, if the user made three runs in a test session and is only interested in the drag time slip information shown in FIG. 35, the user can simply select a drag time slip report, e.g., via the screen shown in FIG. 36, for one run, and then use the "next run" 774 button in FIG. 35 to jump to the time slip for the other runs within that session. The session ID and run number are located in the upper right hand corner of the screen to indicate which run is currently displayed. Similarly, other reports shown on the left side of FIG. 35, i.e. road test, drive wheel horsepower, and data acquisition, can be viewed by selecting the appropriate button. In response to selection of an "end session" button 776, a return is made to the drag strip program main menu in FIG. 19. Selection of a "run notes" button in FIG. 35 enables update of the run notes in review mode.

Figure 36:
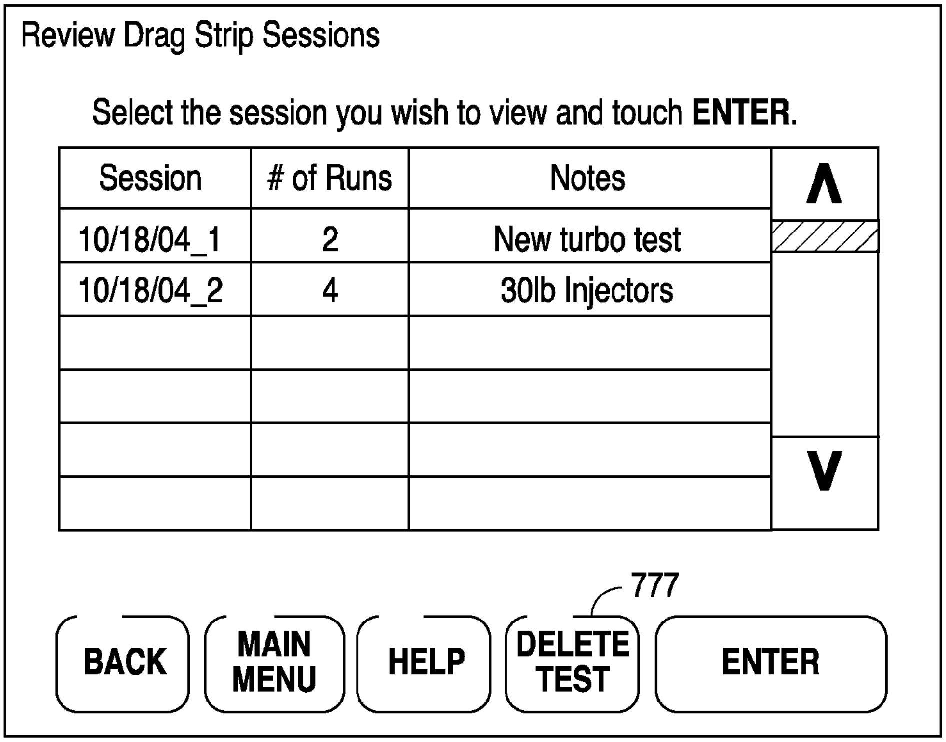
FIG. 36 shows a screen for enabling selection of session for displaying a drag time slip report.
Figure 37:
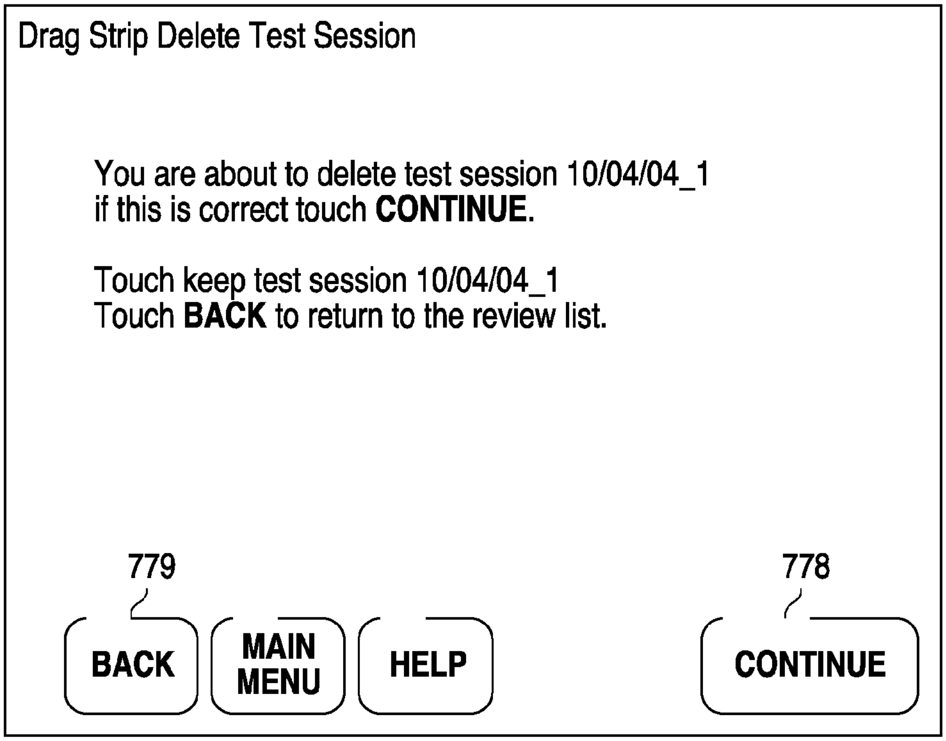
FIG. 37 shows a screen displayed to warn the user that the user is about to delete a test session.

The device 10 enables a user to delete a test session shown in the review screen in FIG. 36 by selecting the "delete test" button 777. In response, the screen shown in FIG. 37 is displayed to warn the user that the user is about to delete a test session and to give the user the option to select a "continue" button 778 or "back" button 779 to keep the session and return to the review.

Figure 38:
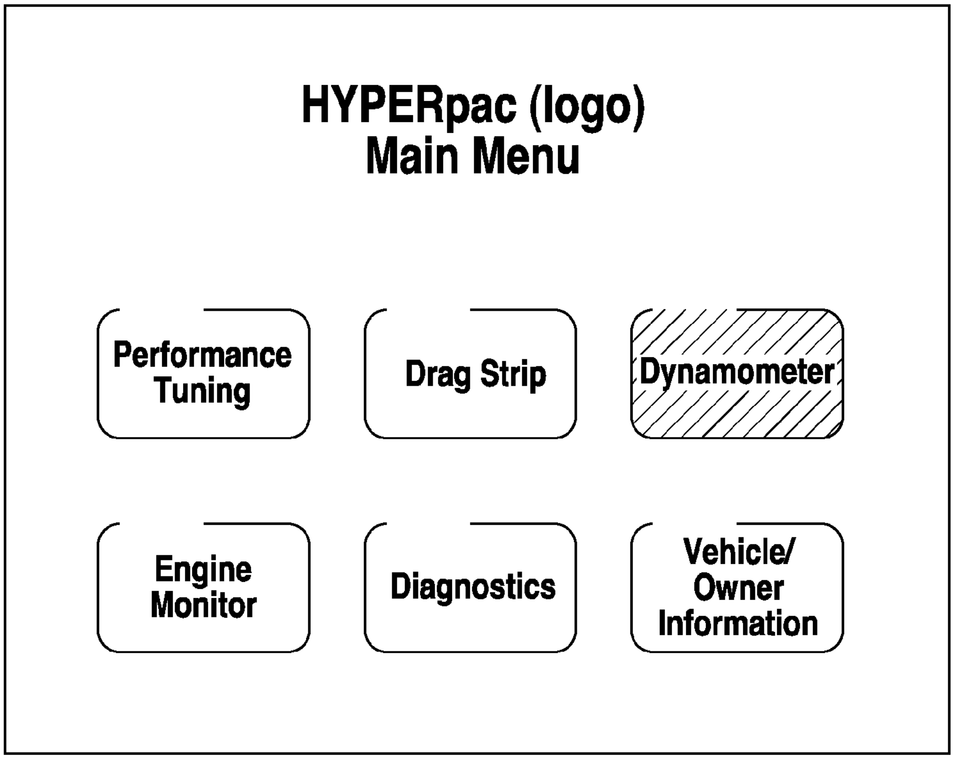
FIG. 38 shows the main menu of FIG. 3 with the "dynamometer" program button highlighted indicating its selection.
Figure 39:
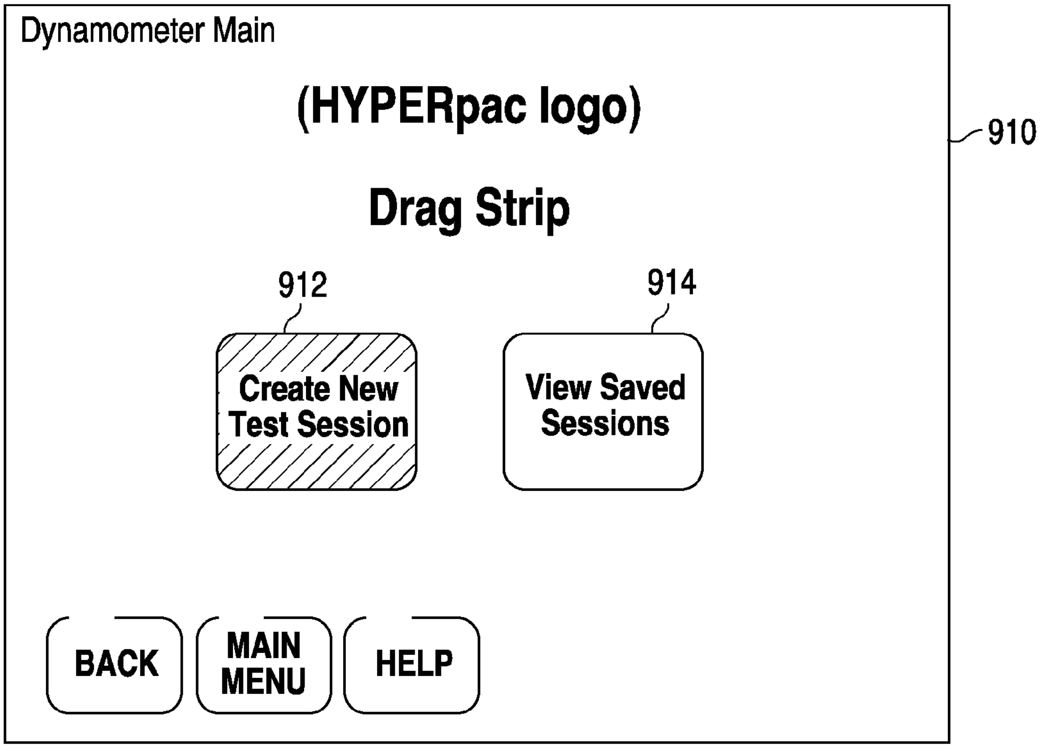
FIG. 39 shows an exemplary "dynamometer main" menu displayed in response to selection of the dynamometer button in FIG. 3.

FIG. 38 shows the main menu of FIG. 3 with the "dynamometer" program button 900 highlighted indicating its selection. FIGS. 39-56 show exemplary screens displayed by the device 10 for the dynamometer program. FIG. 39 shows an exemplary "dynamometer main" menu 910 displayed on the touch screen 12 of the device 10 in response to selection of the dynamometer button 900 in FIG. 3. The dynamometer program calculates horsepower and torque, at both the driving wheels. The results are displayed in both table and graph format and corrected to STP standards for temperature, atmospheric pressure, and altitude.

Figure 40:
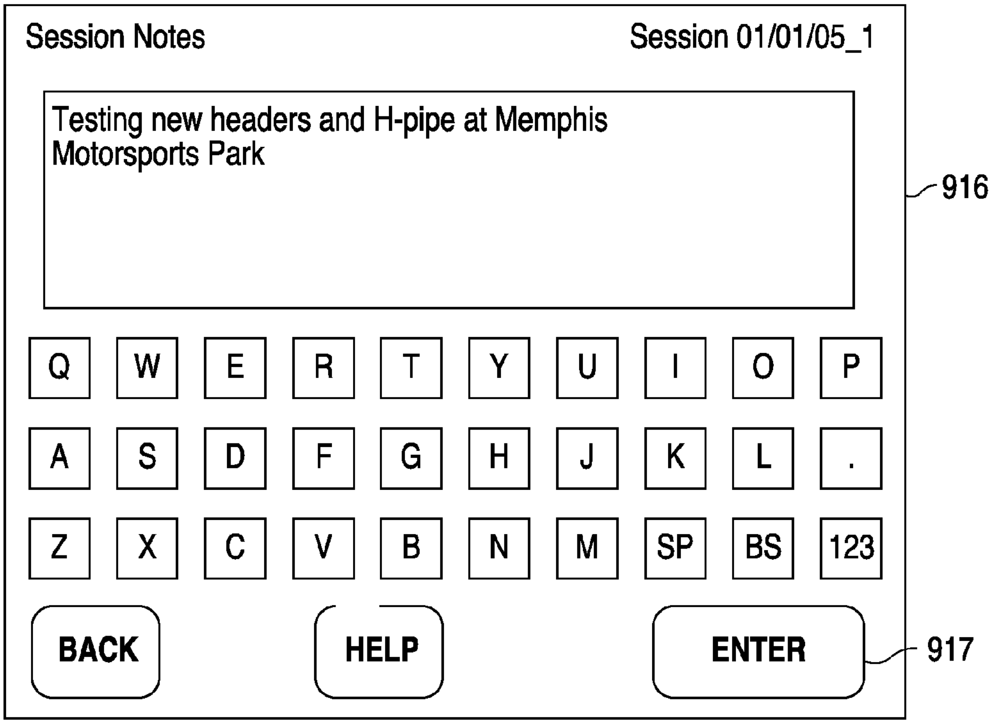
FIG. 40 shows a screen for entering session notes that is displayed in response to selection of a "create new test session" button.
Figure 41:
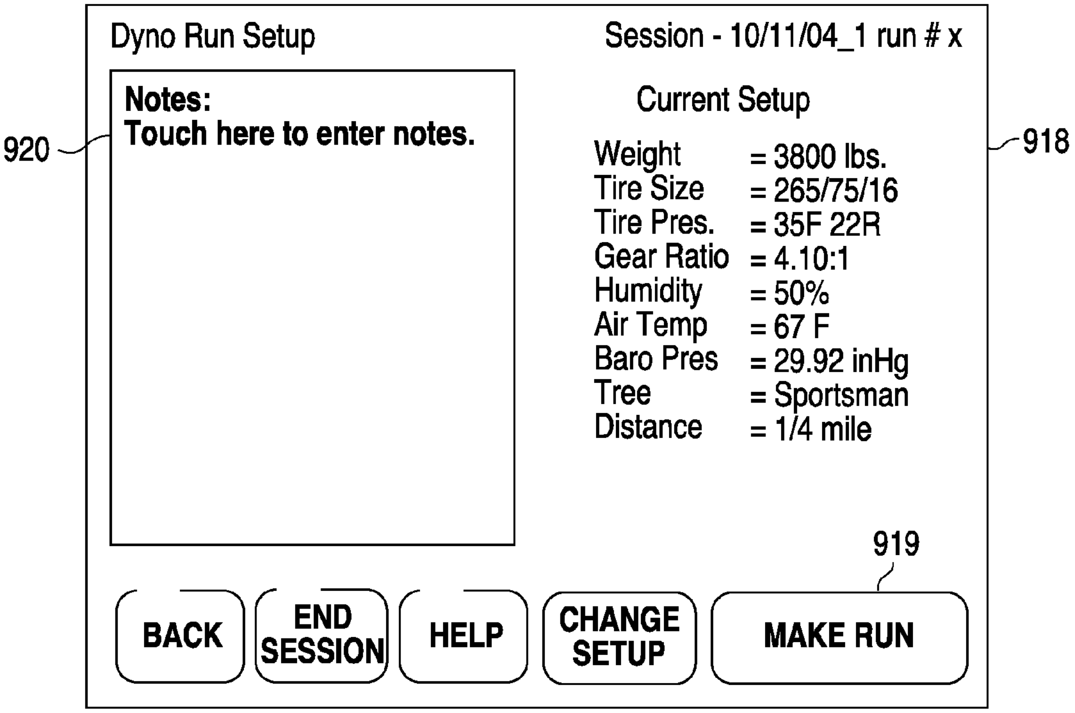
FIG. 41 shows a "dyno run setup" screen.
Figure 42:
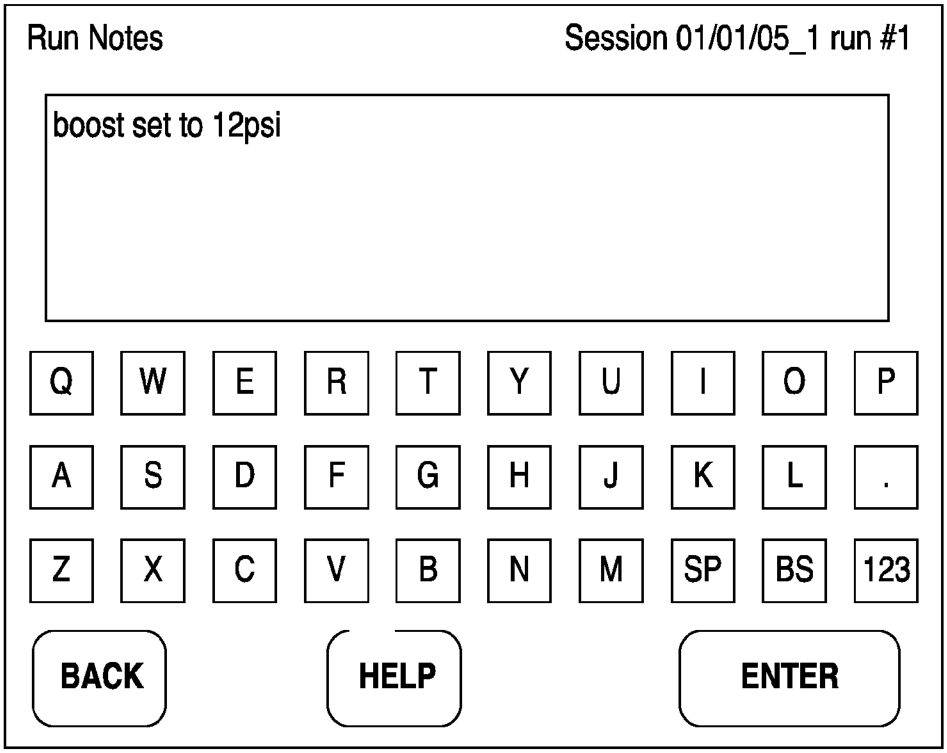
FIG. 42 shows a "run notes" screen displayed in response to selection of the "notes" window in FIG. 41, to enable entry of run notes.

When the dynamometer program is first entered from the main menu, screen 910 shown in FIG. 39 is displayed to enable the user to select the "create new test session" button 912 or "view saved sessions" button 914. In response to selection of a "create new test session" button 912, a screen 916 with a keyboard, shown in FIG. 40, is automatically displayed for entering session notes. The user is not required to enter session notes and may choose to skip this process by simply pressing an enter button. In response to selection of the "enter" button 917 in screen 916, the "dyno run setup" screen 918 in FIG. 41 is displayed. The "dyno run setup" screen 918 is displayed for the dynamometer program before making a run. This screen contains all of the information and settings that can effect horsepower and torque measurements. A "run notes" screen in FIG. 42 is displayed in response to selection of the "notes" window 920 in FIG. 41 to enable entry of run notes.

Figure 43:
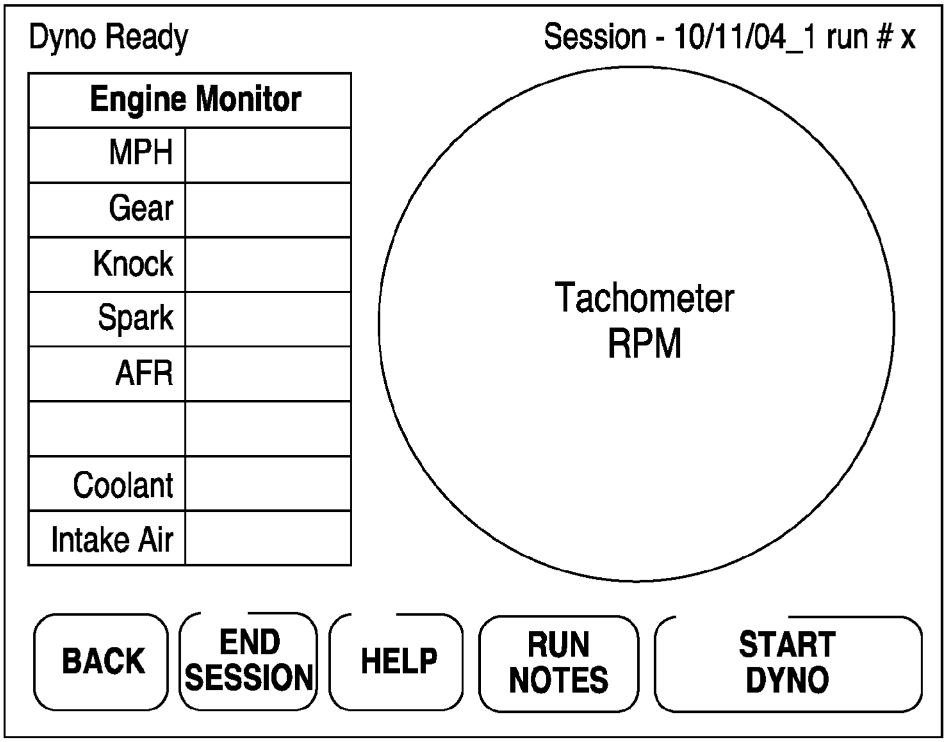
FIG. 43 shows a "dyno ready" screen displayed to show important engine operating conditions and a large tachometer.
Figure 44:
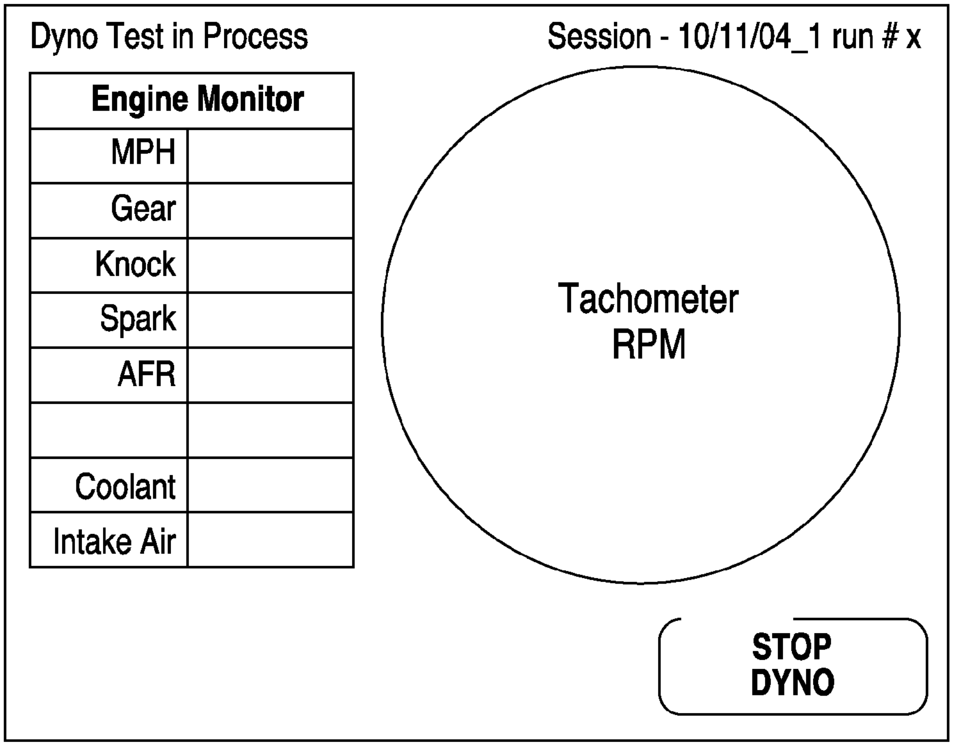
FIG. 44 shows a screen displayed after starting a dyno run.
Figure 45:
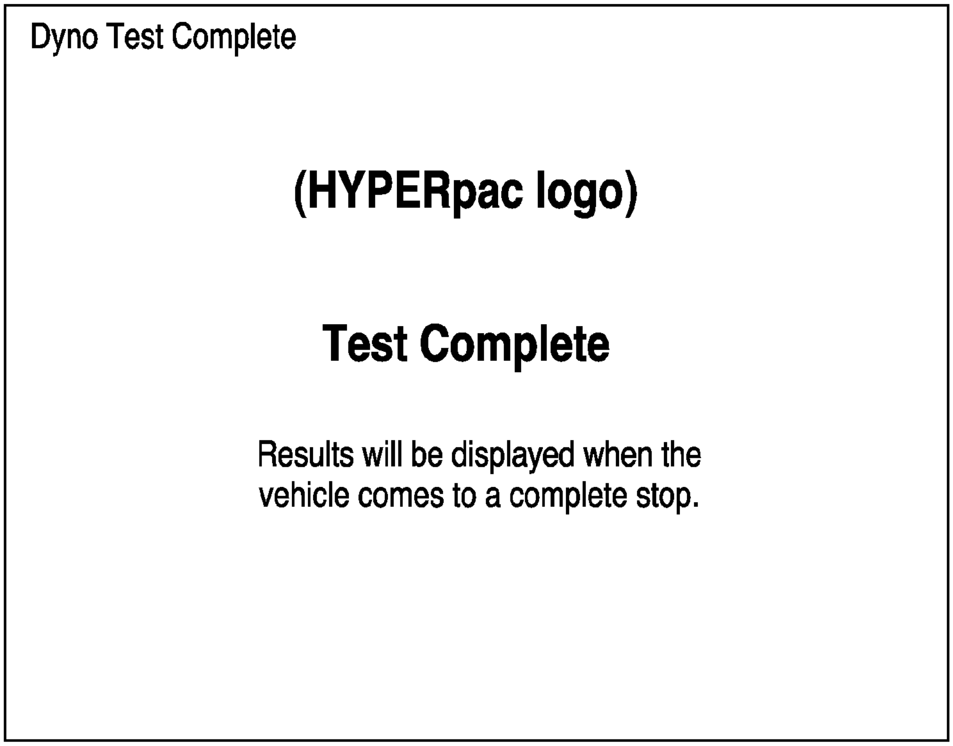
FIG. 45 shows a screen displayed after selection of the stop dyno button.

In response to selection of the "make run" button 919 in FIG. 41, a "dyno ready" screen in FIG. 43 is displayed to show important engine operating conditions and a large tachometer. After starting a Dyno run, the "start dyno" button and other buttons at the bottom of the display in FIG. 43 are replaced with a "stop dyno" button as shown in FIG. 44. The device 10 will record dyno data until the user selects the "stop dyno" button in FIG. 44 or until a predetermined time limit for the run has been reached. After selection of the stop dyno button, the results will be displayed after the vehicle has come to a complete stop, as indicated in the screen shown in FIG. 45.

Figure 46:
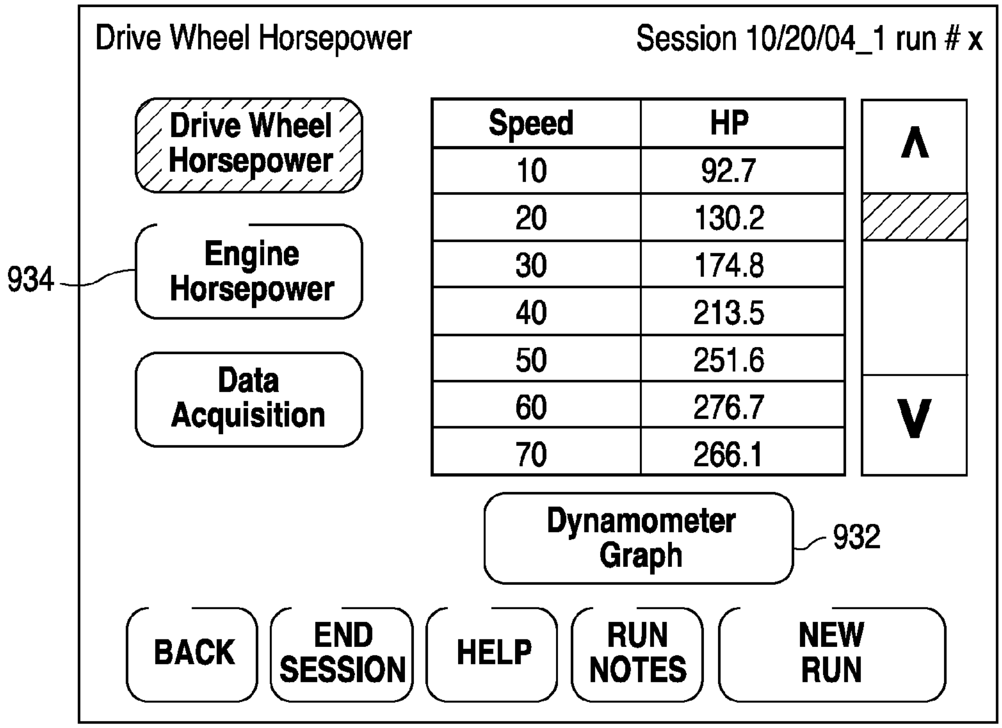
FIG. 46 shows an exemplary "drive wheel horsepower" screen which is the first screen displayed when the vehicle comes to a complete stop during a dyno test run.
Figure 47:
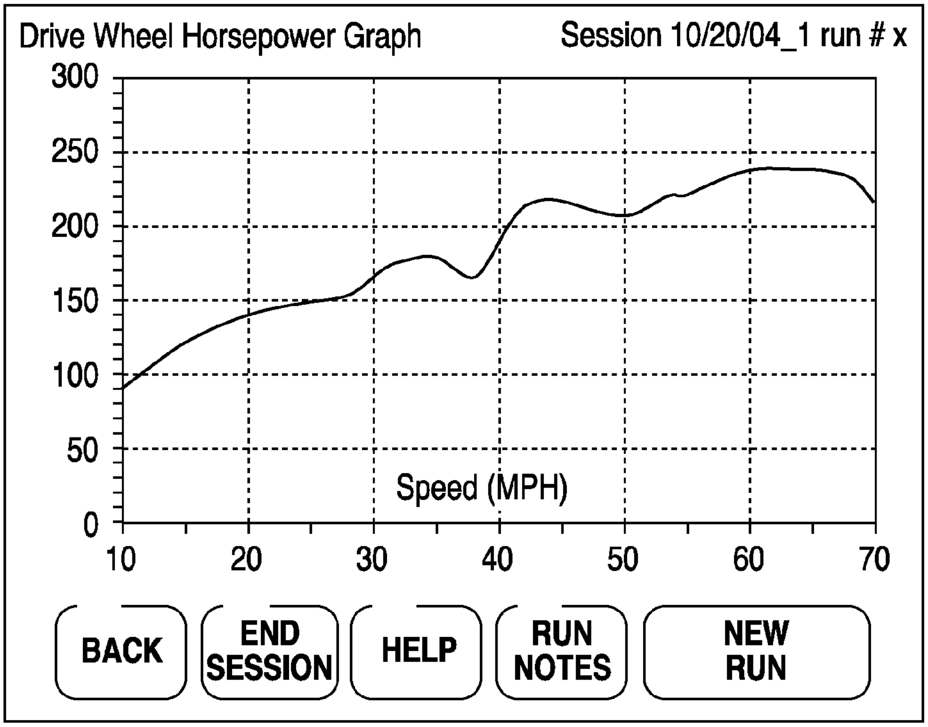
FIG. 47 shows a "drive wheel horsepower graph" displayed to show the results in graphical format.
Figure 48:
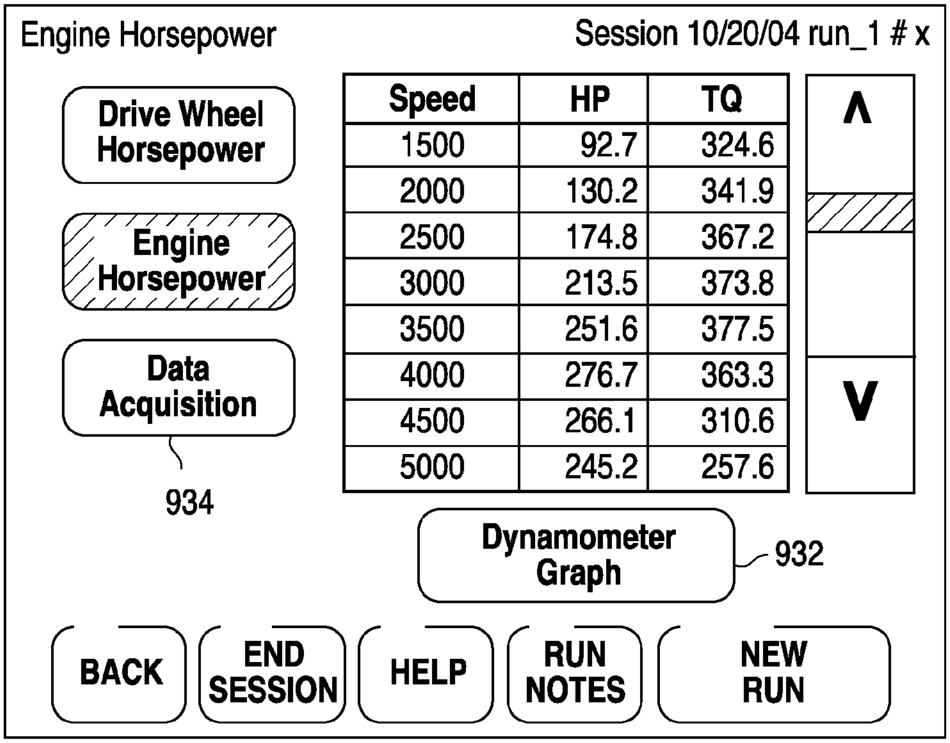
FIG. 48 shows an "engine horsepower" screen for displaying the calculated horsepower and torque at the engine crank.
Figure 49:
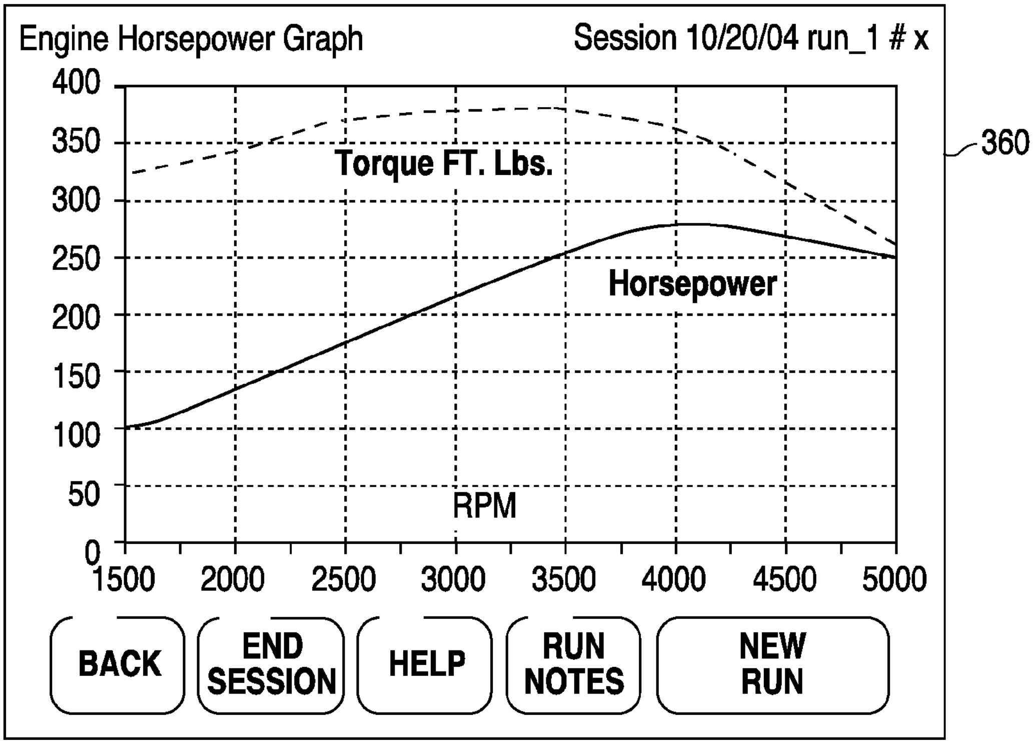
FIG. 49 shows a "engine horsepower graph" provided to show the results in FIG. 48 in a graphical format.

FIG. 46 shows an exemplary "drive wheel horsepower" screen 930 which is the first screen displayed when the vehicle comes to a complete stop during a dyno test run. The drive wheel horsepower is referenced to vehicle speed in 10 mph increments as seen in FIG. 46. In response to selection of the "dynamometer graph" button 932, a "drive wheel horsepower graph" shown in FIG. 47 is displayed to show the results in graphical format. In response to selection of the "engine horsepower" button 934 in FIG. 46, the calculated horsepower and torque at the engine crank is shown in an "engine horsepower" screen in FIG. 48. For engine horsepower, FIG. 48 shows a tabular view of RPM, HP, and torque ("TQ"). Vertical scroll bars are provided to enables viewing of the horsepower & torque results in 500 RPM increments. In response to selection of the "dynamometer graph" button 932, the "engine horsepower graph" shown in FIG. 49 is provided to show the results in graphical format.

Figure 50:
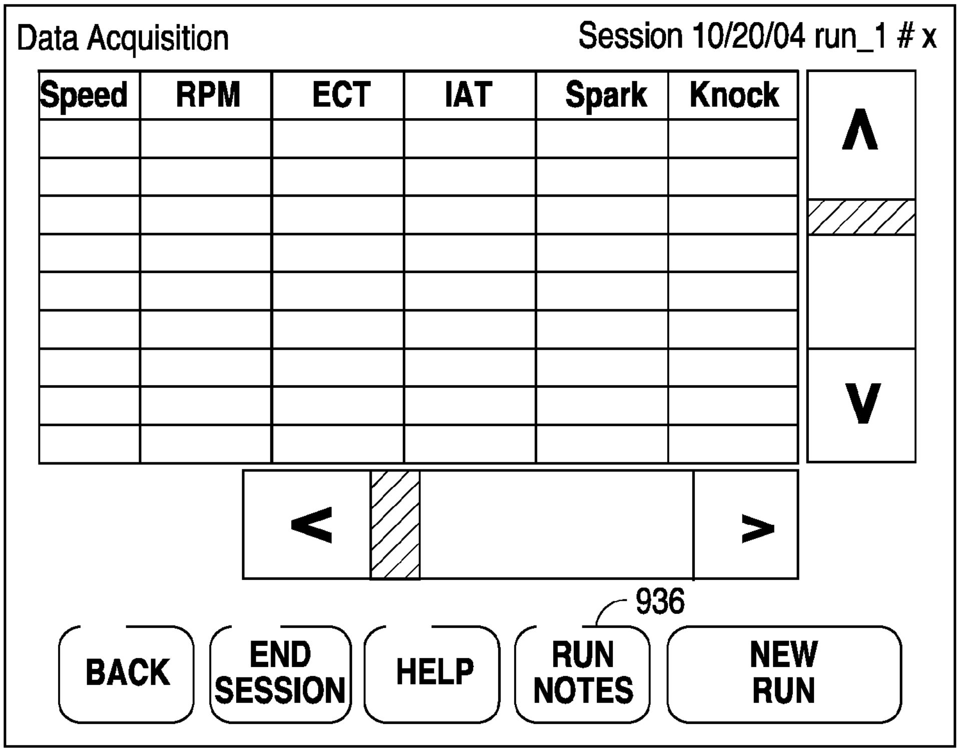
FIG. 50 shows a "data acquisition" report displayed to show operating conditions recorded during the test run.

In response to selection of the "data acquisition" button 934 in FIG. 48, a "data acquisition" report shown in FIG. 50 is displayed to show operating conditions recorded during the test run, e.g., engine coolant temperature (ECT), intake air temperature (IAT). A "run notes" button 936 is provided to enable entry of additional notes.

Figure 51:
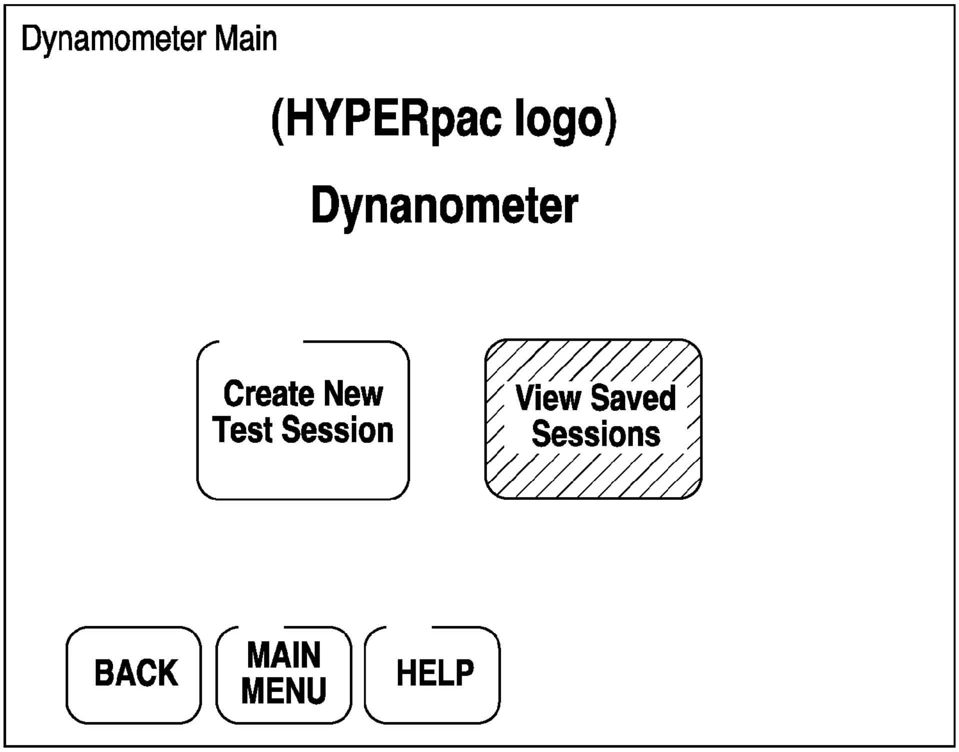
FIG. 51 shows an exemplary display of the dynamometer main menu in FIG. 39 displayed in response to selection of the "viewed saved session" button.
Figure 52:
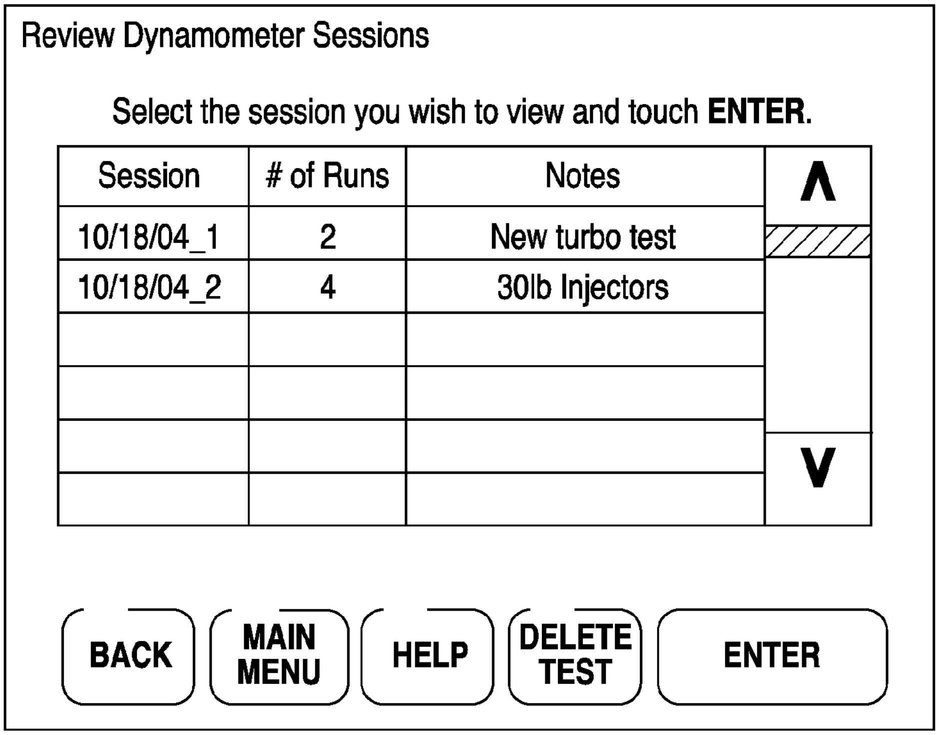
FIG. 52 shows a "review dynamometer sessions" screen which displays a listing of saved test sessions.
Figure 53:
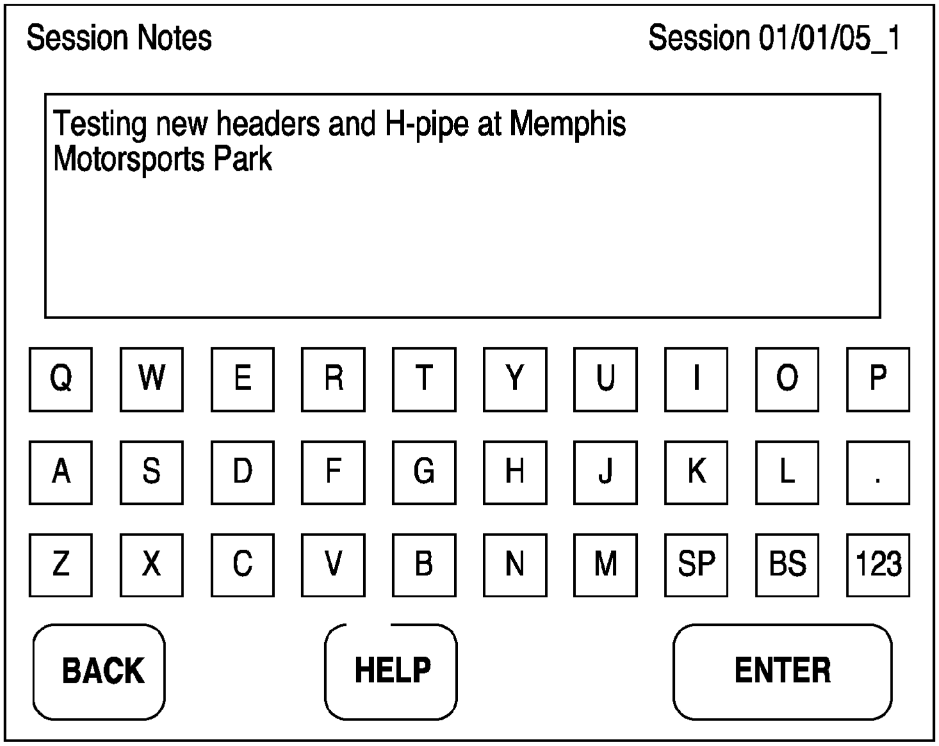
FIG. 53 shows a "session notes" screen displayed to show the session notes.
Figure 54:
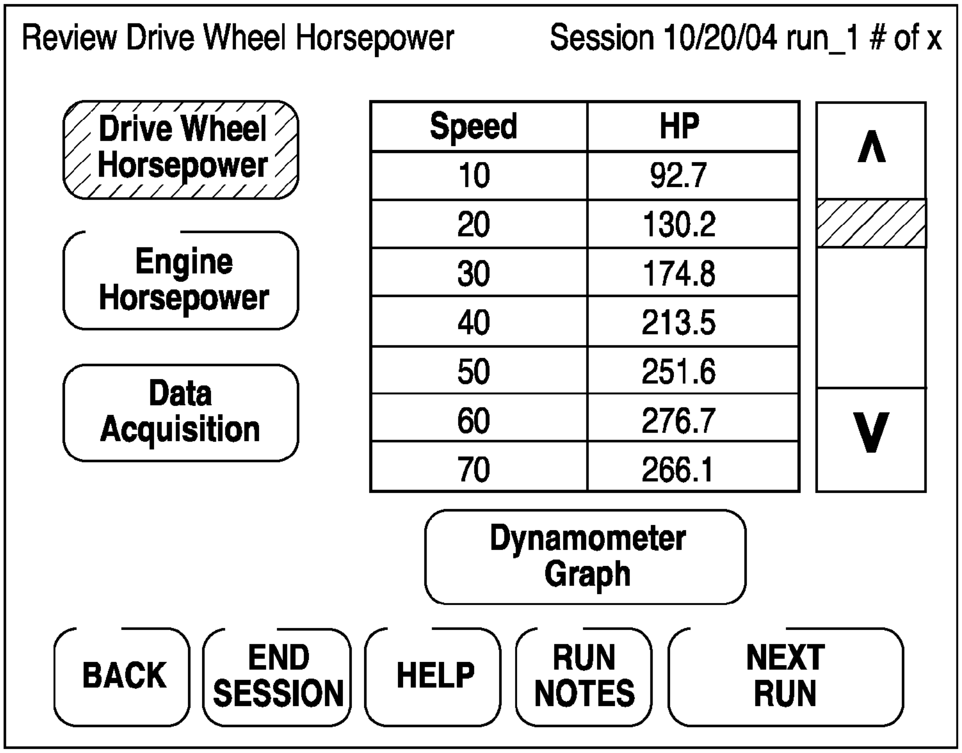
FIG. 54 shows a "review drive wheel horsepower" report.
Figure 55:
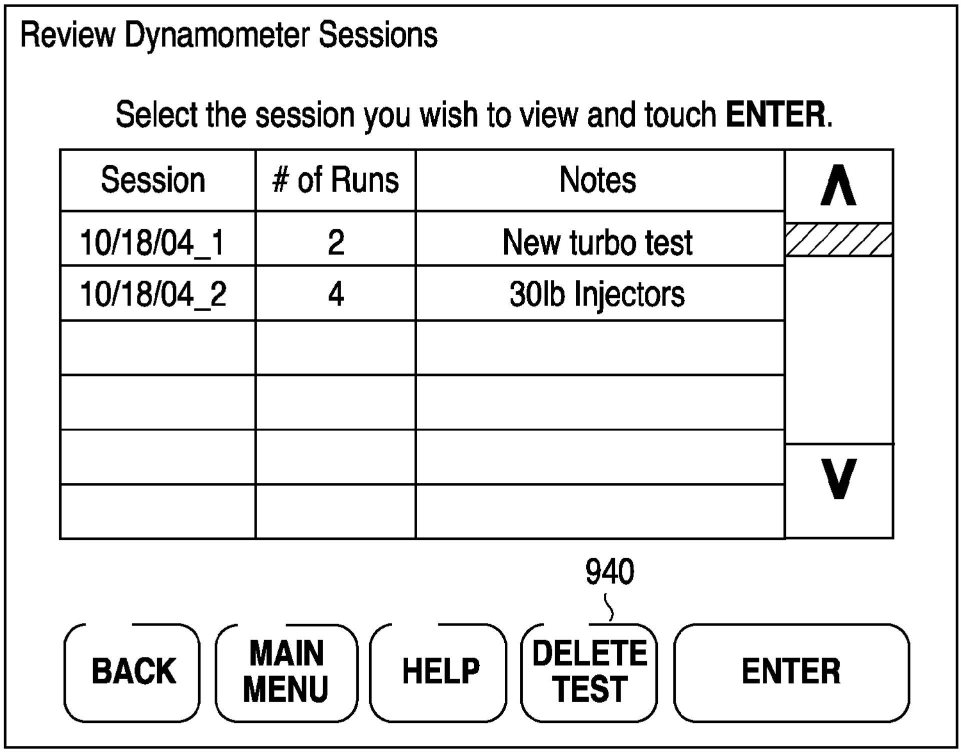
FIG. 55 shows a "review dynamometer sessions" screen that includes a "delete test" button to enable a user to delete a dynamometer test session.
Figure 56:
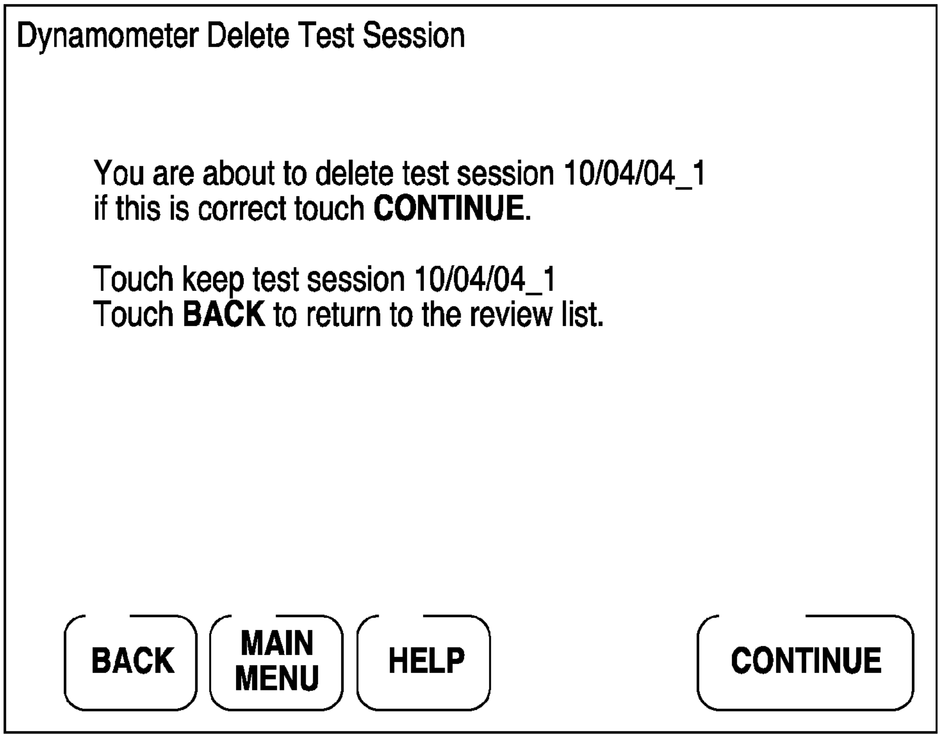
FIG. 56 shows a "dynamometer delete test session" screen which gives the user the option to continue with the deletion or go back to the review screen without deleting the session.

FIG. 51 shows an exemplary display of the dynamometer main menu 910 in FIG. 39 on the touch screen 12 of the device 10 in response to selection of the "viewed saved session" button 914. Also in response to the selection, a "review dynamometer sessions" screen in FIG. 52 is displayed which shows a listing of saved test sessions. In response to selection of a session in FIG. 52, a. "session notes" screen in FIG. 53 is displayed to show the session notes. The test results reports for the session are displayed in response to selection of the "enter" button on the screen in FIG. 53. One of the reports, a "review drive wheel horsepower" report is shown in FIG. 54. A "next run" button is provided to enable viewing of the report for the next run. Similarly, the "review" versions of the "engine horsepower" and "data acquisition" reports are similar to the active test run "engine horsepower" and "data acquisition" screens in FIGS. 48 and 50 respectively, except that the "new run" button is replaced by the "next run" for the "review" versions of the report screens. In response to selection of the "end session" button on the report screen, e.g., in FIG. 54, a return is made to the dynamometer program's main menu. In FIG. 55, a "review dynamometer sessions" screen is shown with a "delete test" button 940 to enable a user to delete a dynamometer test session. In response to selection of the "delete test" button 940, a "dynamometer delete test session" screen shown in FIG. 56 is displayed which gives the user the option to continue with the deletion or go back to the review screen without deleting the session.

Figure 57:
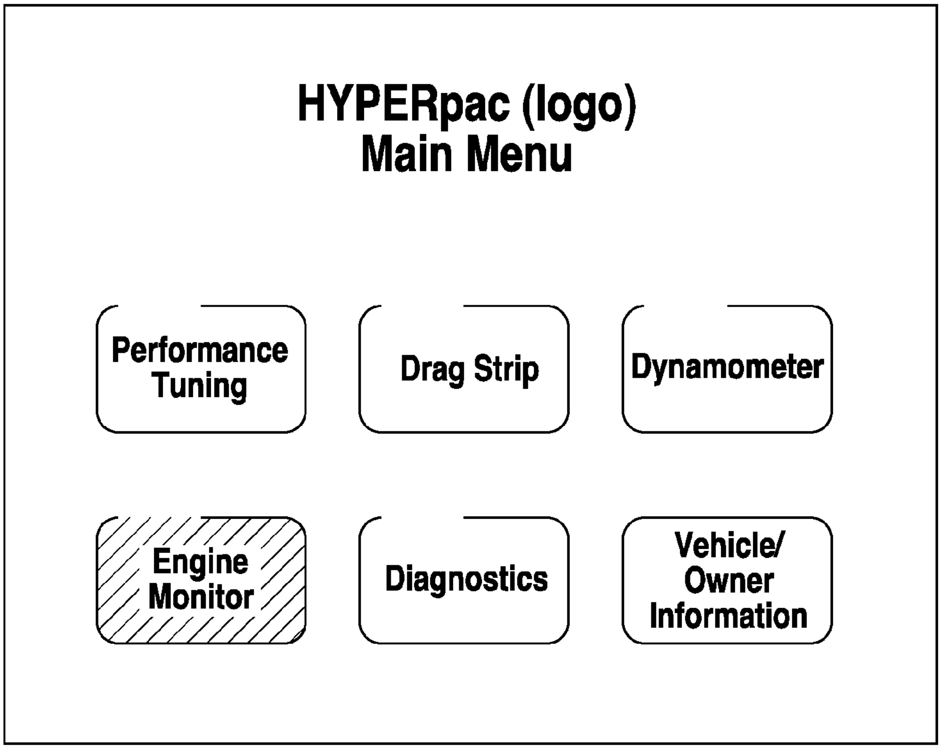
FIG. 57 shows an exemplary display of the main menu of FIG. 3 in response to selection of the "engine monitor" button, shown highlighted in FIG. 57 to indicate its selection.
Figure 58:
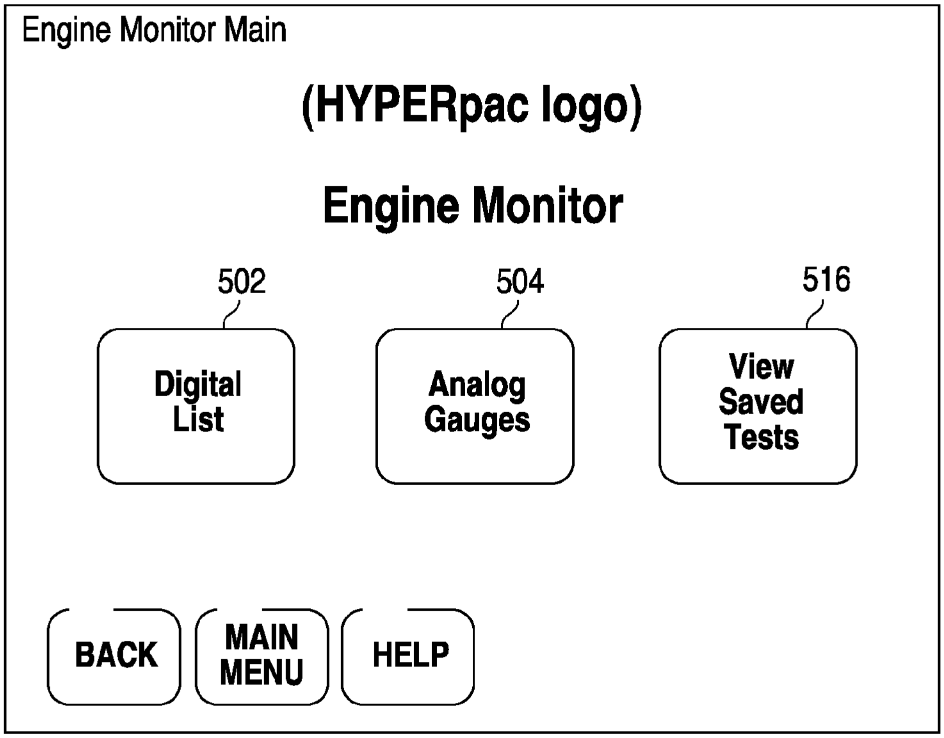
FIG. 58 shows an "engine monitor main" screen.
Figure 59:
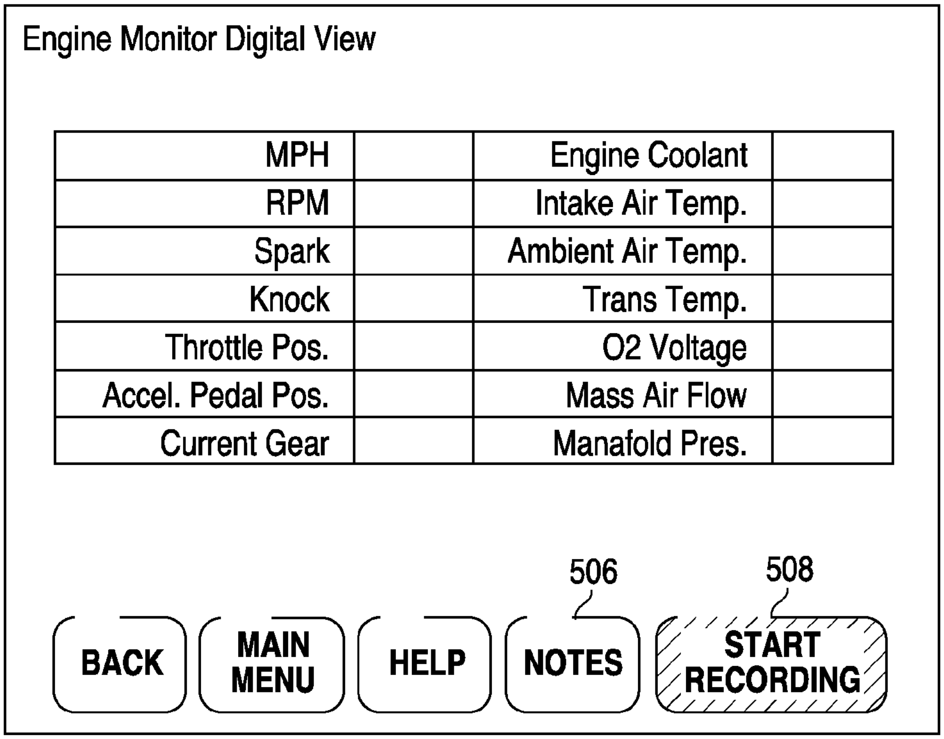
FIG. 59 shows an "engine monitor digital view" screen displayed to provide a list/table format.
Figure 60:
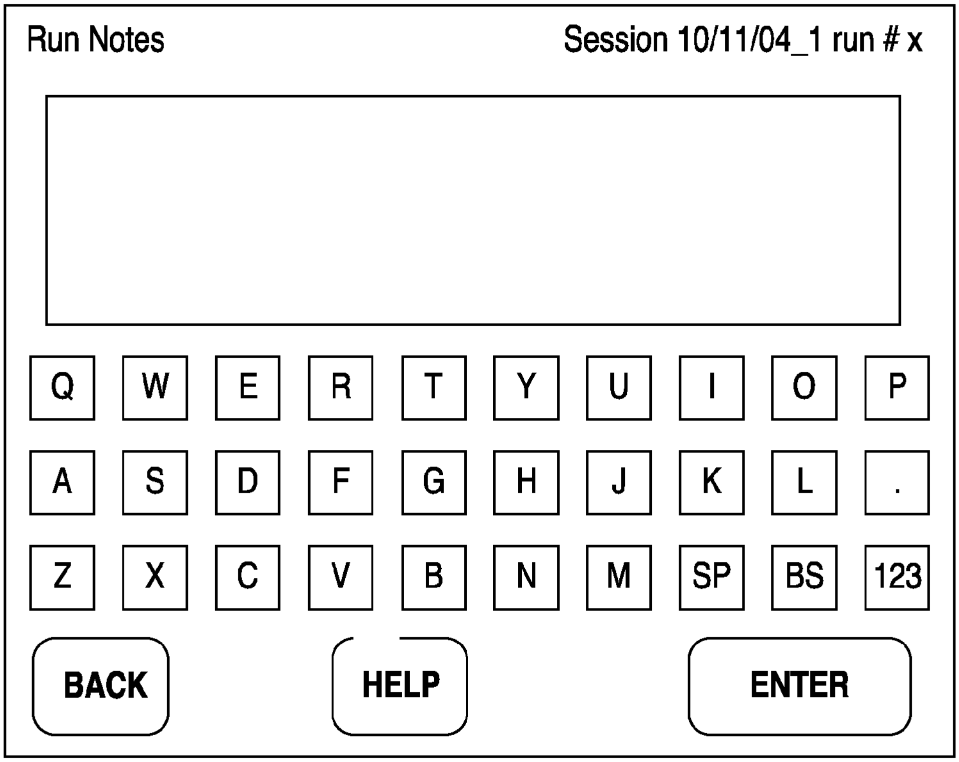
FIG. 60 shows a "run notes" screen provided to enable a user to enter information via a keyboard before recording a test run.
Figure 61:
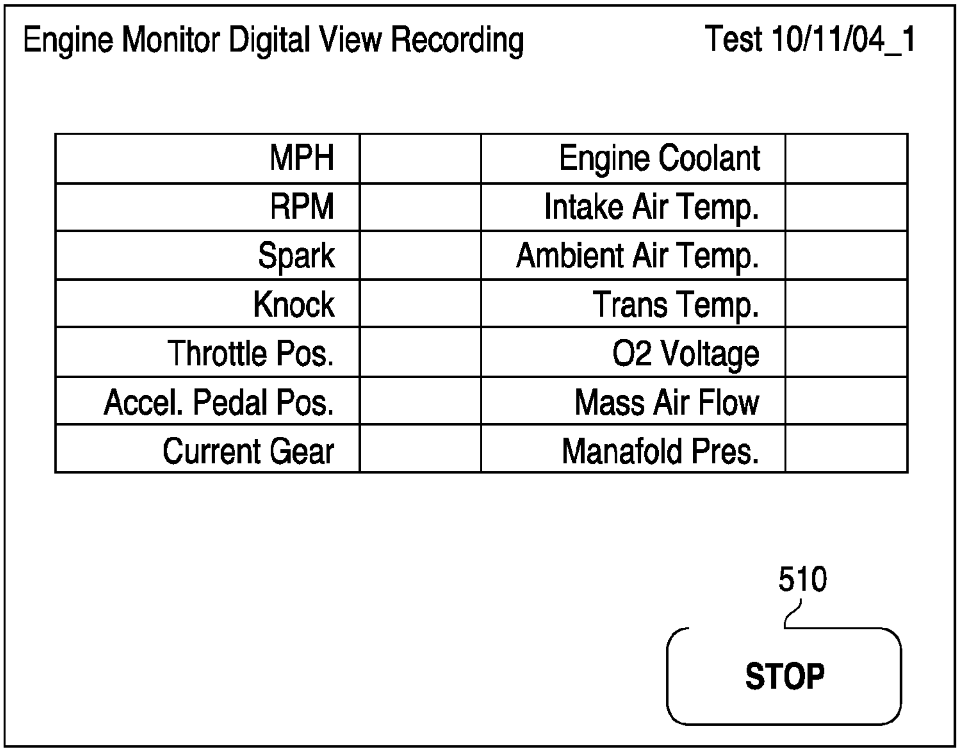
FIG. 61 shows an "engine monitor digital view recording" screen.

FIG. 57 shows an exemplary display of the main menu 30 of FIG. 3 in response to selection of the "engine monitor" button 500, shown highlighted in FIG. 57 to indicate selection. Also in response to the selection, an "engine monitor main" screen in FIG. 58 is displayed. The engine monitor program enables a user to continuously display important engine operating conditions in real time. A record function enables a user to record engine data while driving to help diagnose or trouble shoot problems. Sensor data can be viewed in digital or analog format, e.g. "digital list" button 502 and "analog gauges" button 504 in FIG. 58. The amount and type of sensors that can be monitored can vary depending upon year, make, and model, i.e. not all vehicles are equipped with the same sensors. In response to selection of the "digital list" button 502, an "engine monitor digital view" screen in FIG. 59 is displayed to provide a list/table format. In response to selection of a "notes" button 506, a "run notes" screen in FIG. 60 is provided to enable a user to enter information via a keyboard before recording a test run. In response to selection of a "start recording" button 508 in FIG. 59, the device 10 will automatically name the test, begin recording data, and show the "engine monitor digital view recording" screen in FIG. 61. In response to selection of a "stop recording" button 510 in FIG. 61, recording is stopped and the test is saved.

Figure 62:
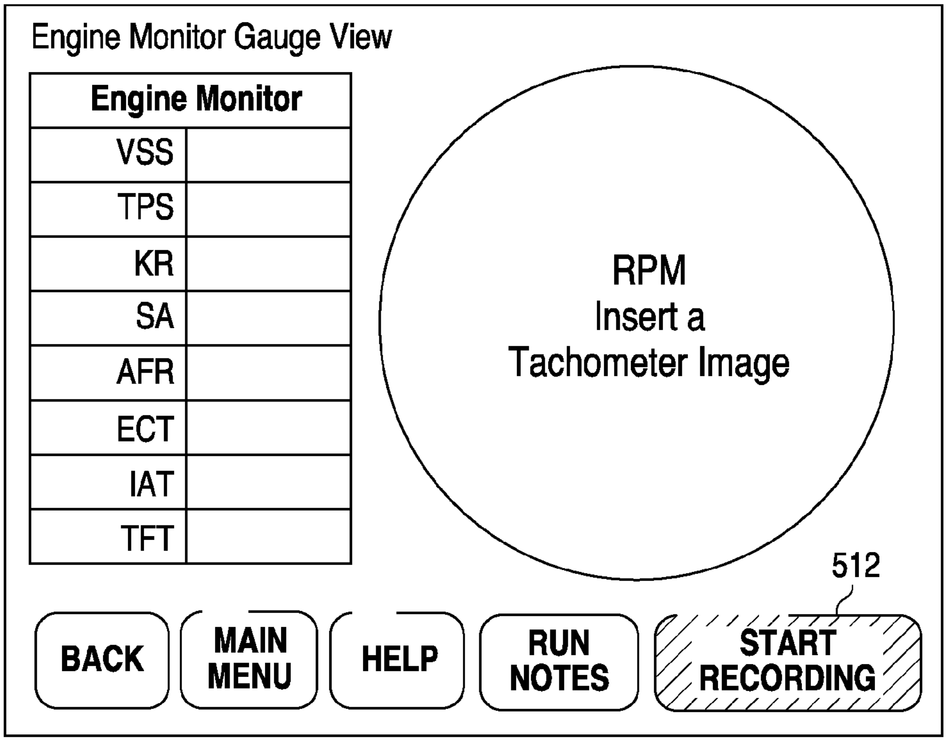
FIG. 62 shows an "engine monitor gauge view" displayed in response to selection of the "analog gauges" button in FIG. 58.
Figure 63:
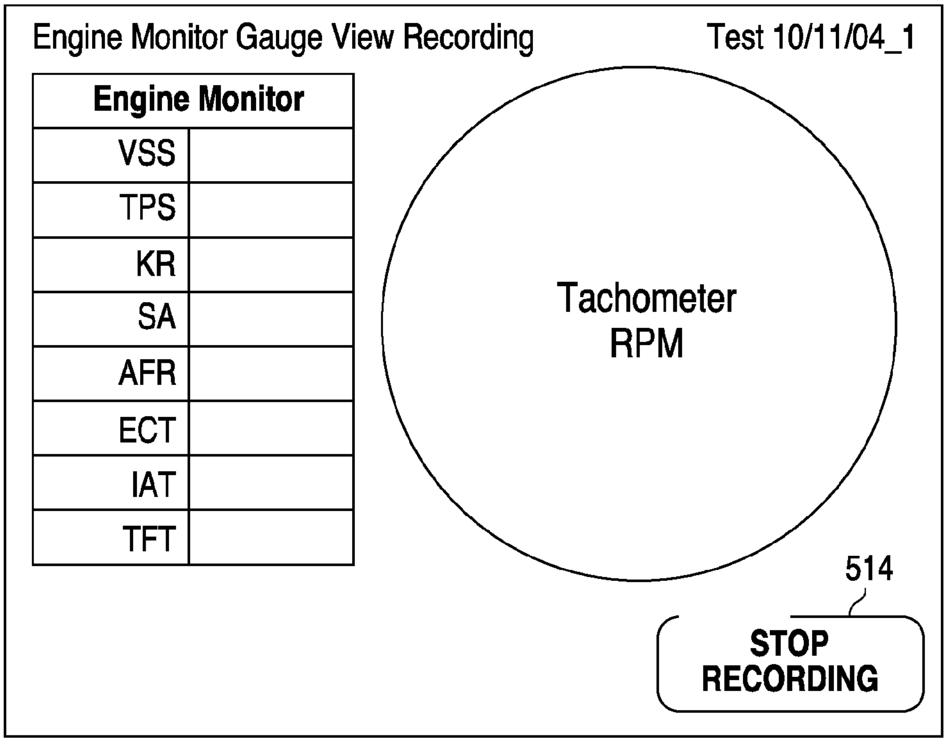
FIG. 63 shows the "engine monitor gauge view recording" for the analog gauges in response to selection of a start recording button in FIG. 62.
Figure 64:
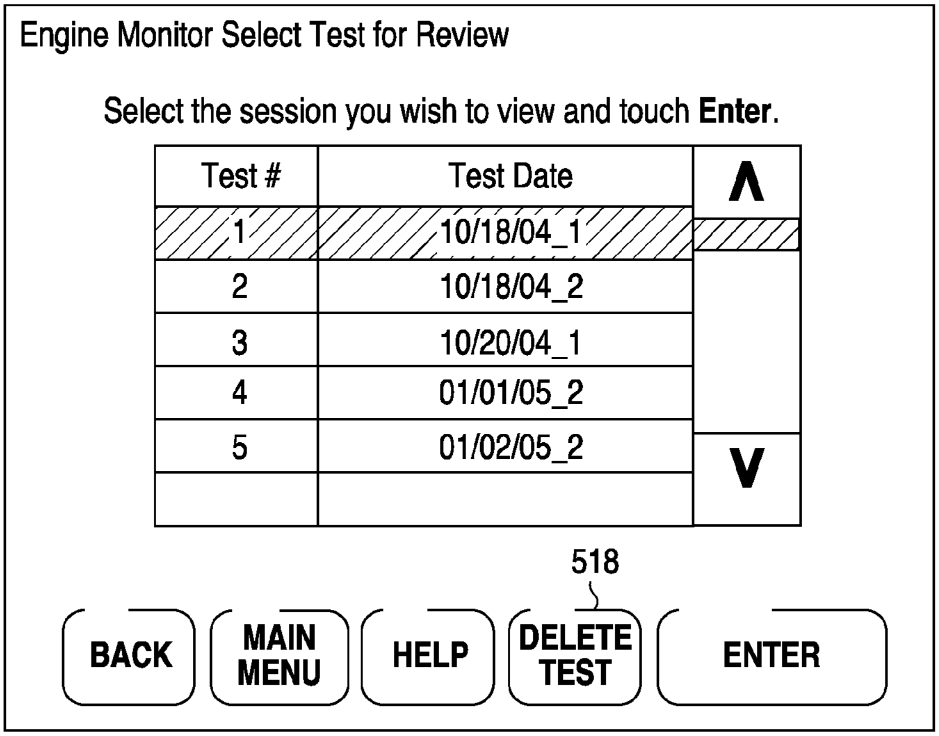
FIG. 64 shows an "engine monitor select test" for review screen displayed in response to selection of a "view saved test" button in FIG. 58.
Figure 65:
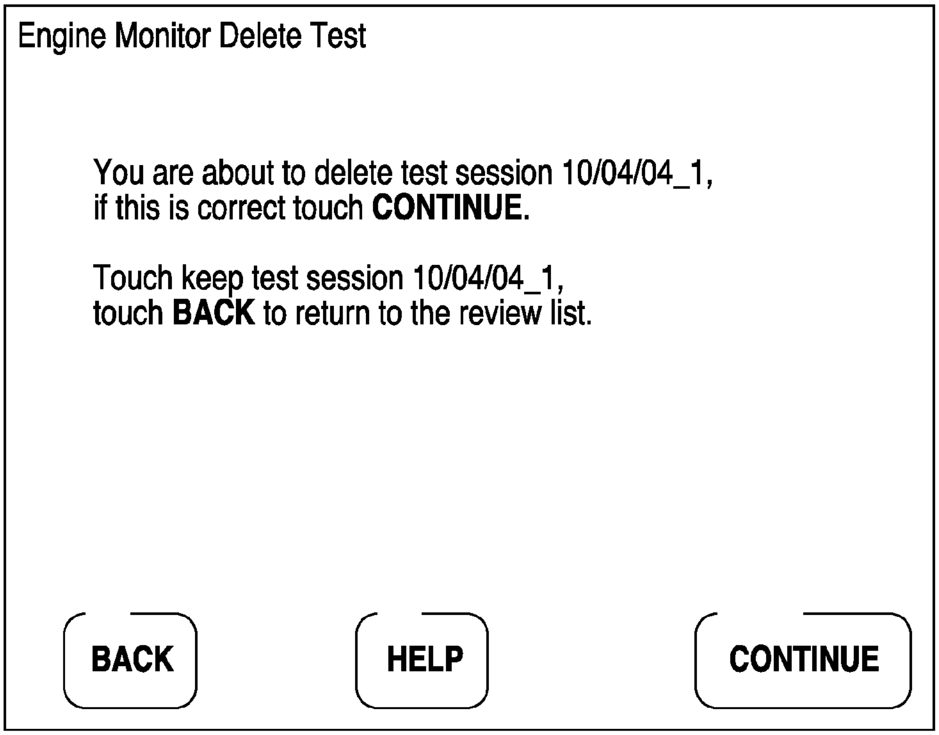
FIG. 65 shows an engine monitor delete test screen displayed in response to selection of the delete test button in FIG. 64.
Figure 66:
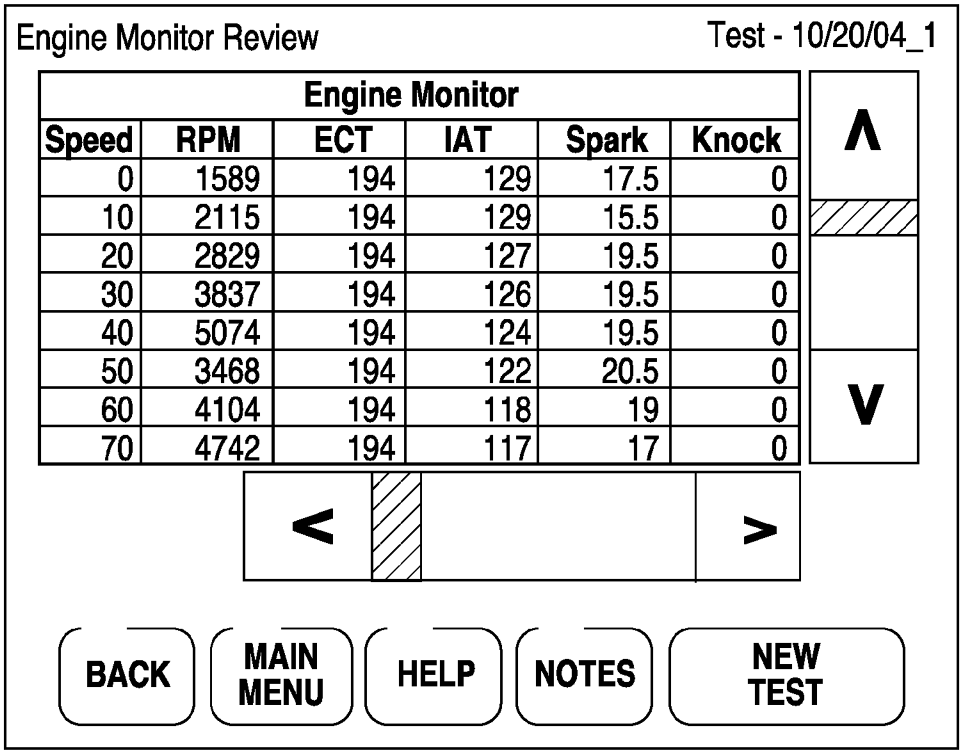
FIG. 66 shows an "engine monitor review" screen displayed in response to selection of a test on the screen in FIG. 64 via the "enter" button thereon.

FIG. 62 shows an "engine monitor gauge view" displayed in response to selection of the "analog gauges" button 504 in FIG. 58. The "run notes" display as in FIG. 60 is shown in response to selection of the "run notes" button in FIG. 62. FIG. 63 shows the "engine monitor gauge view recording" for the analog gauges in response to selection of a start recording button 512 in FIG. 62. In response to selection of a "stop recording" button 514 in FIG. 63, recording is stopped and the test is saved. FIG. 64 shows an "engine monitor select test" for review screen displayed in response to selection of a "view saved test" button 516 in FIG. 58. FIG. 65 shows an "engine monitor delete test" screen displayed in response to selection of the "delete test" button 518 in FIG. 64. The "engine monitor delete" test screen gives the user the option to continue with the deletion or go back to the review screen without deleting the test. FIG. 66 shows an "engine monitor review" screen displayed in response to selection of a test on the screen in FIG. 64 via the "enter" button thereon.

Figure 67:
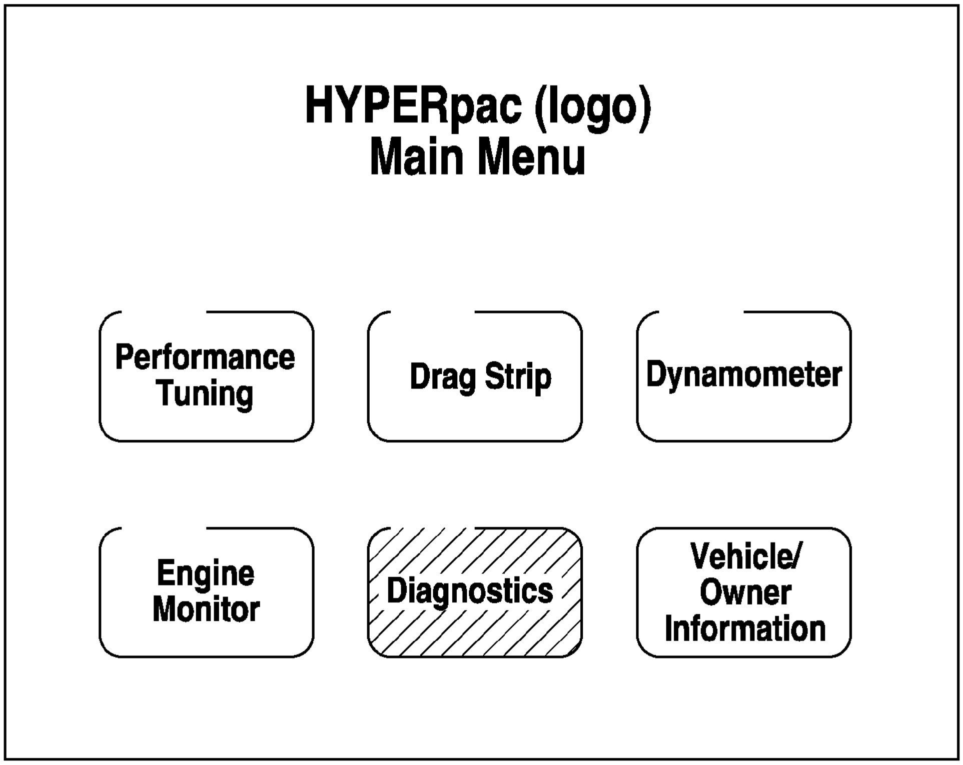
FIG. 67 shows an exemplary display of the main menu of FIG. 3 in response to selection of the diagnostics button, shown highlighted to indicate its selection.
Figure 68:
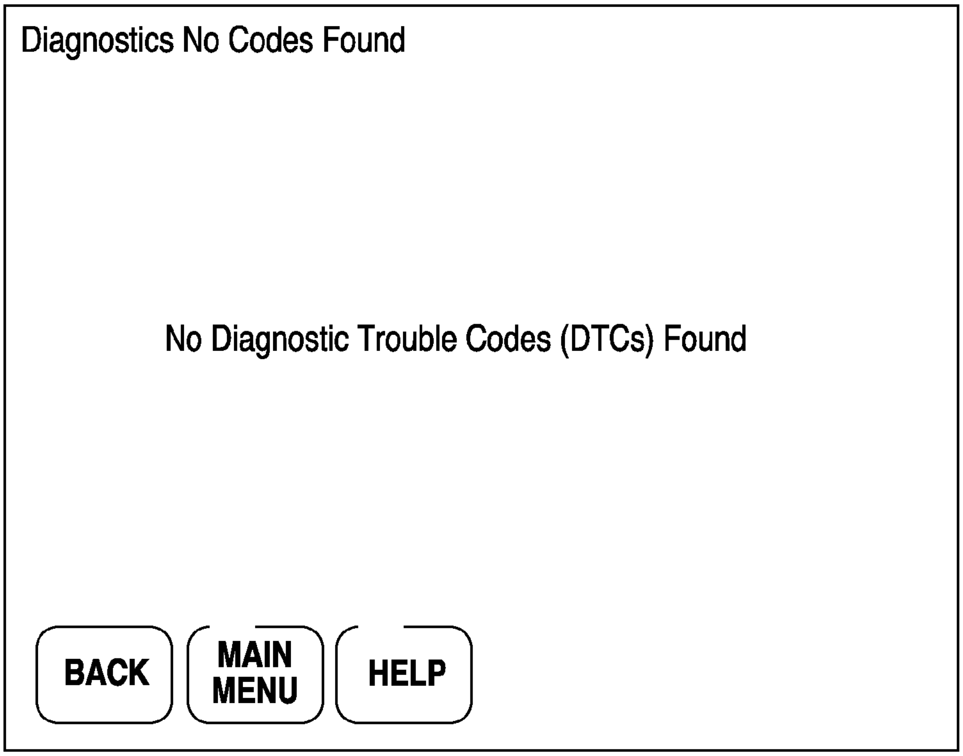
FIG. 68 shows a "diagnostics no codes found" screen displayed in response to the selection of the diagnostics button if there are no DTCs active.
Figure 69:
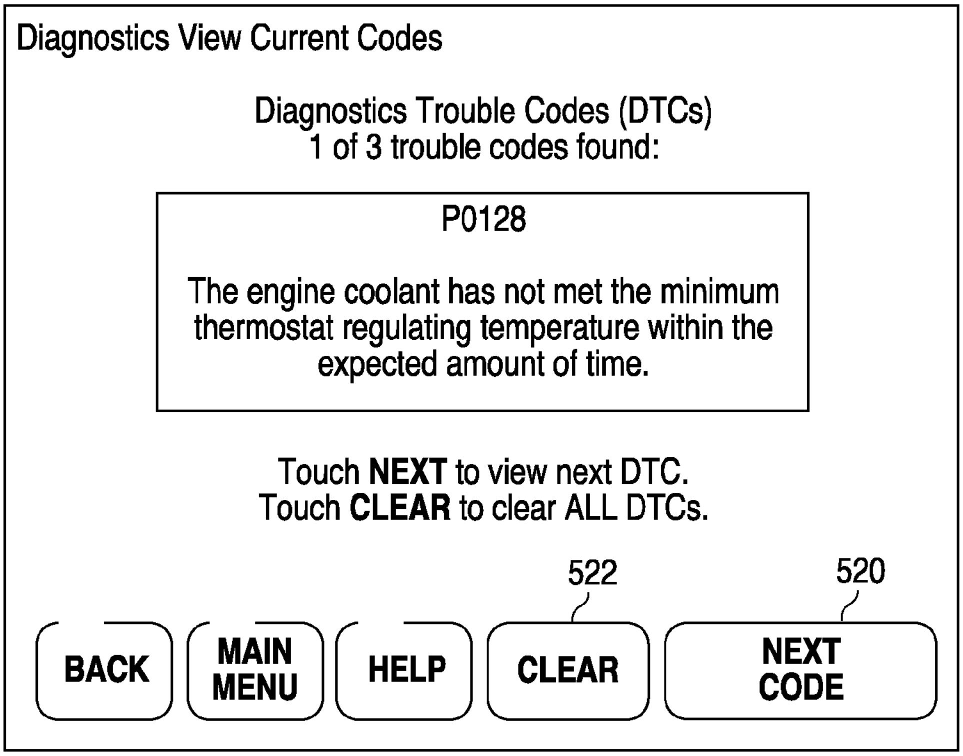
FIG. 69 shows a "diagnostics view current codes" screen displayed in response to the selection of the diagnostics button if the device in FIG. 1 detects any DTCs are active.

FIG. 67 shows an exemplary display of the main menu 30 of FIG. 3 in response to selection of the diagnostics button 600, shown highlighted to indicate selection. The diagnostics program according to the present invention enables a user to read and clear diagnostic trouble codes (DTCs). The program not only displays the code, but it also provides a description of what the code means, e.g., for troubleshooting problems and for clearing any failure codes after making the necessary repairs which will also turn off any check engine lights that may have been triggered during the failure. FIG. 68 shows a "diagnostics no codes found" screen displayed in response to the selection of the diagnostics button 600 if there are no DTCs active. FIG. 69 shows a "diagnostics view current codes" screen displayed in response to the selection of the diagnostics button 600 if the device 10 detects any DTCs are active. If multiple codes are found, the display will show one of the trouble codes found. In response to selection of the "next code" button 520, a report of the next DTC is displayed. In response to selection of the "clear button" 522, all DTCs are cleared by the device, i.e., the clearing process does not allow clearing of individual codes unless permitted by the vehicle's computer, which ordinarily it is not. FIG. 70 shows a "diagnostics clear all DTCs" screen displayed in response to selection of the "clear" button 522 so as to notify the user that all of the codes are about to be cleared and require the selection of a "clear" button 524 to initiate the clearing. A "back" button 526 is provided to enable a user to go back to the previous screen without clearing the codes.

The accuracy of measured time, measured velocity, and calculated distance data are critical because these characteristics serve as the basis for the calculations for the device's drag strip and dynamometer programs. These values, as developed and reported by the diagnostic port 2 connected to the onboard diagnostic system 6, have two serious flaws that have so far prevented any prior art device based thereon from being either accurate or repeatable. Before this information is used by device 10, according to the present invention, for generating the corresponding data for the drag strip program displays and for the horsepower and torque calculations and displays in dynamometer mode, device 10 corrects and accounts for the two flaws in PCM reported velocities, and the distance values calculated from them.

The method and device of the present invention selectively uses a combination of PID-based and accelerometer data for providing accurate and reliable measurements despite the drawbacks of each. The method and device of the present invention has the advantage of providing unequaled accuracy and ease of use, while overcoming the drawback of time consuming and difficult installation of acceleration based products. As described in the background, the time interval and the short distance traveled from "first movement" of the vehicle, i.e., the start time, during a test run until the velocity value is provided at the diagnostic port introduces an unknown error that varies from test to test randomly, and, therefore, gives false, unreliable fluctuating results for conventional methods. In order to correct for this unknown error, the device of the present invention includes a start time detector for detecting the start time of the vehicle, preferably as a function of the first movement of the vehicle, independent of the onboard diagnostic system and its diagnostic port, in order to account for the unknown errors.

Device 10 includes a start time detector 22 in the embodiment shown in FIG. 2. Preferably, an accelerometer is included as a start time detector 22 to provide an accurate "first movement" trigger. Alternatively, a mercury switch, triggered by the initial movement of the vehicle or a "foot off the brake" indication, or the like, is used as a start time detector to detect the first movement of the vehicle. In addition to the start time detector 22, the device 10 includes an accelerometer function, identified as 24, for the system. Preferably, one accelerometer, identified as 26 and shown in dashed lines in FIG. 2, provides the functions of both the start time detector 22 and the accelerometer 24. The accelerometer 26 is preferably contained on an integrated circuit chip in the device 10.

According to a preferred embodiment, the accelerometer 26 of the present invention provides the first movement trigger in the device 10. Microcontroller 14 of device 10 preferably includes one or more clocks or timers. The moment the accelerometer 26 sends a signal to the clock, it corresponds to time zero, and then the clock begins to run continuously as the vehicle begins its run down the track. The device 10 preferably uses the clock or other suitable means to put a time stamp on each velocity signal read from the diagnostic port 2 and on signals from the accelerometer. It could be anything from 0.001 seconds to some later time point, e.g., 652 seconds from the time the clock starts (as determined from the signal from the detector), until the first velocity reading from the diagnostic port is available and read. The time checks come at the first velocity reading and it is referenced off of the "first movement" trigger at time zero when the accelerometer sent its signal. The velocity updates from the vehicle's diagnostic port come at regular intervals that vary from vehicle to vehicle, e.g., every 0.060 seconds up to 0.25 seconds. The digitized velocity data read from the diagnostic port is stored in a file. So when the vehicle starts moving, the accelerometer signal provides the first movement trigger and the clock starts. A time stamp is put on each velocity signal that comes in from there until the end of the run. The time that it takes the vehicle to travel a ¼ mile and other predetermined distances are calculated. The time to reach one or more predetermined speeds is also recorded.

The start time, preferably obtained from the "first movement trigger", allows development of an accurate timeline. However, the distance from first movement to the first velocity value from the diagnostic port is still unknown. According to a preferred embodiment of the present invention, at the time of the first movement trigger, the system starts a clock for measuring time such that the precise time taken to reach the time-stamped first PCM delivered velocity value is determined. Each time increment for each drive-shaft revolution, and the corresponding linear distance, is then continuously added and summed over the time period of the test run. In other words, the moment the accelerometer sends a signal to a clock, which corresponds to time zero, and then the clock begins to run continuously therefrom as the vehicle begins its run down the track.

The start of a test is signaled by the accelerometer, acting as a start time and first movement trigger A drawback of accelerometer-based first movement triggering is that false starts can be caused by various movements of the vehicle, such as the car shaking momentarily as someone shifts their position, the driver revs the engine, or any other temporary and/or randomly-caused acceleration of the vehicle. According to the present invention, this drawback is overcome by controlling the start "trigger" by adjusting the magnitude of the triggering event and the duration (length of time) of the triggering event so as to ensure that the detected start is indeed a true start of a test and not a false start.

Wheel spin presents a challenge because the velocity values received from the vehicle's diagnostic port are distorted during wheel spin such that distance calculations will likewise be inaccurate. Most acceleration and velocity numbers, in the case of wheel spin, will typically be erratic in nature, extraordinarily high initially, but once the tire hooks up with the track, the velocity values from the vehicle drop from their artificial high values down to the vehicle's actual speed from which a smooth curve is thereafter obtained. As a result, the presumed distance traveled based solely on velocity values read is artificially high if the tires are spinning. In the case of wheel spin, the acceleration curve generated at the derivative of the velocity values also starts off with a high spike and then drops down to about zero acceleration as the vehicle just spins its tires until the tires hook up to the track, such that the data thereafter accurately reflects vehicle movement. In other words, during wheel spin the vehicle does not travel as far as the PCM pulse counter indicates. Wheel spin of varying times and distances down the track thus would seem to make accuracy impossible. Conventionally, this has been an unsolvable problem. The following describes in further detail how the present invention solves for wheel spin, if present, and solves for the unknown distance and time to reach the first PCM delivered velocity value. The present invention accurately solves the two above described problems irrespective of the random nature of the first distance value, and irrespective of the amount of error due to wheel spin, if present.

Figure 71A:
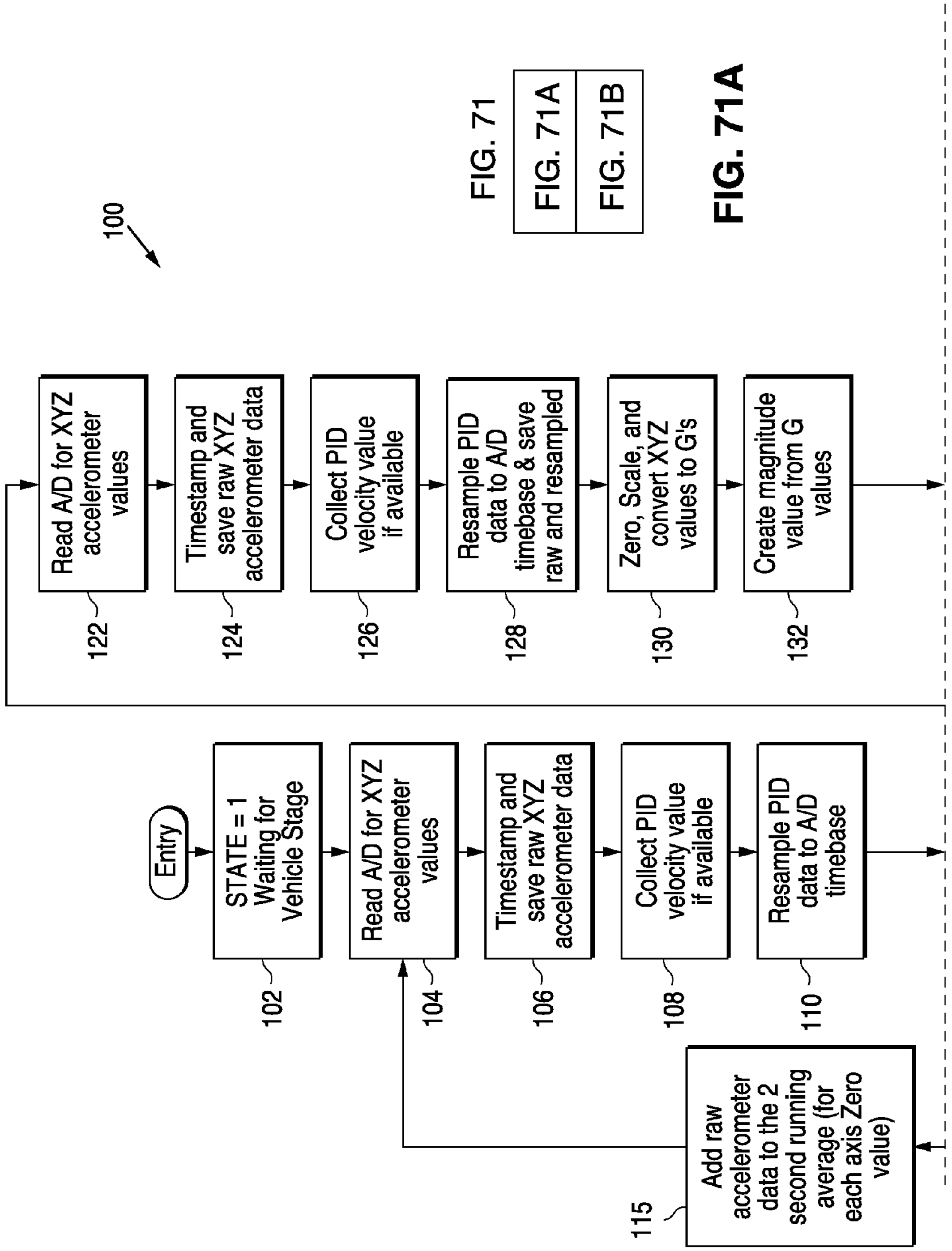
FIG. 71 is an exemplary flow chart showing an exemplary process for developing a reliable start time and first movement trigger.
Figure 71B:
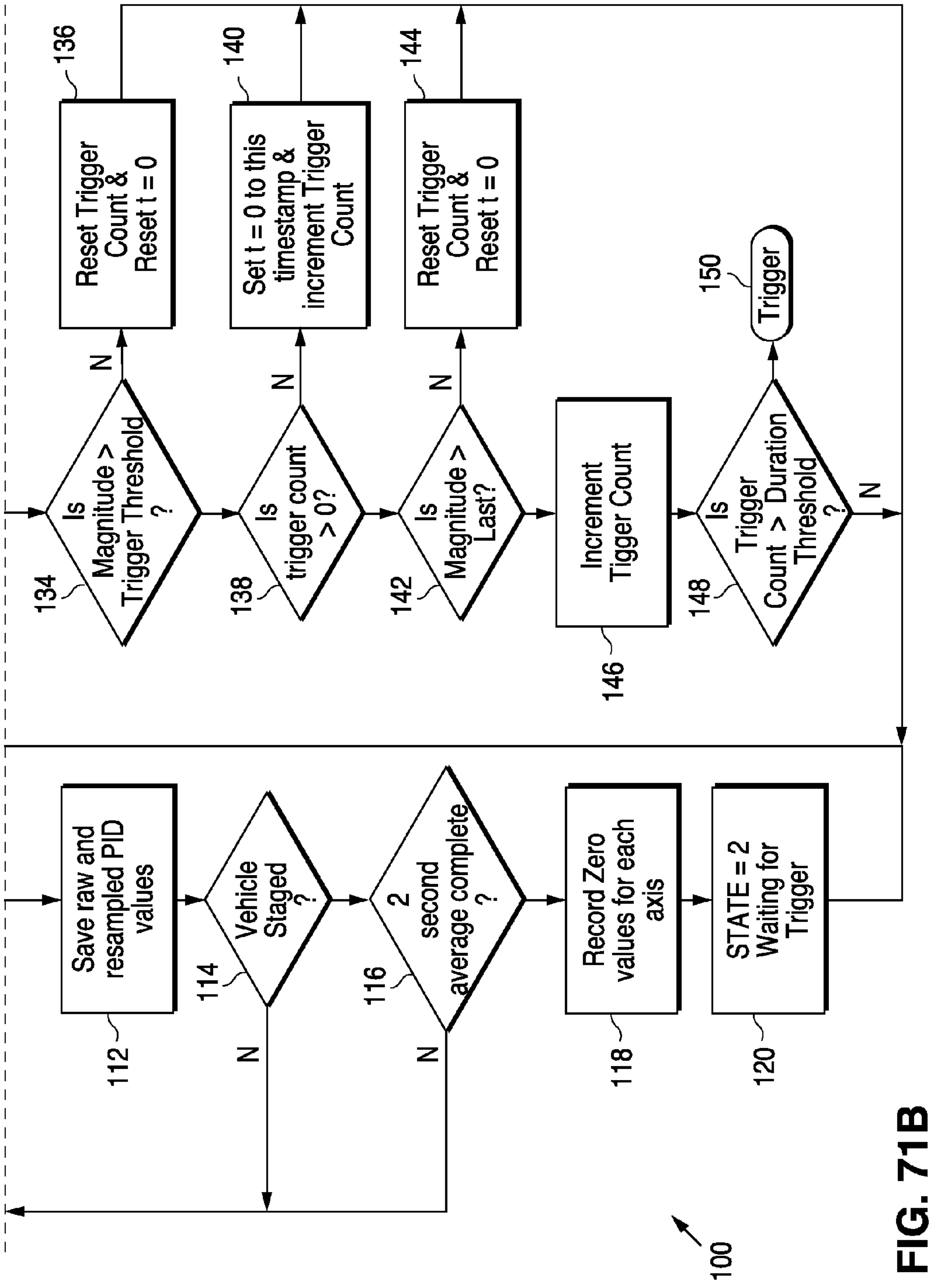
Figure 72A:
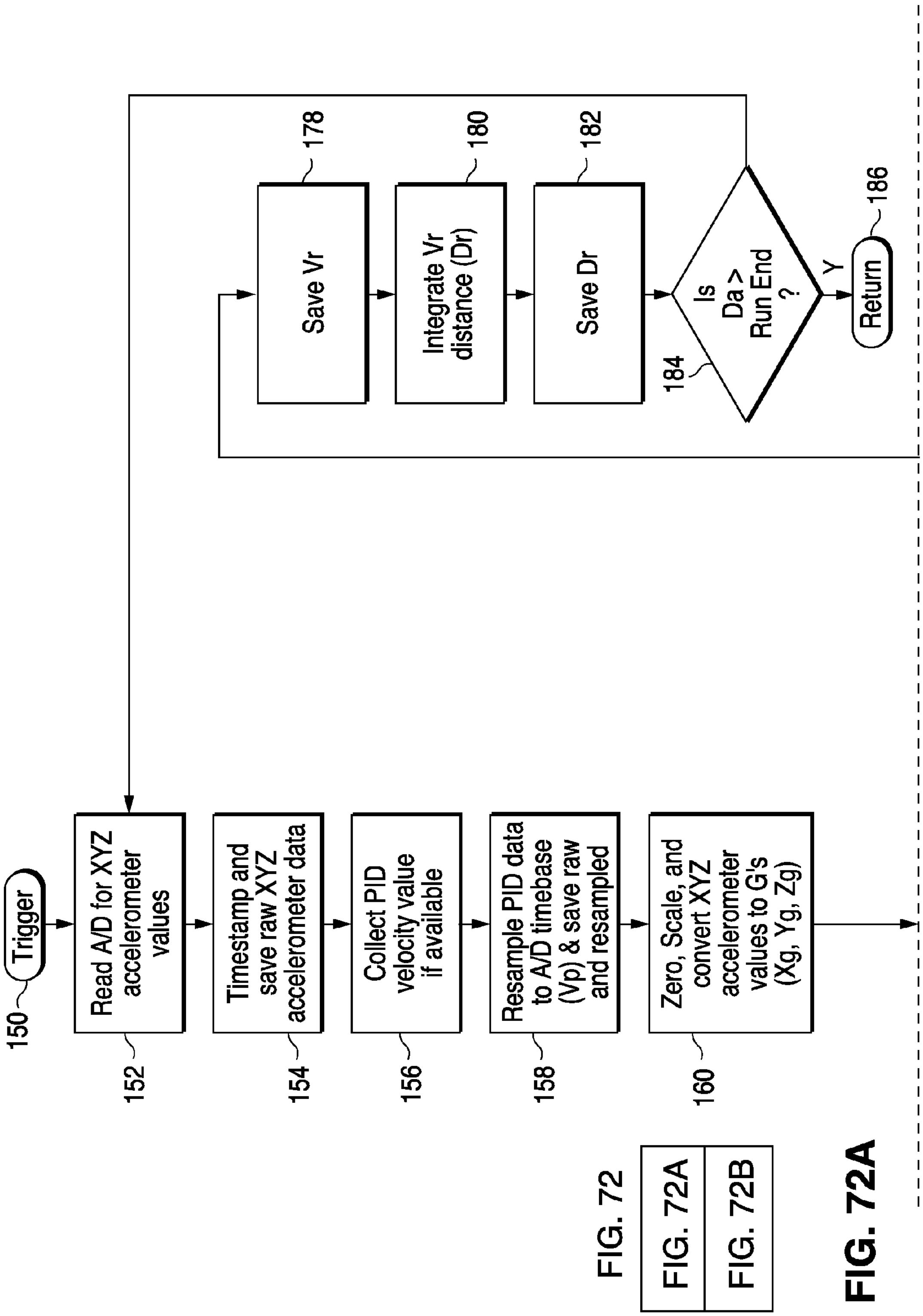
FIG. 72 is an exemplary flow chart of a process beginning with the trigger developed as shown in FIG. 71 and then selectively combining use of data from an accelerometer and from the vehicle's diagnostic port for accurately and reliably determining distance, time, velocity, and acceleration measurements for the vehicle, particularly in the case of wheel spin.
Figure 72B:
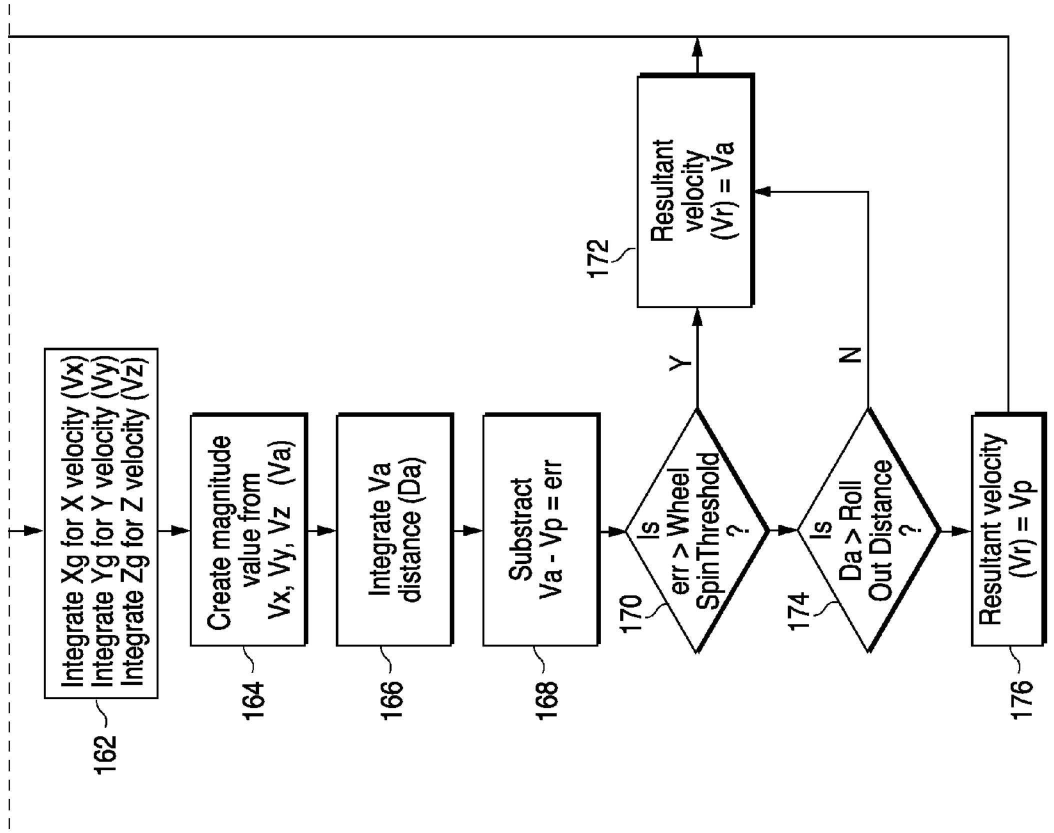

FIGS. 71 and 72 show exemplary flow charts illustrating an exemplary process for combined use of data from an accelerometer and from the vehicle's diagnostic port for accurately and reliably determining distance, time, velocity, and acceleration measurements for the vehicle. FIG. 71 is an exemplary flow chart 100 showing an exemplary process for developing a reliable start time and first movement trigger. FIG. 71 describes the development of this trigger in the context of a drag strip function of device 10. It should be appreciated that the start time and first movement trigger based on the accelerometer data is also applicable for providing an accurate trigger for the dynamometer calculation for the dynamometer function also preferably provided by device 10. As indicated in FIG. 71, the flow charts in FIGS. 71 and 72 assume that communication by device 10 with the vehicle 4, e.g., with the diagnostic port, has been established. In Step 102 in FIG. 71, the process for an exemplary drag strip mode begins with waiting for the vehicle to be staged, referred to as STATE=1. In Step 104, the raw accelerometer X, Y, and Z axis values are read from an A/D converter. In Step 106, the raw XYZ accelerometer values are time stamped and saved.

In Step 108, PID velocity values are collected from the diagnostic port, if available. In Step 110, PID velocity values collected in Step 108, if any, are resampled to the A/D timebase used for the accelerometer data in order to align the data. In Step 112, the raw and resampled PID values are saved (stored). Regarding resampling, in order for the PID velocity values, i.e., velocity stream, to be used in subsequent calculations, its data samples must be aligned. As described above, one can not predict when and how frequently the PID-based velocity values will arrive. The PID-based data rate is much slower than the accelerometer A/D process. To make data manipulations between the accelerometer and PIDs possible, the PID velocity values must be resampled. A resampled data stream is created from the PID velocity values by taking the time stamp value from each accelerometer velocity point and interpolating that value in the PID velocity values to get a corresponding point. This results in having a new PID velocity stream with time stamps exactly corresponding to each Accelerometer derived velocity point. There are several interpolation methods available; processing time available and desired accuracy will determine which should be used. Typically linear interpolation is sufficient. This resampling is done at several steps in the process as will be described in further detail below.

In Step 114, a determination is made as to whether the vehicle is staged, i.e., the user has selected the "stage vehicle" 724 in FIG. 21 and is to prepare for making a drag strip test run. If the vehicle is staged and ready to make a run, in Step 116 a check is made as to whether a 2 second average is completed. The data samples are averaged for x number of samples during the time while the vehicle is staged, i.e., after user selects a button on the display to stage the vehicle, and before causing the first yellow light of the drag strip tree to be lit in order to achieve a zero value that compensates for alignment of the accelerometer. The zero values are used to adjust each subsequent sample collected from the first yellow light. The number 'x' should be chosen to yield an average of at least ½ second and preferably, 2 seconds as shown in Step 116. The value 'x' is dependant on sample rate of the data. This average value for each axis is the Zero value for that axis. This value compensates for positional deviations from true alignment of the accelerometer along the vehicle's major axis. If the 2 second average is not completed, preferably step 115 is executed wherein the raw accelerometer data is added to the 2 second running average for each axis Zero value and the process returns to step 104.

If the 2 second average is completed in Step 116, in Step 118, a zero value is recorded for the X, Y, and Z axes. In Step 120, State=2 "waiting for trigger" begins.

In the below equations:

$X_{Raw}$=Xaxis raw accelerometer value $Y_{Raw}$=Yaxis raw accelerometer value $Z_{Raw}$=Zaxis raw accelerometer value $X_{SF}$=Xaxis Scale Factor value $Y_{SF}$=Yaxis Scale Factor value $Z_{SF}$=Zaxis Scale Factor value $X_Z$=Xaxis zero value $Y_Z$=Yaxis zero value $Z_Z$=Zaxis zero value $X_A$=Xaxis accelerationin in G'S (ft/sec$^2$)

$Y_A$=Yaxis accelerationin in G's (ft/sec$^2$)

$Z_A$=Zaxis accelerationin in G's (ft/sec$^2$)

$X_V$=Xaxis velocity (ft/sec)

$X_V$=Xaxis velocity (ft/sec)

$X_V$=Xaxis velocity (ft/sec)

$D_A$=Accelerometer based distance (ft)

$V_P$=PID based velocity (ft/sec)

$D_P$=PID based Distance (ft)

n=current sample number $n_t$=trigger sample number $A_M$=Magnitude of the acceleration values In Step 122, the raw accelerometer X, Y, and Z axis values are read from an A/D converter. In Step 124, the raw XYZ accelerometer data is timestamped and saved. In Step 126, PID velocity values are collected from the diagnostic port, if available. In Step 128, PID velocity values collected in Step

108, if any, are resampled to the A/D's timebase and the raw and resampled PID values are saved (stored).

In Step 130, the method zeros, scales, and converts XYZ values to G's.

Zero Value Calculations $$X_z = \frac{\sum_{n-x}^{n} X_{Raw}}{n}$$

$$Y_z = \frac{\sum_{n-x}^{n} Y_{Raw}}{n}$$

$$Z_z = \frac{\sum_{n-x}^{n} Z_{Raw}}{n}$$

The zero correction and scale factors are applied to yield acceleration in each axis as follows:

Acceleration Calculations $$X_A = \frac{X_{Raw} - X_Z}{X_{SF}} \times 32.179$$

$$Y_A = \frac{Y_{Raw} - Y_Z}{Y_{SF}} \times 32.179$$

$$Z_A = \frac{Z_{Raw} - Z_Z}{Z_{SF}} \times 32.179$$

In Step 132, these accelerations are combined to get a magnitude value at each sample that is used to determine the motion trigger point. Motion is considered 'detected' when the acceleration magnitude is greater than some trigger threshold and increases for some number of samples. According to the preferred method, the magnitude must remain above some second threshold for some length of time in order to prevent vehicle vibrations from causing a false trigger. Accordingly, in Step 134, a determination is made whether the magnitude is greater than the predetermined threshold, if not, the process returns to Step 122. If the magnitude is greater than the threshold, Step 138 is executed to determine if the trigger count is greater than zero. In other words, has the threshold been exceeded for more than one sample. If the trigger count is not greater than zero, Step 140 is executed wherein time=zero is set to the current time stamp and the trigger count is incremented and the process returns to Step 122. Step 142 is executed if the trigger count is greater than zero in Step 138. In Step 142, a determination is made as to whether the magnitude is increasing, i.e., greater than the last magnitude value, and if not, in Step 144, the trigger count is reset and time equals zero is reset and the process returns to Step 122. If the current magnitude is greater than the last magnitude in Step 142, then in Step 146, the trigger count is incremented. In Step 148, a determination is made as to whether the trigger count exceeds a predetermined duration threshold, so as to rule out a false start trigger from the accelerometer, e.g., due to vibration, if not, the method returns to Step 122. If the trigger count in Step 148 is greater than the predetermined duration threshold, then at Step 150 there is a valid trigger and the flow proceeds to FIG. 72. If the trigger count in Step 148 is greater than the predetermined duration threshold, then at Step 150 there is a valid trigger and the flow proceeds to FIG. 72. The trigger point now establishes the t=0 point. An exemplary equation illustrating Step 148 for the false trigger check is as follows where:

$M_{tr}$=Trigger magnitude for first motion $M_s$=Sustained motion magnitude $$A_M(n)=\sqrt{(X_A(n)^2+Y_A(n)^2+Z_A(n)^2)}$$

if $A_M(n+1)>A_M(n)$ for $p$ samples then $n_t=n-p$

The trigger point at Step 150 that establishes the t=0 point is the beginning point for the continuation of the method as shown in FIG. 72. FIG. 72 is an exemplary flow chart of a process beginning with the trigger point developed as shown in FIG. 71 and then selectively combining use of data from an accelerometer and the vehicle's diagnostic port for accurately and reliably determining distance, time, velocity, and acceleration measurements for the vehicle, particularly in the case of wheel spin.

In Step 152, the raw accelerometer X, Y, and Z axis values are read from an A/D converter. In Step 154, the raw XYZ accelerometer data is timestamped and saved. In Step 156, PID velocity values are collected from the diagnostic port, if available. In Step 158, PID velocity values collected in Step 156, if any, are resampled to the AID timebase, these resampled values are identified as Vp. The raw and resampled PID values are stored.

In Step 160, the method zeros, scales, and converts XYZ values to G's, i.e., Xg, Yg, and Zg).

Each data value, accelerometer and PID-based, has an associated time stamp. The time stamp of the trigger point is subtracted from all subsequent values to achieve a time reference. The magnitude acceleration value is no longer used for calculations. A velocity (vector) is calculated for each axis by performing a numerical integration on each in Step 162 Many methods exist for numerical integration, the following example is typical.

t(n)=timestamp for sample (in seconds)

The velocity at any sample n is evaluated from $n_t$ to n $$X_V(n) = \frac{X_A(n) + X_A(n-1)}{t(n) - t(n-1)} + X_V(n-1) \text{ or } X_V(n) = \sum_{n_t}^{n} \frac{X_A(n) + X_A(n-1)}{t(n) - t(n-1)}$$

$$Y_V(n) = \frac{Y_A(n) + Y_A(n-1)}{t(n) - t(n-1)} + Y_V(n-1) \text{ or } Y_V(n) = \sum_{n_t}^{n} \frac{Y_A(n) + Y_A(n-1)}{t(n) - t(n-1)}$$

$$Z_V(n) = \frac{Z_A(n) + Z_A(n-1)}{t(n) - t(n-1)} + Z_V(n-1) \text{ or } Z_V(n) = \sum_{n_t}^{n} \frac{Z_A(n) + Z_A(n-1)}{t(n) - t(n-1)}$$

In Step 164, these velocities (vectors) are then combined to get a velocity magnitude (i.e., Va in FIG. 72, also referred in the equations below as VA). Step 164 is shown in the following exemplary equation:

$V_A$=Velocity derived from accelerations in ft/sec $$V_A=\sqrt{(X_V(n)^2+Y_V(n)^2+Z_V(n)^2)}$$

In Step 166, velocity VA is numerically integrated to derive distance in feet (Da in FIG. 72, also referred in the equations below as DA). Step 166 is shown in the following exemplary equation:

$D_A$=accelerometer derived distance in feet $$D_A(n) = \sum_{n_t}^{n} \frac{V_A(n) + V_A(n-1)}{t(n) - t(n-1)}$$

At this point, the desired accelerometer data stream VA (Va) has been determined. As described above, resampling of the PID data was done in Step 158 which results in having a new PID velocity stream (Vp) with time stamps exactly corresponding to each Accelerometer derived velocity point.

Data Stream Splicing:

There ate two cases where accelerometer data is used instead of the PID data, the dead zone between when first motion is detected to the arrival of the first velocity PID and for wheel spin. The accelerometer derived data is chosen to be used until the rollout distance (the distance of one complete revolution of the vehicle's tires), in order to overcome the PID data latency problem described above, and PID data is used thereafter except for the case of wheel spin. In the case of wheel spin, the accelerometer data is used until it is determined that wheel spin has ended. In the case of starting line wheel spin, splicing is done until the accelerometer derived velocity approaches the PID velocity within 'e' feet per second. This allows for cases where the two data streams never cross. Using this windowing technique allows for wheel spin further into the run to be corrected. The splicing technique is described in further detail below with reference to FIG. 72.

In Step 168, the new PID velocity stream Vp is subtracted from the desired accelerometer data stream Va with the difference identified as "err". In Step 170, a determination is made as to whether the difference "err" exceeds a predetermined wheel spin threshold. In other words, in Step 170 the velocity derived from the first integration of accelerometer acceleration data is constantly compared to the Onboard diagnostic system reported, i.e., PID-based, vehicle velocity, both typically expressed in feet-per-second. In Step 172, the resultant velocity Vr is set to Va if the error "err" exceeded the predetermined wheel spin threshold i.e., disagreement between the values is indicative of wheel spin and the method proceeds to Step 178.

Wheel Spin Splicing

An exemplary algorithm for wheel spin splicing is shown as follows:

$V_S$=Spliced velocity stream e=error window value

If $\text{abs}(V_P(n)-V_A(n))>e$ then $V_S(n)=V_A(n)$ else $V_S(n)=V_P(n)$

In Step 178 the resultant spliced velocity stream Vr is saved. There is now a spliced velocity stream Vr which is integrated in Step 180 to yield a resultant distance stream Dr, i.e., the distance is calculated from the second integral of acceleration from the start time to the point of "no wheel spin". Step 180 is illustrated in the equations below where Dr is referred to as DR and Vr is referred to as VS:

$D_R$=spliced velocity stream derived distance in feet $V_S$=spliced velocity stream $$D_S(n) = \sum_{n_t}^{n} \frac{V_S(n) + V_S(n-1)}{t(n) - t(n-1)}$$

This distance stream Dr (DR) is saved in Step 182 and used to get an elapsed time. In Step 184, a determination is made as to whether the distance Dr is greater than the run end. The method in FIG. 72 is completed and the method returns at Step 186 if the distance Dr is greater than the run end indicating the end of the run. The method proceeds from Step 184 to Step 152 if the distance Dr is not greater than the run end so as to continue the process for the remaining portion of the run.

Rollout splicing

In Step 174, if the error "err" does not exceed the predetermined wheel spin threshold, i.e., agreement between the velocities of both the accelerometer and PID-based vehicle velocity is indicative of "no wheel spin", a determination is made whether distance Da exceeds the rollout distance. If the distance does not exceed the rollout distance, Step 172 is executed wherein the resultant velocity Vr is set to Va, i.e., accelerometer-based values are used until distance exceeds rollout distance. In Step 176, the resultant velocity Vr is set to Vp if the Distance Da exceeds the rollout distance in Step 174, i.e., a switch is made from using the accelerometer-based data to using the Onboard diagnostic system PID-based data for the resultant velocity. At this point, i.e., with wheel spin stopped and the rollout distance exceeded, time is accurately known, the velocity is as accurate as the federally-mandated accuracy of the car's PID velocity values, and the distance, based on the PID velocity integral, is likewise as accurate.

In other words, for rollout splicing in order to overcome the PID data latency error during rollout, the accelerometer derived data is used until the rollout distance is exceeded. An exemplary algorithm for rollout splicing is as follows:

$V_S$=Spliced velocity stream e=rollout distance

If $D_A<=-e$ then $V_S(n)=V_A(n)$ else $V_S(n)=V_P(n)$

For rollout splicing, this distance stream Dr (DR) is saved in Step 182 and used to get an elapsed time. This time in combination with the rollout distance will be used to derive track times. The elapsed time for the rollout is subtracted from each samples time stamp. The rollout distance is added to any distance to be determined. For instance, to determine the time for 330 ft, first, take the '330 +rollout' time in the spliced distance stream and subtract the rollout time.

Implementing the above method in a software program is well within the skill of one of ordinary skill in the art.

Further corrections for the accelerometer derived velocity stream:

Testing has shown that accelerometer errors tend to be constant over the measurements of interest. The inventors have determined that accumulated errors can be corrected for the accelerometer derived velocity stream by using the PID velocity as a reference. If the ratio of the PID-based velocity, taken at some point >30 feet per second (fps), and the accelerometer derived velocity is taken, that ratio can be used as a scale factor to further adjust the accelerometer based velocity stream.

$V_C$=corrected $V_S$ s=scale factor $n_v$=sample index at desired velocity $$s = \frac{V_P(n_V)}{V_A(n_V)}$$

$$V_C(n) = V_A \times s$$

This velocity stream may now be alternatively used in the splicing operation instead of the straight accelerometer based stream yielding greater accuracy. Implementing the above method in a software program is well within the skill of one of ordinary skill in the art.

Once the vehicle is moving going down the track, the velocity curve is accurate all the way down the track until the driver lets off the throttle and the velocity drops and the acceleration drops, e.g., for a ¼ mile test when the driver passes 1320 feet. According to the method of the present invention, a numerical integration is done to get the distance and the numerical differentiation to get the acceleration of that velocity curve.

For a drag strip run, the times such as shown in the examples in the exemplary screens, can then be taken off the calculated curves, e.g., how long it took to get to an eighth of a mile, a quarter mile, etc. The drag strip print out, the timing slip print out, has the same data in the same order as would be obtained on an actual drag strip. That is, it is timed at 60 feet, timed at 330 feet, timed to ⅛ mile and timed to 1,000 feet and timed to a quarter mile and from the data and curves that has been developed, the velocity values are obtained that correspond to each of those times. Thus, the method has the advantage of calculating the correct distance from the sum of the two unknowns caused by wheel spin and the distance the vehicle travels before the first drive shaft pulse count is generated.

Dynamometer

The dynamometer program likewise depends on accuracy at low speeds in order to accurately calculate power and torque in that critical low speed range. Power and torque calculations, after wheel spin, are not affected by the two distance errors. described above, only the low speed power and torque values are affected. The present invention has the advantage of providing a Dynamometer program that gives accurate results over the entire test including the critical low speed range.

The following is a more detailed description of the dynamometer feature of the present invention. After correcting the velocity and distance values, a numerical differentiation is performed on the smoothed velocity values to obtain the acceleration of the vehicle, and a file created on the same time line as distance and velocity.

Referring to the equations below, it can be seen that these values for velocity and acceleration of the vehicle are what is needed in order to calculate both horsepower and torque at the driving wheels, and if the losses from the flywheel to the road are known, the engine horsepower can be calculated and displayed. Lingenfelter Performance Engineering (LPE) estimates a 20% loss for automatic transmissions, and 13% loss for manual transmissions. In the art, these are very good values based on the extensive testing over the years by LPE. So, while different vehicles might deviate a little, one way or the other from these numbers, the LPE values are very close and will give good results for comparison testing, i.e., probably having less error than the average "working" dynamometer does.

The two terms in the calculation of driving wheel power and torque are first, from Force=Mass×Acceleration, converted in the Equations into terms of vehicle weight, tire diameter, and R.P.M. This part of the final equation is related to the force accelerating the vehicle.

The force opposing forward motion is F2=−Constant×V**2. It is the sum of all "resistances", rolling resistance of the tires, wind resistance, working fluids, etc. It is not necessary to separate them, or to try to measure or calculate them separately, because all these losses are directly proportional to the velocity squared. So, a coast down procedure described below enables determination of a deceleration curve, and calculation of the Constant for all resisting forces.

To insure accuracy, the Constant is calculated in one mph increments over at least 10 mph of clean coast down deceleration, and then each one is inspected. It is found that the calculations agree to less than 1% deviation, so they are all averaged to arrive at the best value to use.

Figure 73:
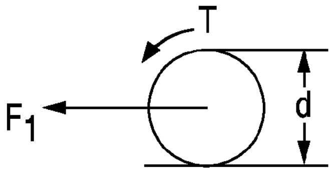
FIG. 73 shows a diagram illustrating drive force F1, torque T and wheel diameter d.
Figure 74:
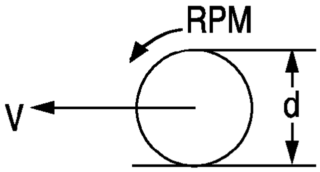
FIG. 74 shows a diagram illustrating vehicle velocity V, RPM, and wheel diameter d.
Figure 75:
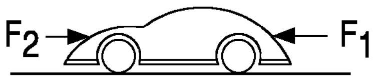
FIG. 75 shows a diagram illustrating drive force F1 and drag losses F2.

Horsepower and Torque calculations and derivations:

FIGS. 73-76 are diagrams graphically illustrating some of the variables for the equations below. FIG. 73 illustrates drive force F1, torque T and wheel diameter d. FIG. 74 illustrates vehicle velocity V, RPM, and wheel diameter d. FIG. 75 depicts drive force F1 and drag losses F2. For the equations below:

T=torque

V=vehicle velocity(fps)

d=wheel diameter (ft)

$F_1$=drive force $F_2$=drag losses $C_L$=loss coefficient

HP=horsepower m=vehicle mass a=vehicle acceleration g=acceleration of gravity=32.9 f/s$^2$ W=vehicle weight Solve for $F_1$ $$T = F_1 \times \frac{d}{2} \tag{1)}$$

$$V = \left(\frac{\mathrm{Re}\,v}{\min}\right) \times \left(\frac{\min}{60\,\sec}\right) \times \left(\frac{\pi \times d}{\mathrm{Re}\,v}\right), \tag{2)}$$

$$V = \frac{RPM \times \pi \times d}{60}, \tag{2a)}$$

$$RPM = \frac{60 \times V}{\pi \times d} \tag{2b)}$$

$$HP = \frac{T \times RPM}{5252}, \tag{3)}$$

$$HP = \frac{F \times V}{550}, \tag{3a)}$$

$$F_1 = \frac{550 \times HP}{V} \tag{3b)}$$

Calculation of losses, Solve for $F^2$:

$$F_2 = (C_L \times V^2) \tag{4)}$$

$$\sum F = m \times a \tag{5)}$$

$$m \times a = F_1 - F_2 \tag{5a)}$$

$$m \times a = \frac{550 \times HP}{V} - (C_L \times V^2) \tag{5b)}$$

-continued $$HP = \frac{V}{550} \times ((m \times a) + (C_L \times V^2)) \quad 5c)$$

$$W = m \times g \quad 6)$$

$$m = \frac{W}{g} \quad 6b)$$

Substituting 6b into 5c yields:

$$HP = \left(\frac{V}{550}\right) \times \left(\left(\left(\frac{W}{g}\right) \times a\right) + (C_L \times v^2)\right) \quad 7)$$

Coast Down Calculation

A coast down calculation is required to measure actual resistance to all parasitic motion losses, such as wind resistance, tire rolling resistance, and all gear and bearing drag. All are a function of vehicle speed squared, so a simple coast down test can be performed that is accurate for that vehicle, equipped with whatever tires, mirrors, aftermarket aerodynamic "wings", lowered suspensions, etc. This coast down test gives a drag coefficient that accounts for all such parasitic losses. At any speed, the motion losses in total are equal to this experimentally determined coefficient multiplied by the Vehicle Speed "squared". No other prior art consumer product or shop tool is known that provides this feature.

The engineering approach to calculate the coefficient of drag without a wind tunnel is to use the cross sectional area of the car and then the coefficient of drag which is a reflection of the resistance of that particular shape body going through the air. Now coefficient of drag of a vehicle is really a misnomer because it implies wind resistance, but there are also the rolling resistances of the tires, losses due to the transmission and gears, etc. Interestingly enough though, there is a coefficient of drag of the transmission gears, and a coefficient of drag of the rear axel gears, and a coefficient of drag of all bearings, coefficient of drag of rear tires as they flex and consume energy and coefficient of drag of the aerodynamics and that would be hard for an engineering department to define for each and every car. However, all of those coefficients can be summed up in brackets and then multiplied by simply the velocity squared, because each and every one of these factors individually is a function of the velocity squared times the co-efficient. The present invention provides an empirical technique for measuring the total motion loss independent of whatever rear view mirrors, or wings, or tires, or lowered suspensions, or other non-stock modifications exist on the vehicle, all affect the coefficient of drag. Known methods require the driver to look up his or her vehicle's cross sectional area to determine the coefficient of drag for your vehicle.

The coast down method for calculating the total motion losses of a vehicle wherein the losses are proportional to the square of the velocity of the vehicle, including the steps of a) initiating a first run by causing the vehicle to move at a speed of about 60 miles per hour along a path on a track of known slope; b) acquiring the vehicle's speed via an onboard diagnostic port in the vehicle; c) causing the vehicle to shift to neutral gear so as to allow the vehicle to coast down; d) acquiring the vehicle's speed via an onboard diagnostic port at predetermined intervals during the coast down; and e) allowing the vehicle to coast down until its speed is about 50 miles per hour; f) repeating steps a) to e) for a second run substantially following the path of the first run; g) comparing speeds acquired in the first and second runs; h) calculating the total motion loss from the acquired speeds if the speeds at the predetermined intervals obtained during the first run and second run are substantially consistent; i) repeating steps a) to e) for successive runs if the acquired speeds at the predetermined intervals for the prior two runs are not substantially consistent until the acquired speeds at the predetermined intervals are substantially consistent between successive runs; and j) calculating the total motion loss from the substantially consistent acquired speeds at the predetermined intervals.

So, prior to every run, the user will see the various values and is asked by the computer system of the present invention if there is anything that has been changed. If the user has changes for any of these particular variables, the user will need to do another coast down and obtain a new coefficient of drag.

Calculation of drag coefficient $C_L$ from coast-down data where:

$V_1$=initial velocity $V_2$=coasting velocity after time t=elapsed time between $V_1$ and $V_2$ $C_L$=loss coefficient m=vehicle mass (equ 6b)

$a_d$=coastdown acceleration (deceleration)

$$a_d = \frac{V_1 - V_2}{t_1 - t_2} \quad 8)$$

$$F_2 = m \times a_d \quad 9)$$

also from equation 4;

$$F_2 = (C_L \times V^2) \quad 9a)$$

$$C_L = \frac{m \times a_d}{v^2} \quad 10)$$

Having disclosed exemplary embodiments, modifications and variations may be made to the disclosed embodiments while remaining within the scope of the invention as described by the following claims.

What is claimed is:

1. A method for calculating a point at which a vehicle has traveled a selected distance from a standing start point, wherein the distance calculation corrects for errors in velocity data available from a vehicle's onboard diagnostics system, comprising:

accessing the onboard diagnostic system to obtain said vehicle velocity data;

detecting the start time of said vehicle travel, wherein said detector is independent of said onboard diagnostic system;

detecting vehicle acceleration;

generating a first set of velocity values based on said detected vehicle start time and said detected vehicle acceleration;

storing said first set of velocity values;

storing a second set of velocity values based on the vehicle velocity data received from said onboard diagnostic system;

generating a time stamp for each of said velocity values of said first set and said second set;

generating corrected velocity values as a function of said first set and said second set of velocity values, said time stamps, and said detected start time; and integrating said corrected velocity values to calculate the point at which the vehicle has traveled the selected distance from said standing start point.

2. The method of claim 1, further comprising:

determining a second time corresponding to the time when the vehicle has reached the selected distance; and calculating the time it took for the vehicle to travel the selected distance from said standing start point, including subtracting the start time from said second time.

3. The method of claim 1, wherein said start time is detected as a function of first movement of said vehicle.

4. The method of claim 1, wherein the errors include errors resulting from vehicle wheel spin.

5. The method of claim 1, wherein the errors include errors caused by the distance said vehicle travels before the first velocity value is generated by the vehicle's onboard diagnostics system.

6. The method of claim 1, further comprising accessing the engine computer.

7. The method of claim 1, wherein an accelerometer is used for detecting the start time of vehicle travel and for detecting vehicle acceleration.

8. The method of claim 7, wherein said accelerometer is triggered by movement of said vehicle and has an output that is a function of said triggering and indicates the magnitude thereof.

9. The method of claim 8, wherein the step of detecting the start time of said vehicle travel further comprises:

sampling said output of said accelerometer; and determining the start time of said vehicle travel by the sampled output reaching a predetermined magnitude for a predetermined number of samples.

10. The method of claim 7, wherein the step of generating a first set of velocity values comprises:

reading raw X, Y, and Z axis values of said accelerometer from an AID converter, wherein said A/D converter has a timebase; and storing said axis values according to said timebase.

11. The method of claim 7, wherein the step of generating corrected velocity values comprises generating the corrected velocity values for the time period between the detected start time of vehicle travel to the vehicle's rollout distance based on data acquired from the accelerometer and not based on values received from said onboard diagnostic system; wherein the rollout distance is the distance of one complete revolution of the vehicle's tires.

12. The method of claim 11, wherein the step of generating corrected velocity values further comprises:

for distances beyond the vehicle's rollout distance, generating the corrected velocity values based only on values received from said onboard diagnostic system and not based on data acquired from the accelerometer unless the error between velocity values received from said onboard diagnostic system and velocity values based on data acquired from the accelerometer exceeds a predetermined threshold indicative of wheel spin.

13. The method of claim 12, further comprising:

when the error between velocity values is indicative of wheel spin, generating the corrected velocity values based solely on data acquired from said accelerometer unless the difference between the velocity values based on data acquired from the accelerometer and the velocity values received from said onboard diagnostic system is below a predetermined number, and when the difference is below the predetermined number, generating velocity values solely from velocity values received from said onboard diagnostic system.

14. The method of claim 7, wherein said step of generating said first set of velocity values further comprises:

determining that said vehicle has been staged;

sampling acceleration values for each axis of said accelerometer for a predetermined number of samples while said vehicle is staged;

averaging the sampled acceleration values over a predetermined time while the vehicle is staged, and storing zero values for each axis of said accelerometer as a function of said averaged data samples so as to correct for errors in the alignment of said accelerometer.

15. The method of claim 1, wherein said step of generating corrected velocity values further comprises aligning in time said second set of velocity values with said first set of velocity values.

16. The method of claim 15, wherein said aligning in time comprises:

interpolating said time stamped second set of velocity values in said time stamped first set of velocity values such that each velocity value of said second set is associated with a time stamp of said first set; and storing said interpolated second set of velocity values along with the corresponding time stamp from the corresponding velocity value of said first set.

17. The method of claim 1, further comprising calculating and displaying the times to reach one or more predetermined speeds as a function of at least one of said corrected velocity values.

18. The method of claim 2, further comprising calculating and displaying the times to reach one or more predetermined distances as a function of at least one of said corrected velocity values; wherein said predetermined distances are less than said selected distance.

19. The method of claim 1, further comprising calculating and displaying engine horsepower as a function of at least one of said corrected velocity values.

20. The method of claim 1, further comprising calculating and displaying engine torque as a function of at least one of said corrected velocity values.

21. An electronic portable device for calculating a point at which a vehicle has traveled a selected distance from a standing start point, wherein the distance calculation corrects for errors in velocity data available from a vehicle's onboard diagnostics system, comprising:

an input/output port for coupling said device to said diagnostic port for accessing the onboard diagnostic system to obtain said vehicle velocity data;

a detector for detecting vehicle movement and the start time of said vehicle travel, wherein said detector is independent of the onboard diagnostics system;

a microcontroller operative for generating a first set of velocity values and a corresponding time stamp for each velocity value of said first set based on data acquired by said detector, for receiving a second set of velocity values generated by said onboard diagnostic system via said input/output port and for generating a time stamp for each of said velocity values of said second set, for generating corrected velocity values as a function of said first set and said second set of velocity values, said time stamps, and said detected start time, and for integrating said corrected velocity values to calculate the point at which the vehicle has traveled the selected distance from said standing start point; and a memory for providing storage in said device for said first set of velocity values, for said second set of values based on the vehicle velocity data received from said onboard diagnostic system, and for said time stamps.

22. The device of claim 21, wherein said corresponding time stamp for each velocity value of said first set is a function of the time period from said detected start time to when the corresponding data for each velocity value of said first set was acquired by said detector.

23. The device of claim 21, wherein said time stamp for each velocity value of said second set is indicative of the time period from said detected start time to when each velocity value of said second set was received.

24. The device of claim 21, wherein said microcontroller is also operative for determining a second time corresponding to the time when the vehicle has reached the selected distance; and for calculating the time it took for the vehicle to travel the selected distance from said standing start point, including subtracting the start time from said second time.

25. The device of claim 21, wherein said detector includes an accelerometer that generates acceleration values as a function of movement of said vehicle and a touch screen display for enabling user selection of device operations.

26. A method for calculating a point at which a vehicle has traveled a selected distance from a standing start point, wherein the distance calculation corrects for errors in the velocity data available from a vehicle's onboard diagnostics system, comprising accessing the onboard diagnostic system to obtain said vehicle velocity data;

detecting the start time of said vehicle travel and the vehicle's acceleration using an accelerometer, wherein said accelerometer is independent of said onboard diagnostic system;

in a first time interval from the start time to the time taken to reach the first velocity value received from said onboard diagnostic system, generating corrected velocity values based on data acquired from said accelerometer;

thereafter, generating corrected velocity values based on velocity data from said onboard diagnostics system if said velocity data does not significantly vary from said velocity values generated based on data acquired from said accelerometer, otherwise, generating corrected velocity values based on data acquired from said accelerometer; and integrating said corrected velocity values to calculate the point at which the vehicle has traveled the selected distance from said standing start point.

27. The method of claim 26, further comprising:

determining a second time corresponding to the time when the vehicle has reached the selected distance; and calculating the time it took for the vehicle to travel the selected distance from said standing start point, including subtracting the start time from said second time.

28. The method of claim 26, wherein the errors corrected for include errors resulting from vehicle wheel spin.

29. The method of claim 26, wherein the errors corrected for include errors caused by the distance said vehicle travels before the first velocity value is generated by the vehicle's onboard diagnostics system.

* * * * *